(12) United States Patent
Yoshitani

(10) Patent No.: US 7,565,966 B2
(45) Date of Patent: Jul. 28, 2009

(54) TRANSPORTER/SORTER AND TRANSPORT BOX

(75) Inventor: Kazuhito Yoshitani, Tokyo (JP)

(73) Assignee: NEC Corporation, Tokyo (JP)

( * ) Notice: Subject to any disclaimer, the term of this patent is extended or adjusted under 35 U.S.C. 154(b) by 575 days.

(21) Appl. No.: 11/168,498

(22) Filed: Jun. 29, 2005

(65) Prior Publication Data

US 2006/0045673 A1    Mar. 2, 2006

(30) Foreign Application Priority Data

| Jun. 30, 2004 | (JP) | ............................. 2004-194586 |
| Jul. 2, 2004 | (JP) | ............................. 2004-196729 |
| Jul. 8, 2004 | (JP) | ............................. 2004-202375 |
| Aug. 19, 2004 | (JP) | ............................. 2004-239190 |

(51) Int. Cl.
    *B65G 17/12*   (2006.01)
(52) U.S. Cl. .................. 198/801; 198/795; 198/867.11
(58) Field of Classification Search ................ 198/801, 198/867.11, 803.14, 800, 795; 414/331.03, 414/609, 787
    See application file for complete search history.

(56) References Cited

U.S. PATENT DOCUMENTS

| 702,894 | A |  | 6/1902 | Webster |
| 2,886,166 | A |  | 5/1959 | Lens |
| 3,300,026 | A |  | 1/1967 | Lens et al. |
| 3,675,759 | A | * | 7/1972 | Koppe .................... 198/803.14 |
| 5,346,050 | A | * | 9/1994 | Mojden et al. ........... 198/345.2 |
| 5,850,901 | A |  | 12/1998 | Schuster et al. |
| 5,863,172 | A | * | 1/1999 | Pearson et al. .............. 198/801 |
| 6,568,151 | B2 | * | 5/2003 | Buckley et al. ......... 198/803.14 |
| 6,747,231 | B1 |  | 6/2004 | Bretschneider et al. |

FOREIGN PATENT DOCUMENTS

| DE | 199 43 361 C1 | 9/1999 |
| EP | 0218 872 A2 | 8/1986 |
| EP | 0398673 A2 | 5/1990 |
| EP | 0 424 789 | 10/1990 |
| EP | 0 608 161 | 7/1994 |
| EP | 0 834 460 | 4/1998 |
| EP | 1 371 423 | 12/2003 |
| GB | 528189 | 4/1940 |
| JP | 2003-237926 | 8/2003 |

OTHER PUBLICATIONS

European Search Report dated Oct. 5, 2005.

* cited by examiner

*Primary Examiner*—James R Bidwell
(74) *Attorney, Agent, or Firm*—Whitham Curtis Christofferson & Cook, PC

(57) ABSTRACT

A transporter/sorter and a transport box therefore are disclosed. The transporter/sorter 1 comprises a guide rail 50 having straight portions and curved portions and forming an endless loop path, a plurality of transport wagons 30 undergoing excursion along the endless loop path in an intercoupled state, and transport boxes 20 supported on the transport wagons 30, respectively, in a state of being found on the outer side of the guide rail 50.

5 Claims, 43 Drawing Sheets

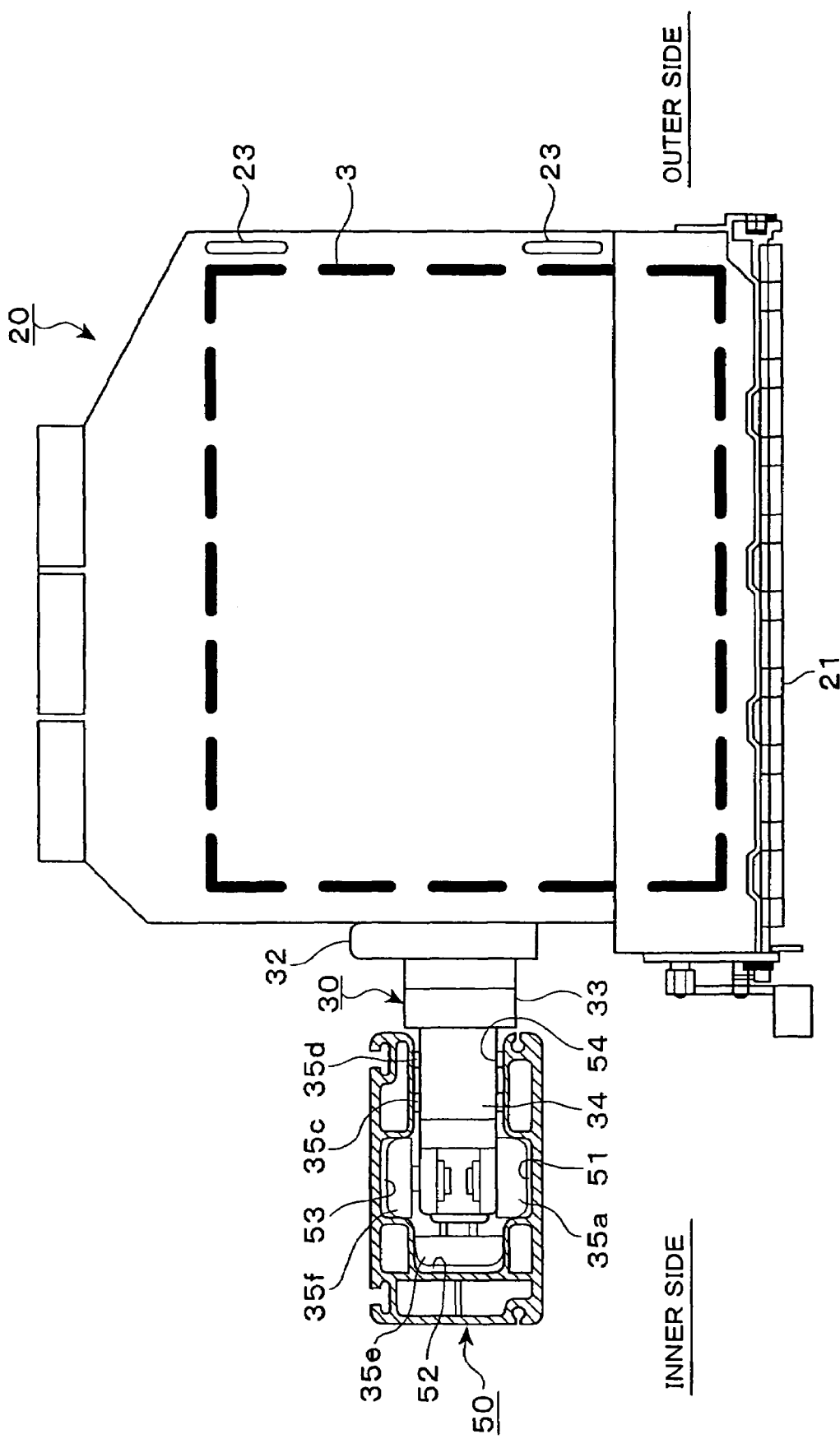

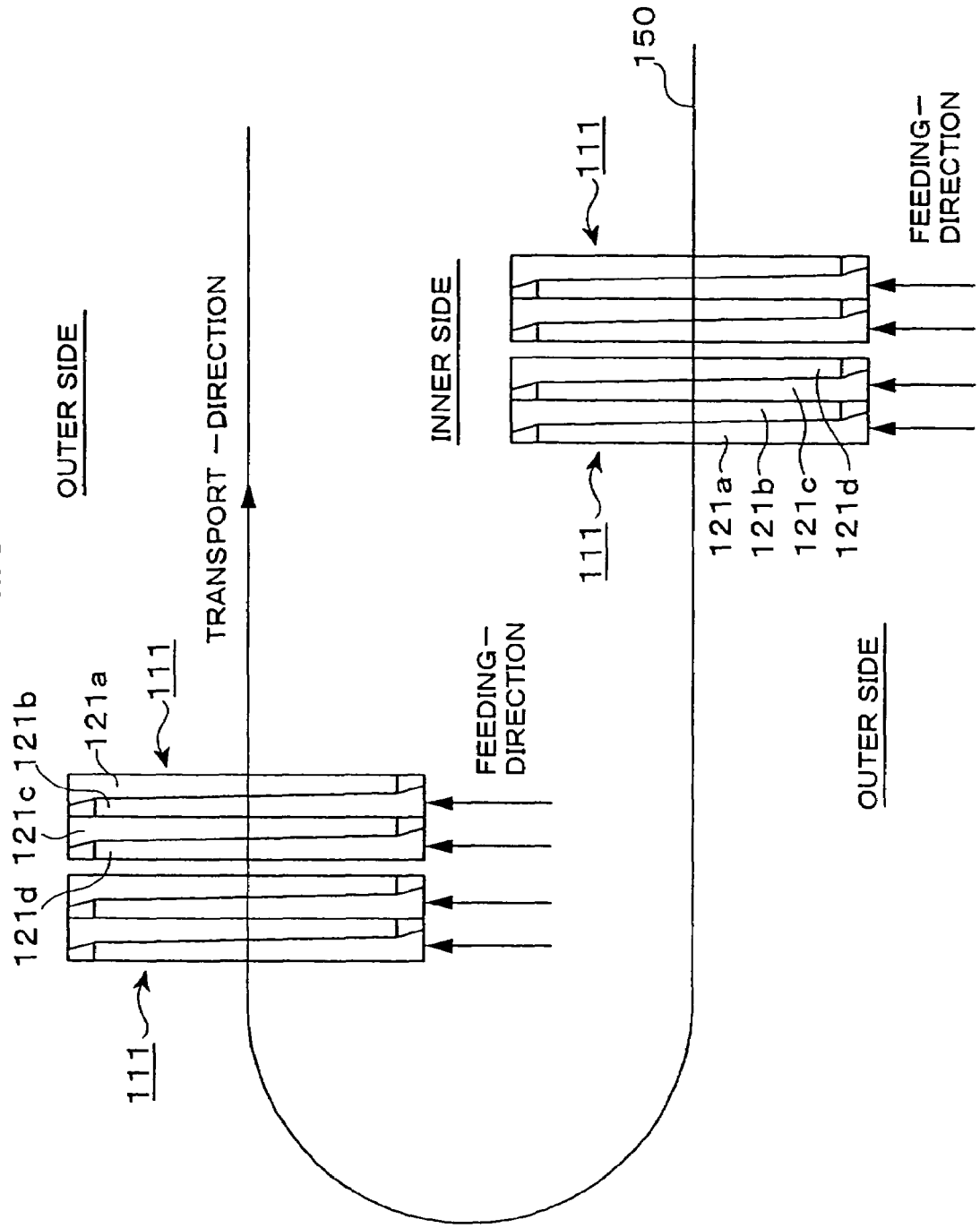

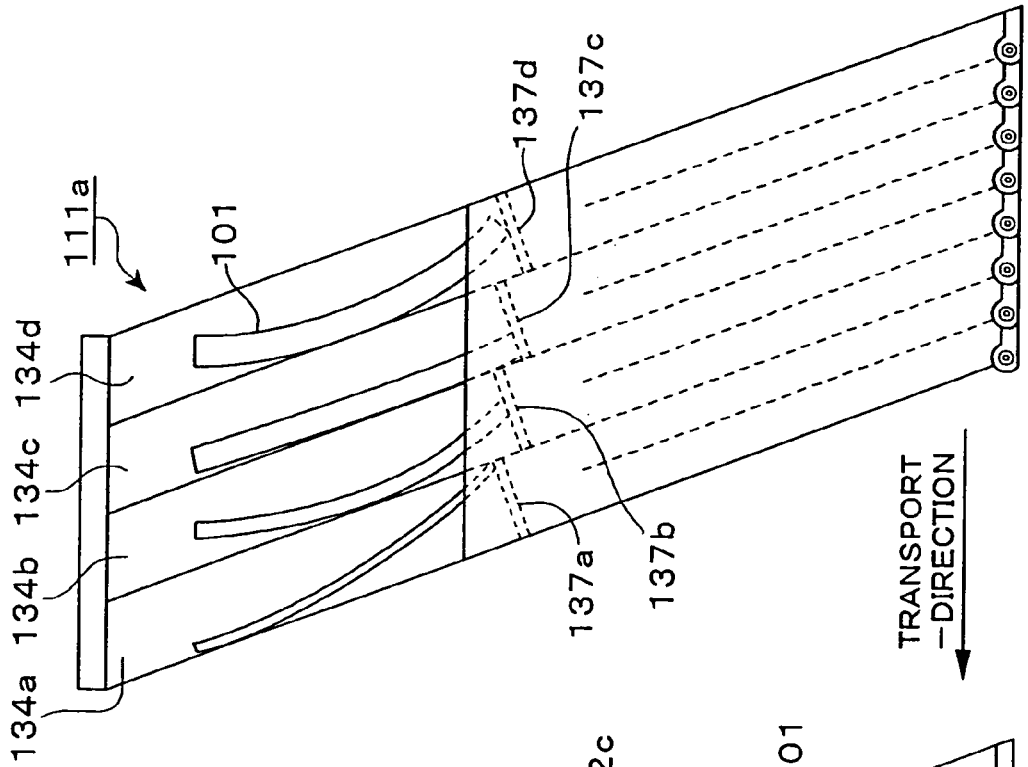
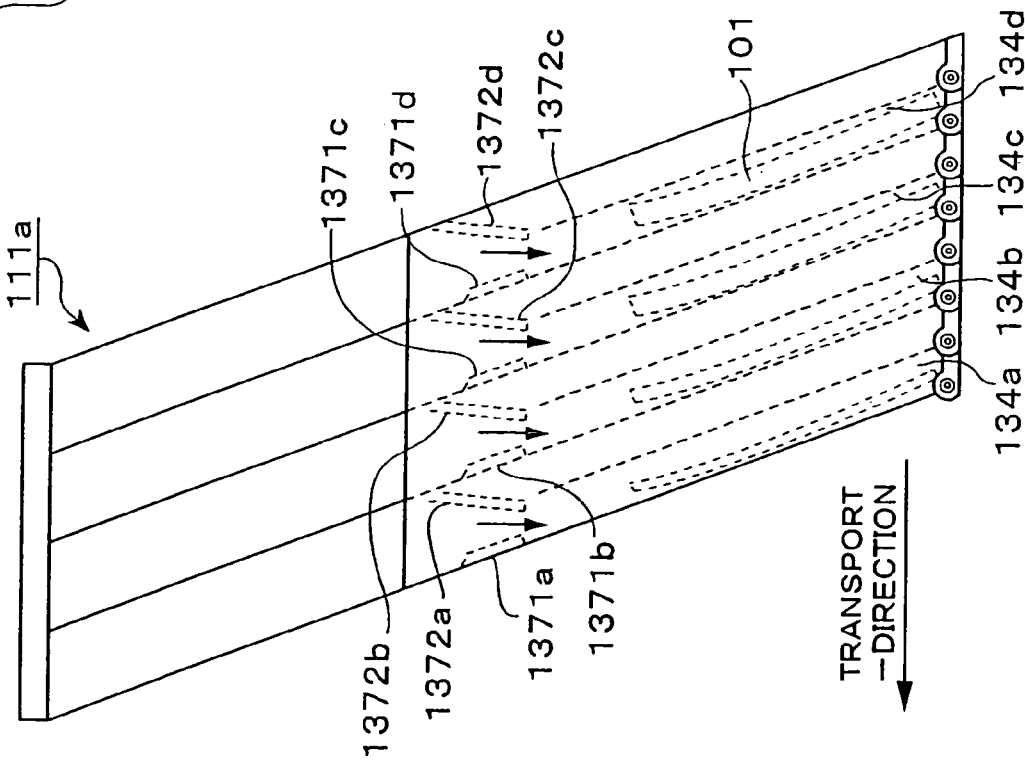

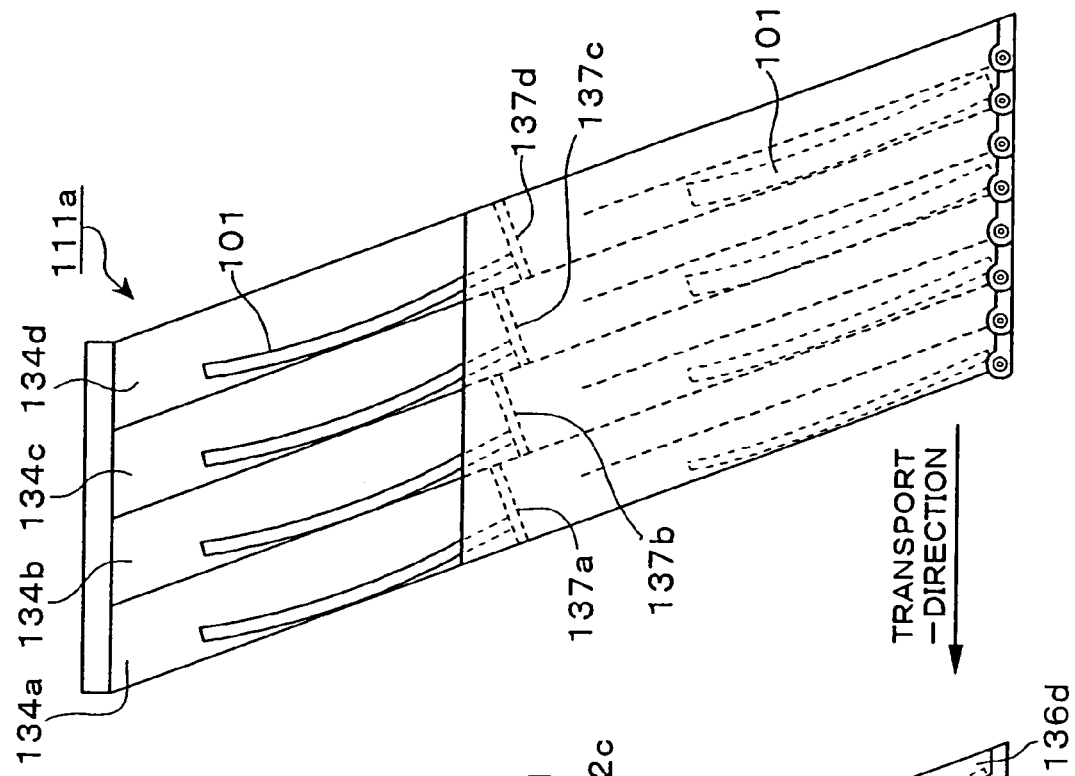
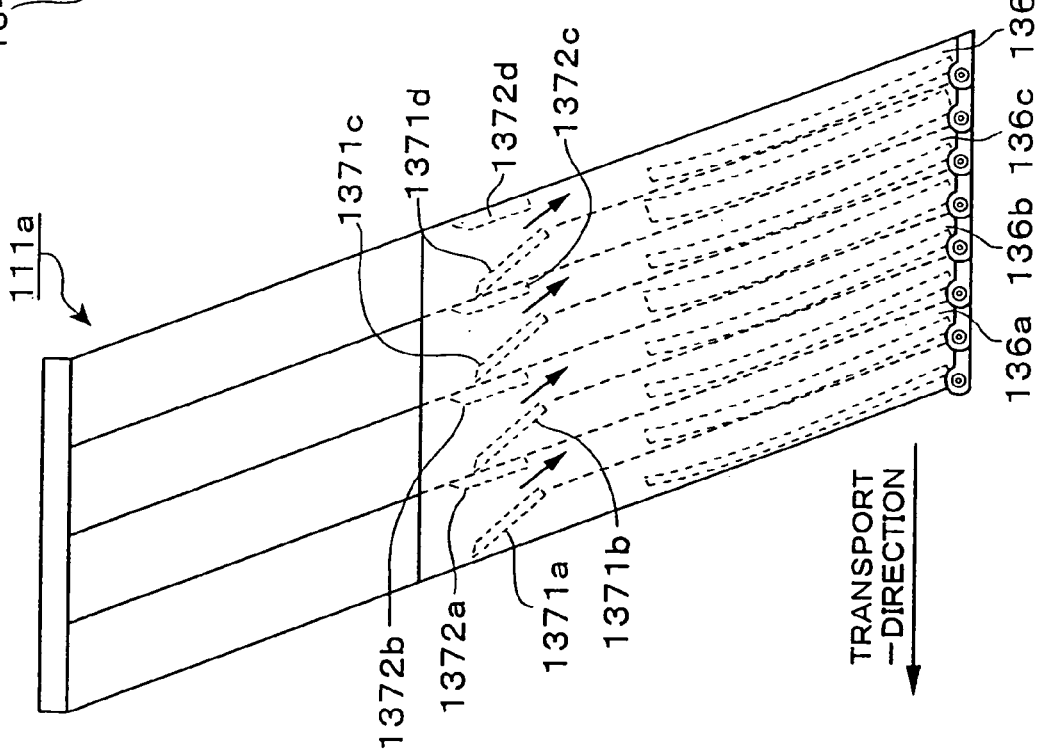

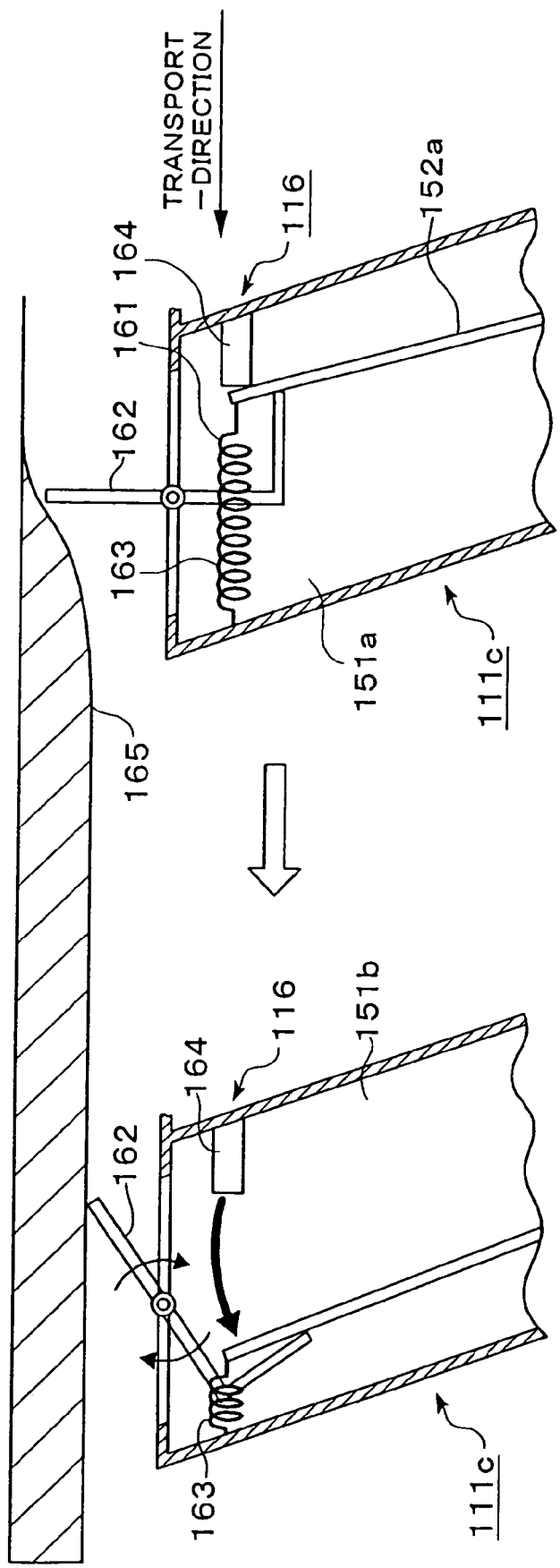

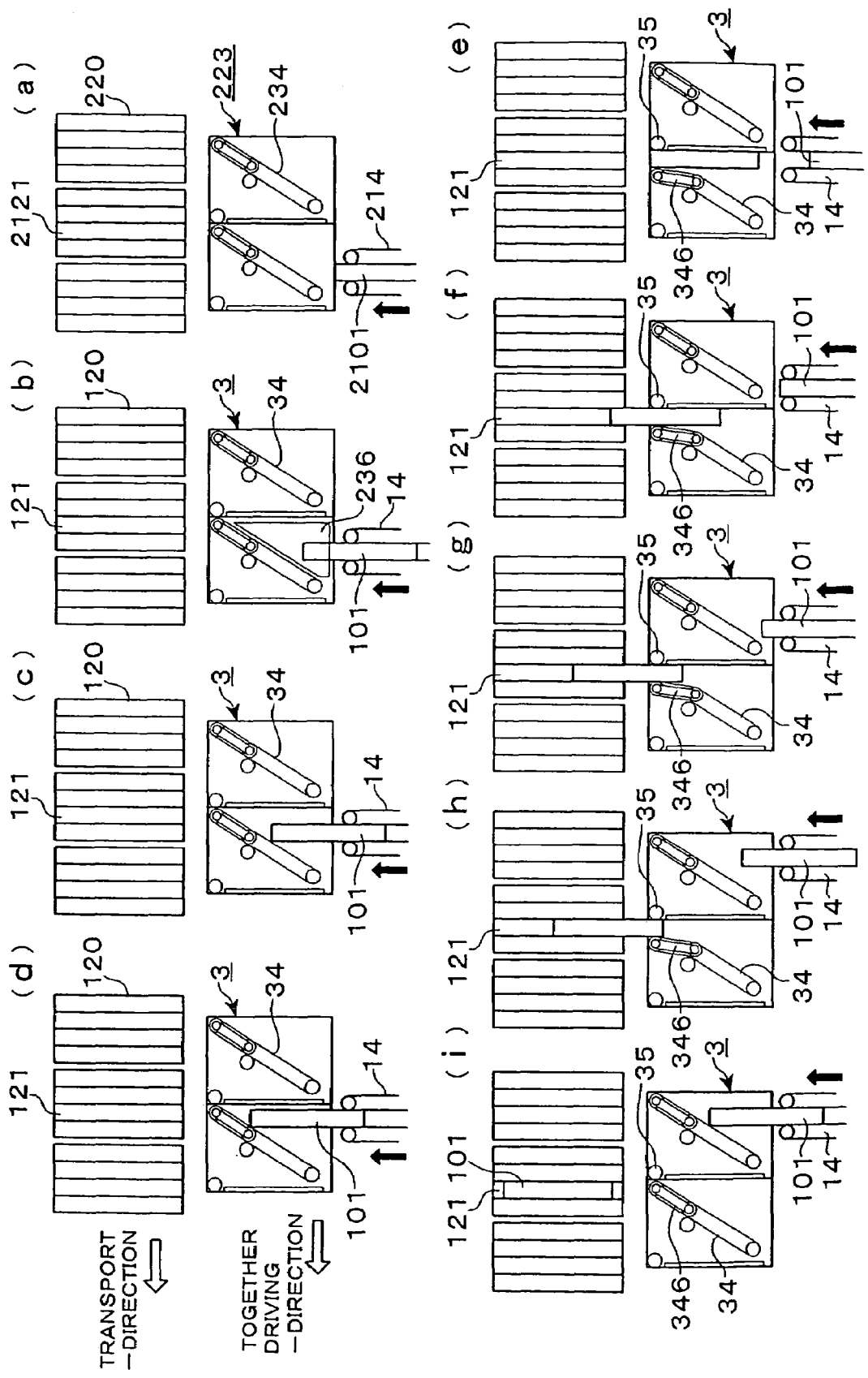

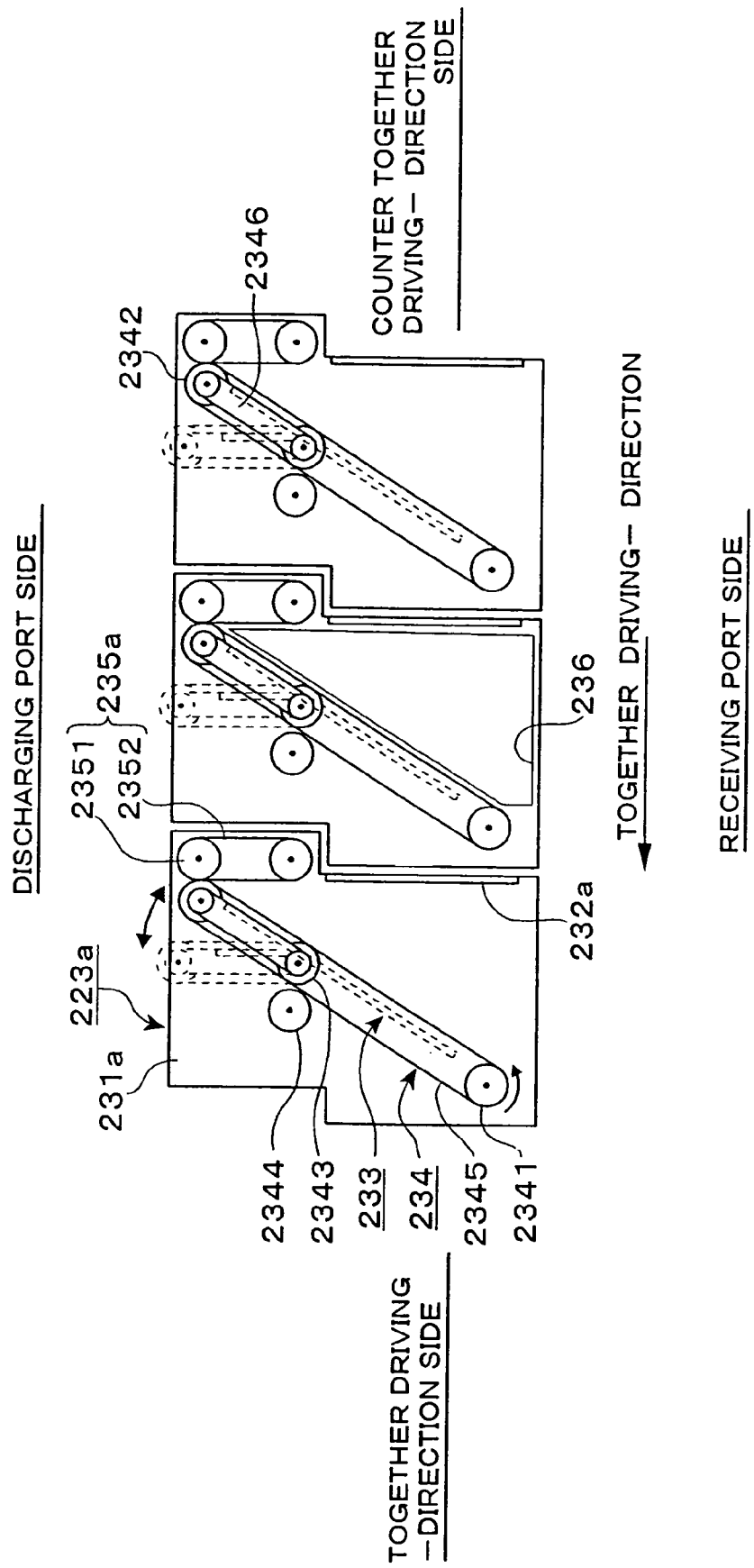

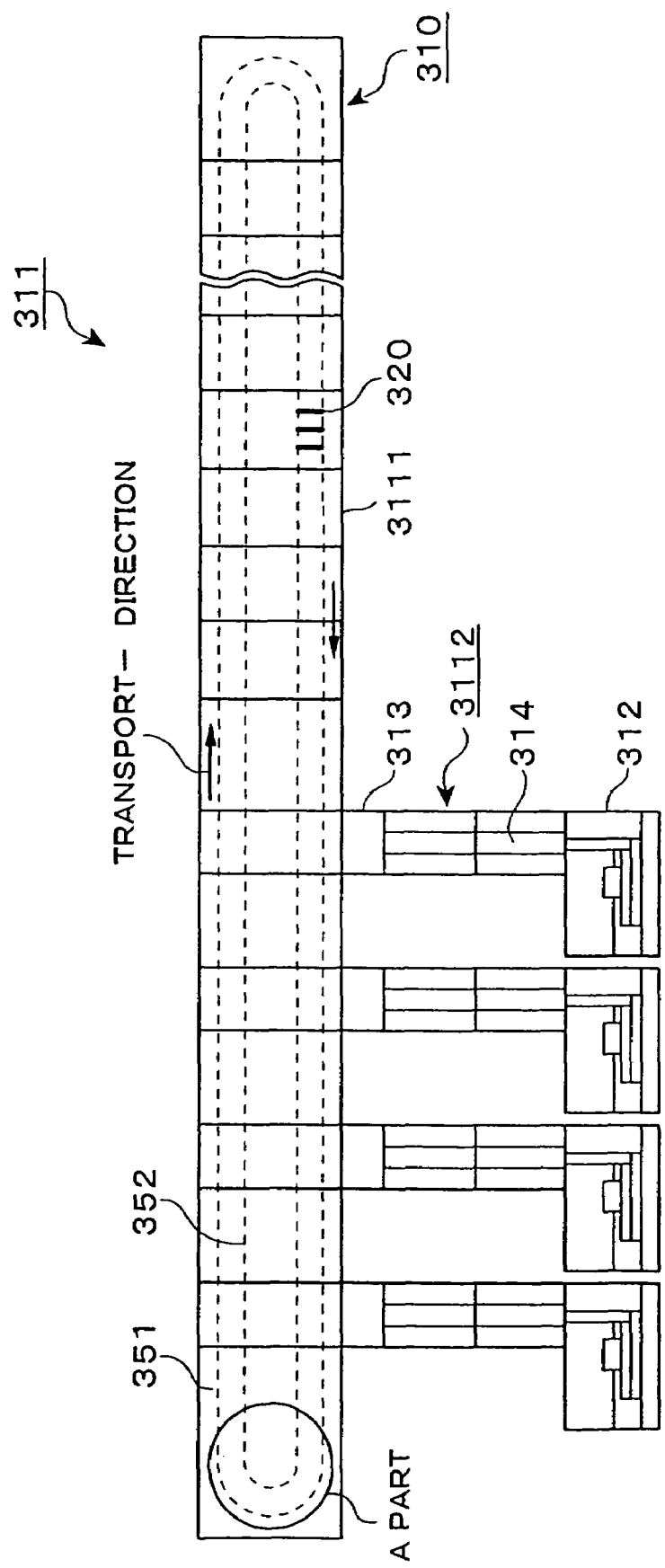

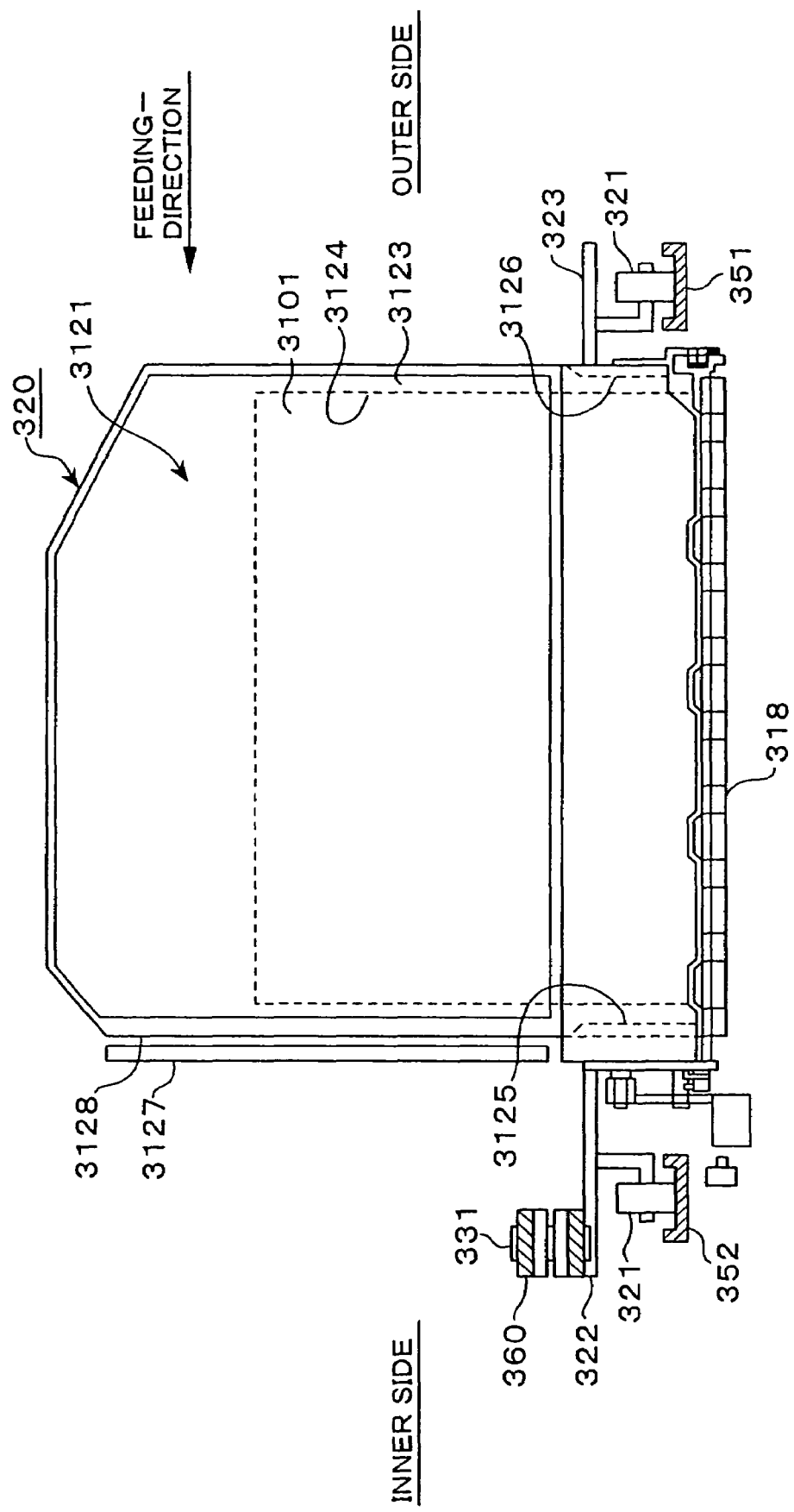

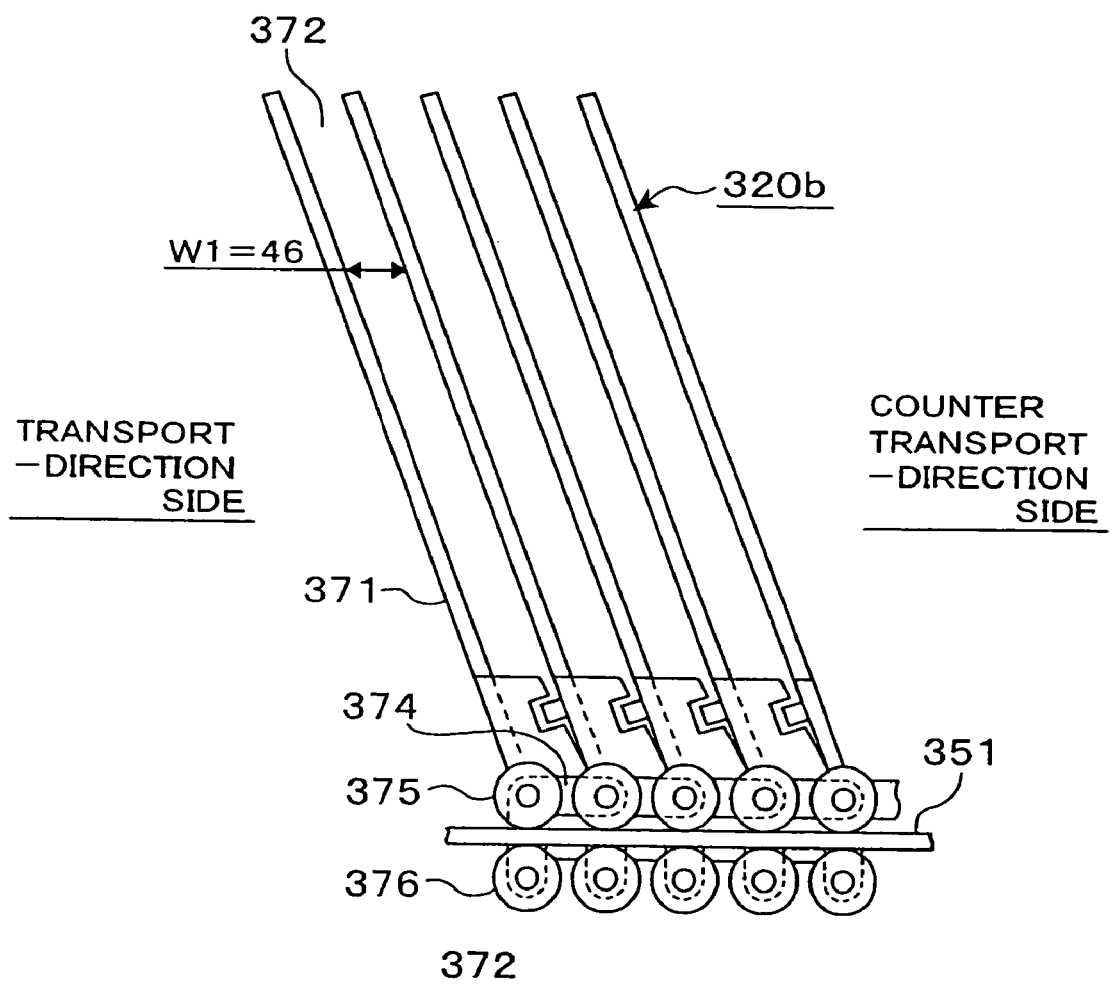

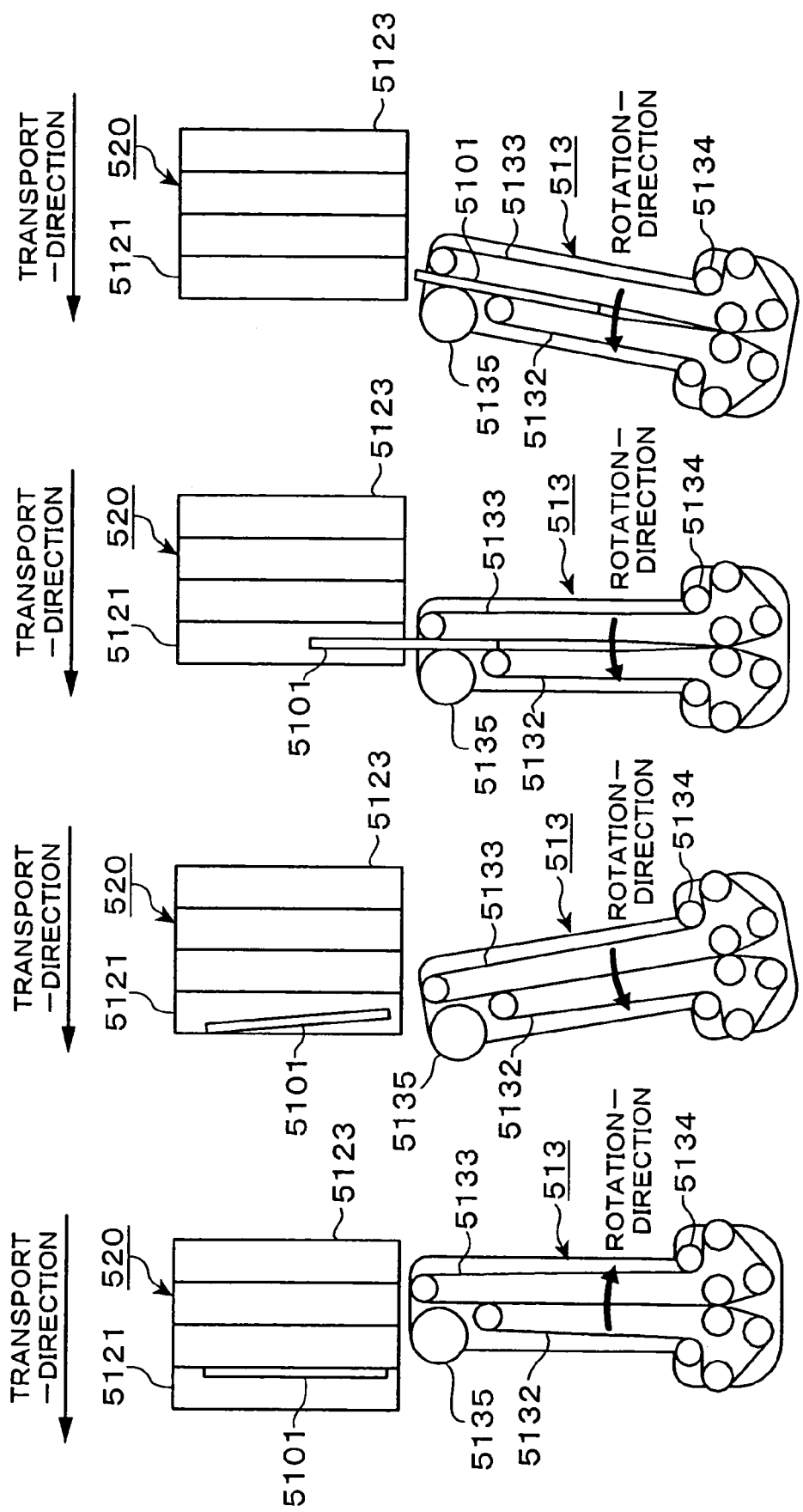

TRANSPORTER/SORTER AND TRANSPORT BOX

BACKGROUND OF THE INVENTION

This application claims benefits of Japanese Patent Applications No. 2004-194586, No. 2004-196729, No. 2004-202375 and No. 2004-239190 filed respectively on Jun. 30, 2004, Jul. 2, 2004, Jul. 8, 2004 and Aug. 19, 2004, the contents of which are incorporated by the reference.

The present invention relates to a transporter/sorter and a transporter box, more particularly, to a transporter/sorter for transporting and sorting transport articles as large-size home-distributed envelopes and a transport box to be used with such transporter.

Up to date, documents, magazines, books, CD cases etc., are sent as home-distributed mails and post mails.

The documents, magazines, etc. that are sent are accommodated in large vinyl or paper envelopes or cardboard or thick paper cases for home distribution or post mails. Sometimes, magazines or the like are sent without being accommodated in envelopes or cases but by merely bound with strips or in the bear state.

Large-size envelopes and cases as noted above (including post cards and small envelopes) are sorted by special transporters/sorters.

A prior art transporter/sorter (for transporting and sorting post cards or small envelopes) will now be described with reference to drawings.

FIGS. 22(a) and 22(b) are schematic views showing such a prior art transporter/sorter, FIG. 22(a) being a plan view and FIG. 22(b) being a front view. FIG. 23 is a schematic enlarged view showing a part E in FIG. 22(a). FIG. 24 is a schematic enlarged-scale view taken from F in FIG. 23.

As shown in FIGS. 22(a) and 22(b) to 24, the prior art transporter/sorter 500 comprises a frame 510, a guide rail 550 provided inside the frame 510 and in the form of an endless loop having straight and curved portions, a plurality of transport wagons 530 supported on the guide rail 550 for traveling in circulation along the endless loop path, and transport boxes 520 each suspended from each transport wagon 530.

The transport wagons 530 are coupled for revolution via joints 5131 inserted in the perpendicular direction (see FIG. 23).

The transport wagons 530 and the joints 5131 constitute a chain conveyor 560. With rotation of sprockets (not shown) that are provided on the chain conveyor 560, the transport wagons 530 are caused to undergo excursion inside the guide rail 550.

The transport boxes 520 have a shape of a substantially rectangular box. Each transport box 520 is provided, on a side face of the outer side of the guide rail 550, with an accommodating port (not shown), through which a transport article 5101 is fed (i.e., thrown) and, on the bottom, with a rotary bottom lid (not shown into) for discharging the transport article 5101.

The transport boxes 520 are hung from alternate ones of the coupled transport wagons 530 (see FIG. 24). Each transport box 520 is supported such that, in top view, gravitational center is found substantially right underneath the guide rail 550. More specifically, in the top view, the transport box 520 is supported such that its outer half is found on the outer side of the guide rail 550 while its lower half is found on the inner side of the guide rail 550 (see FIG. 23).

The frame 510 includes a plurality of section frames 5111 and a feeder frame 5112 (see FIG. 22).

The section frames 5111 each has a plurality of stackers 5113, in which transport articles 5101 discharged from the transport boxes 520 are stacked. The feeder frame 5112 has a feeder 513 for feeding transport articles 5101 via the belt to the transport box 520.

Generally, the stackers 5113 and the feeder 513 are disposed in a straight transport part of the transport box 520.

The operation of the transporter/sorter 500 will now be described.

Transport articles 5101 (i.e. postal matter, mainly post cards and small envelopes) are transported one by one from the feeder frame 5112 via the belt 514 to the feeder 513. Then, each transport article 5101 is thrown into a predetermined transport box 520 by the feeder 513.

The transport boxes 520 are transported at a constant speed by a drive means (not shown) for moving the chain conveyor 560. In the transporter/sorter 500, as shown in FIG. 23, the transport boxes 520 are spaced apart at a constant pitch (pitch L3=pitch L4). That is, the pitch of the transport boxes 520 are set to L4, at which the inner halves of adjacent transport boxes 520 do not interfere (i.e., are not in contact) with one another in the curved portions of the guide rail 550.

The transport articles 5101 which are transported in each transport box 520 are discharged into predetermined stackers 5113 in the section frames 5111 for different destinations, respectively. In other words, the transporter/sorter 500 sorts out the transport articles 5101 during transport thereof for different destinations, respectively.

Another example of a conventional transporter/sorter will be described with reference to FIGS. 25-27.

FIG. 25a is a schematic plan view of a conventional transporter/sorter and FIG. 25b is a schematic front view of such transporter/sorter.

In FIGS. 25a and 25b, the prior art transporter/sorter 500 comprises a frame 510, a guide rail 550 of an endless loop having straight portions and curved portions and also provided in the frame 5110, and a plurality of transport boxes 520 depending from the guide rail 550 so as to travel in circulation along the endless loop path.

The frame 5110 comprises a plurality of section frames 5111 and four feeder frames 5112. The section frames 5111 are provided with a plurality of stackers 5113 for stacking transport articles 5101 discharged from the transport boxes 520. On the other hand, the feeder frames 5112 comprise feeder frames 512 for feeding stacked transport articles 5101 one by one, belts 514 for transporting the fed transport articles 5101, and feeding means 513 for transporting the fed transport articles 5101 to the transport boxes 520.

It is to be noted that the stackers 5113 and the feeding means 513 are generally disposed at the straight transport portions for the transport boxes 520. The transport articles 5101 maybe post cards, documents, magazines, books, CD cases, etc., but not limited thereto.

FIG. 26a is a schematic front view of the prior art transport box, while FIG. 26b is a schematic side view of the prior art transport box as seen from the outside thereof.

In FIGS. 26a and 26b, the transport box 520 is a generally rectangular box and comprises four accommodating chambers 5121 divided by partitioning plates 5122 at an equal spacing. As best shown in FIG. 26b, the transport box 520 is a parallelogram that is projecting in the transport direction at the top as seen from the side. With this arrangement, the transport articles 5101 can be discharged smoothly.

Additionally, the transport box 520 is depending from the guide rail 550 by way of inter-coupled transport wagons (not shown). The transport boxes 520 are supported onto the guide rail 550 in such a manner that the center of gravity of each transport box 520 is immediately below the guide rail 550 as seen from the top.

Each of the transport boxes 520 is formed with a feeding port 5123 on the side face in the outer direction through which the transport articles may be thrown.

Each of the accommodating chambers 5121 is made to have a constant width W in the transport direction over the entire area as seen from the front. Accordingly, the width in the transport direction of the feeding space 5124 which is used when the transport articles 5101 are fed is also W (constant) over the entire area as seen from the front.

The transport boxes 520 are formed with a revolving bottom lid 518 at the bottom of each accommodating chamber 5121 as discharging means for the transport articles 5101.

The bottom lid 518 is pivotally supported at both ends in such a manner that the bottom lid 518 is in the open state (see the solid arrow in FIG. 26b) by spring bias of a coil spring 581. On the other hand, the bottom lid 518 is kept in the closed state by engagement of a notch 582 with an engaging plate 583 when it is closed.

Also, the engagement plate 583 is coupled to an abutment plate 584 which is pivotally supported in a biased in the closed state (see the dotted arrow in FIG. 26b) by an elastic member such as a coil spring or the like (not shown).

The bottom lid 518 is arranged so that, when the transport box 520 is transported over a predetermined stacker 5113, a pin 586 of a solenoid 585 (see FIG. 26a) disposed in the inward orientation projects for a short time, thereby allowing the abutment plate 584 to revolve. Such revolution also allows the engagement plate 583 to revolve, thereby opening the biased bottom lid 518 and maintaining such state.

Moreover, when the transport box 520 passes the last stacker 5113, the bottom lid 518 in the open state is in contact with a bottom plate (not shown) disposed at the lower portion of the transport box 520, thereby revolving the bottom lid 518 in the closing direction. When the bottom lid 518 is closed, the notch 582 engages with the engagement plate 583 and the bottom lid 518 remains in the closed state.

It is to be noted, however, that the discharging means is not limited to the above configuration comprising the bottom lid 518.

As shown in FIG. 27, the feeding means 513 comprises, for example, two belts 5132, 5133 which run over a plurality of rollers 5134 for transporting the transport articles 101 therebetween, a roller 5135 provided at the end portion in the transport direction, and swinging means (not shown) for swinging the feeding means 513 in response to the transport speed and timing of the transport box 520. With this arrangement, since the feeding means 513 swings the transport box 520 in harmonize with the transport speed and timing of the transport box 520, it is possible to extend the feeding time (from the start of feeding to the completion of feeding).

Now, the operation of the transporter/sorter 500 as sown in FIGS. 25-27 will be described.

The transporter/sorter 500 transports the transport articles 5101 which are fed by the belts 514 of the feeder 512 one by one to the feeding means 513. Then, the feeding means 513 feeds the transport articles 5101 to the predetermined accommodating chamber 5121. It is to be noted that, in general, the most upstream (or a first) feeding means 513 feeds the transport articles 5101 to the leading (or a first) accommodating chamber 5121 in the transport direction. Then, the subsequently downstream (second, third and fourth) feeding means 513 feed the transport articles 5101 to the sequential (second, third and fourth) accommodating chambers 5121.

FIG. 27 is cross section views seen from the top for describing the feeding operation of the prior art feeding means, wherein FIG. 27(a) is a schematic view when the feeding is started, FIG. 27(b) is a schematic view on the half way of feeding operation, FIG. 27(c) is a schematic view when the feeding operation has been completed and FIG. 27(d) is a schematic when it is in preparation for feeding.

In FIG. 27(a), the feeding means 513 swings by the swinging means in such a manner that the velocity component at the end portion where the transport articles 5101 are pushed out is substantially equal to the transport speed of the transport box 520. And the transport articles 5101 are fed by the two belts 5132, 5133. It is to be noted that the feeding start time is when a leading end of a transport article 5101 reaches the feeding port 5123.

Then, in FIG. 27(b), the feeding means 513 continues to swing, thereby feeding the transport article 5101 into the feeding space 5124 in the accommodating chamber 5121. As shown in FIG. 27(c), the feeding means 513 continues to swing and feeding until the tail end of the transport article 101 reaches the feeding port 5123. The completion time of feeding is the time when the tail end of the transport article 5101 has reached the (the last) feeding port 5123.

Upon completion of the feeding, the feeding means 513 decreases the swinging speed and stops. Subsequently, the feeding means 513 swings in the opposite (returning) direction and stops to resume the ready condition in preparation for the next feeding as shown in FIG. 27(d).

It is to be noted that the transport articles 5101 are thrown into the feeding spaces 5124 from the feeding ports 5123 in substantially horizontal direction and fall downward by colliding with inner side plates 5125. And the fallen transport articles 5101 are clamped by the outer side plate 5126 (see FIG. 26b) so that they do not jump out of the feeding ports 5123.

Then, the transporter/sorter 500 transport the transport boxes 520 in which the transport articles 5101 are fed along the guide rail 550 to the section frames 5111 by driving means (not shown) And the transporter/sorter 500 opens the bottom lids 518 for discharging the transport articles 5101 into the respective stackers 5113 depending on their destinations. That is, the transporter/sorter 500 can classify the transport articles 5101 to their destinations while being transported.

Incidentally, let the width of each accommodating chamber 5121 in the transport direction be W and the thickness of the transport article 5101 in the transport direction be t as shown in FIG. 26b, the gap Δ of the feeding spaces 5124 in the transport direction is Δ=W−t (mm).

Transport density of the transport boxes 520 is given by t/W (%) on the assumption that the thickness of the partitioning plates 5122 is negligible small.

Furthermore, the feeding time required for stably feeding the transport articles 5101 is proportional to Δ and counter proportional to the transport speed v of the transport boxes 520.

As understood from the above relationship, if the transport density is increased in order to improve the transport capacity of the transport boxes 520, Δ decreases and thus reducing the feeding time, thereby decreasing feeding stability. Similarly, if the transport speed v is increased in order to improve the processing capacity of the transporter/sorter 500, Δ decreases and thus reducing the feeding time, thereby decreasing feeding stability.

On the other hand, if the feeding speed of the feeding means 513 is made constant, since the feeding time increases as the length of the transport article 5101 in the feeding direction becomes longer, it is necessary to increase the gap $\Delta$ in the transport direction or decrease the transport speed v.

Since the transporter/sorter 500 can improve processing capacity by increasing the transport density, various techniques have been developed. Japanese patent publication no. 2003-237926 discloses techniques of a transporter/sorter of variable transport box pitch type.

In this transporter/sorter, a transport box pitch varying mechanism for varying the pitch of transport boxes is provided at the boundaries between straight and curved portions of an endless loop path. The density of mounting of transport boxes in the straight portions thus can be increased, and the transfer speed in the straight portions can be held at a minimum necessary value. With this arrangement, without reduction of the transport article processing capacity, it is possible to ensure stable operations of feeding and discharging transport articles.

Although the variable pitch type transporter/sorter could increase the processing capacity by realizing higher transport density at the straight portions, the market demands are to provide further improvement on the processing capacity. However, in the high density transport, the adjacent transport boxes are almost in contact with one another. In order to further increase the processing capacity of the transporter/sorter, it is required to reduce the gap $\Delta$ of the accommodating chambers in the transport direction or to increase the transport speed v of the transport boxes.

However, the prior art transporters/sorters as described hereinabove have the following problems.

In the prior art transporter/sorter 500 shown in FIGS. 22(a), 22(b) and 23, the transport wagons 530 undergoing excursion along the endless loop path hang the transport boxes 520 at the top center part thereof at a constant interval for the transport of the transport boxes 520. While the minimum pitch L4 is set, at which adjacent transport boxes 520 do not interfere with one another in the curved portions of the endless loop path of the transporter/sorter 500, in the straight portions the pitch L3 of the transport boxes 520 includes a large gap. This means a sacrifice given to the straight portions with respect to the efficiency of mounting the transport boxes 520, i.e., the transport density. That is, it is impossible to improve the processing capacity of the transport articles 5101 or ensure stable processing operation.

Also, in the transporter/sorter 500 the number of transport articles 5101 processed per unit time depends on the transfer speed of the transport wagons 530. That is, the processing number can be increased depending on the transport speed. However, the transporter/sorter 500 has a drawback that increasing the transport speed gives rise to unstable operations of feeding (i.e., throwing) and discharging transport articles 5101, executed with respect to the transport boxes 520 being transferred, thus leading to reliability deterioration in the operation of processing the transport articles 5101.

As a further drawback of the transporter/sorter 500, reducing the transfer speed to make stable the operations of feeding and discharging the transport articles 5101, reduces efficiency of mounting the transport boxes 520 in the straight portions, thus reducing the unit time process capacity of the transporter/sorter 500.

The transporter/sorter as shown in FIGS. 25-27 has a drawback that the transport articles tend to contact with the partitioning plates of the accommodating chambers at the opposite sides to the transport direction before completion of feeding of the transport articles if the gap $\Delta$ in the transport direction between the adjacent accommodating chambers in the transport box is reduced or if the transport speed v of the transport boxes of the transporter/sorter is increased, thereby causing unstable feeding or failure of feeding.

Particularly, if the transport articles become larger in the feeding direction, the feeding time becomes longer. The extended feeding time is a bottleneck for improving the processing capacity of the transporter/sorter.

On the other hand, the transporter/sorter of variable transport box pitch type as disclosed in the above patent publication has a problem that the transport box pitch varying mechanism is complicated in arrangement and control, and therefore it is impossible to reduce, for instance, the cost of manufacture.

SUMMARY OF THE INVENTION

It is therefore an object of the present invention to solve the above problems and to provide a transporter/sorter, which is simple in arrangement and permits transport articles processing capacity improvement and process operation stabilization.

It is another object of the present invention to provide a transport box and a transporter/sorter having larger width between feeding spaces in the accommodating chamber in the transport direction, thereby increasing the transport density and improving transport capacity while stabilizing the feeding operation of the transport articles.

According to an aspect of the present invention, there is provided a transporter/sorter comprising: a guide rail having straight portions and curved portions and forming an endless loop path; a plurality of transport wagons supported for movement and undergoing excursion along the endless loop path in an inter-coupled state; and transport boxes supported on the transport wagons, respectively, in a state of being found on the outer side of the guide rails.

With this arrangement of the transporter/sorter, it is possible to reduce the pitch of the transport wagons in the curved portions of the guide rail in a range free from contact of adjacent transport boxes with one another. Thus, in the transporter/sorter, the efficiency of mounting transport boxes in the straight portions of the guide rail, and hence the transport capacity can be improved.

By the term "the state of transport boxes found on the outer side of the guide rail" is meant a state that, in the top view, each transport box is fully found on the outer side of the guide rail and also a state that more than about 70 percent (preferably more than 80 percent) of each transport box is found on the outer side of the guide rail.

Particularly, in the case of the state that the transport box is fully found on the outer side of the guide rail, even by minimizing the transport box pitch in the straight parts of the guide rail, the transport boxes can be moved along the curved parts of the guide rail without possibility of contact of adjacent ones of them with one another. Thus, with a constant transport speed of the transporter/sorter, the transport capacity can be maximized.

According to another aspect of the present invention, there is provided the above transporter/sorter, wherein each of the transport wagons supports the side surface of each transport box on the inner side thereof.

With this arrangement of the transporter/sorter, it is possible to simplify the shape of the support arm of the transport wagon and reduce the cost of manufacture. Also, in the transporter/sorter, the top surface, outer side surface and bottom surface of the transport box can be utilized for feeding and discharging transport articles. Thus, it is possible to improve the degree of design freedom.

According to another aspect of the present invention, there is provided the above transporter/sorter, wherein each of the transport boxes has a shock-absorbing member provided on the front or rear surface.

For example, in the case where the transport wagons in the transporter/sorter are moved at a high speed, the front face of a transport box moving from the curved portion to the straight portion of the guide rail may collide with the rear face of the transport box moving ahead. Even in such a circumstance of the transporter/sorter, the shock-absorbing member will absorb the shock of collision, thus preventing such undesired happenings as noise generation and breakage of the transport boxes.

According to a further aspect of the present invention, there is provided the above transporter/sorter, wherein each of the transport boxes has a plurality of accommodating chambers.

With this arrangement of the transporter/sorter, each transport wagon can transport a plurality of transport articles, thereby reducing the cost of manufacture.

According to a still further aspect of the present invention, there is provided the above transporter/sorter, wherein each of the transport boxes is supported in an inclined state in the progress direction or the counter-progress direction.

With this arrangement of the transporter/sorter, it is possible to transport plate-like transport articles accommodated in the transport boxes in a stable state.

Particularly, in the case where each transport box in the transporter/sorter has a discharging port provided at the bottom, each transport box is preferably supported in a state that it is slanted in the progress direction. With this arrangement, transport articles are discharged to the side opposite the progress direction, and thus they can be discharged smoothly.

According to a further aspect of the present invention, there is provided the above transporter/sorter, wherein the guide rail has a rail groove formed on the side surface of the outer side.

With this arrangement of the transporter/sorter, the overhung extent of the cantilever support of the transport box can be reduced. Thus, it is possible to reduce the mechanical load and improve the durability.

In the transporter/sorter according to the present invention, even by setting a minimum transport box pitch in the straight parts of the guide rail, in the curved parts of the guide rail the transport boxes can be moved without possibility of contact of adjacent ones of them with one another. With this arrangement of the transporter/sorter, with a constant transfer speed it is possible to maximize the transport capacity and also stabilize the operations of feeding and discharging transport articles.

According to an aspect of the present invention, there is provided a transport box for receiving transport articles fed from a feeding port of an accommodating chamber, wherein the transport-direction width of a feeding space in the accommodating chamber increases toward the feeding port.

With this arrangement, when the feeding means feeds a transport articles while swinging, the transport direction gap in the feeding space is increased. Thus, it is possible to increase the feeding time.

According to another aspect of the present invention, there is provide the above mentioned transport box, wherein the transport box has two or more accommodating chambers, and feeding ports for adjacent accommodating chambers are provided at the opposite sides.

With this arrangement, it is possible to increase the transport density by making effective use of the space-saved feeding space.

According to another aspect of the present invention, there is provided a transport box for receiving transport articles fed from a feeding port of an accommodating chamber, comprising: a feeding accommodating part provided in an upper part of the accommodating chamber and having a feeding space with a large transport-direction width; two or more discharging accommodating parts disposed in a lower part of the accommodating chamber and partitioned from one another in the transport direction; and a guide means for selectively causing the transport articles fed to the feeding accommodating part to fall into predetermined one(s) of the discharging accommodating parts.

With this arrangement, it is possible to ensure stable feeding operation and increase the transport density, thus improving the transport capacity.

According to a further aspect of the present invention, there is provided a transport box for receiving transport articles fed from a feeding port in an accommodating chamber, comprising: a first accommodating chamber disposed in an upper part of the transport box and having a feeding accommodating part formed with a feeding space having a large transport-direction width and a discharging accommodating part disposed in an upper part of the feeding accommodating part and having a transport-direction width smaller than the transport-direction width of the feeding space, the transport articles being accommodated in or passing through the discharging accommodating part; and a second accommodating chamber disposed side-by-side with the discharging accommodating part in the first accommodating chamber and having a feeding space larger than the transport-direction width.

With this arrangement, it is possible to ensure stable feeding operation and increase the transport density with the accommodating part for discharging in the first accommodating chamber.

According to a still further aspect of the present invention, there is provided a transport box for receiving transport articles fed from feeding ports in accommodating chambers, comprising: one or more partitioning members each partitioning adjacent ones of the accommodating chambers and revolved to increase the transport-direction width of the feeding spaces in the accommodating chambers; and revolving means for selectively causing the partitioning members to revolve.

With this arrangement, by causing revolution of the partitioning members, it is possible to selectively increase the transport direction width of the feeding space, ensure stable feeding operation and increase the transport density.

According to a further aspect of the present invention, there is provided either one of the above transport box, wherein the transport-direction width of the feeding spaces in the accommodating chambers is different depending on the transport articles.

With this arrangement, transport articles can be fed to the accommodating rooms in the best feeding spaces in dependence on the thickness or transport direction dimension of the transport articles. Thus, it is possible to ensure stable feeding operation and increase the transport density.

According to a further aspect of the present invention, there is provided the above transport box, wherein each of the accommodating chambers has a discharging means for discharging the fed transport articles.

With this arrangement, it is possible to automatically discharge and sort out transport articles.

According to a further aspect of the present invention, there is provided a transporter/sorter comprising a frame having a sorting-out frame and a feeding frame, a guide rail provided inside the frame and in the form of an endless loop having straight portions and curved portions, and a plurality of transport boxes hung from the guide rail and undergoing excursion along the endless loop path, wherein: the transport boxes are either one of the above mentioned transport boxes.

With this arrangement, the transport density can be increased. Thus, it is possible to improve the process capacity of the transporter/sorter, ensure stable feeding operation and improve the yield factor of the transporter/sorter.

With the transport box according to the present invention, by increasing the transport direction width of the feeding space in the accommodating room, it is possible to ensure stable operation of feeding transport articles and also increase the transport density to improve the transport capacity.

According to an aspect of the present invention, there is provided a transporter/sorter comprising a plurality of transport boxes undergoing circulation along an endless loop path and feeding units for feeding transport articles to the transport boxes, wherein each of the feeding units comprises: a feeding means for feeding transport boxes to each transport box, and a parallel-driving means for driving the feeding means in parallel with the transport box.

With this arrangement, since the transport time can be extended, it is possible to ensure stable feeding operation, reduce the transport direction gap $\Delta$ of the accommodating chamber in the transport box and increase the transport speed v of the transport boxes, thereby improving the process capacity.

According to another aspect of the present invention, there is provided the above transporter/sorter, wherein the feeding means comprises: a receiving space for receiving the transport articles while being driven by parallel-driving; and a transport belt provided between a receiving side and a discharging side of the receiving space and transporting the received transport articles to the discharging port side.

With this arrangement, the feeding means can reliably receive transport articles even by being driven by the parallel-driving.

According to another aspect of the present invention, there is provided the above transporter/sorter, wherein the feeding means is provided with a discharging belt for discharging the transport articles.

With this arrangement, it is possible to reliably discharge transport articles without causing damage thereto.

According to a further aspect of the present invention, there is provided the above transporter/sorter, wherein the feeding means comprises: a receiving space for receiving the transport articles while being driven by parallel-driving; and a transporting/discharging belt provided between a receiving port side and a discharging port side of the receiving space and serving to transport the received transport articles to the discharging port side and discharge the transport articles.

With this arrangement, it is possible to permit common use of the belt, thereby reducing the cost of manufacture.

According to a still further aspect of the present invention, there is provided the above transporter/sorter, wherein the feeding means comprises: a parallel-driving guide forming an endless loop path; and a plurality of parallel-driving wagons supported for movement on the parallel-driving guide rail, and undergoing excursion along the endless loop path and supporting the feeding means in an inter-coupled state.

With this arrangement, the feeding means can be continuously driven by parallel driving along the endless loop path, thereby increasing the parallel-driving speed and readily controlling the parallel-driving speed and timing.

According to a further aspect of the present invention, there is provided the above transporter/sorter, wherein the parallel-driving guide rail has a parallel-driving feeding area constituted by a straight portion.

With this arrangement, it is possible to simplify the arrangement of the parallel-driving means and reduce the cost of manufacture.

According to a further aspect of the present invention, there is provided the above transporter/sorter, wherein the discharging belt or the discharging port side thereof is revolved in the parallel-driving direction upon reception of an external force.

With this arrangement, even in the case when the feeding means passes through the parallel-driving feeding area with the transport article found to be on both the transport box and the feeding means, it is possible to prevent undesired damage caused to the transport article.

The transporter/sorter according to the invention permits, by feeding the transport article while driving the feeding means in parallel with the transport box, to ensure stable transport article feeding operation, increase the transport speed and increase the transport density, thereby improving the process capacity.

According to an aspect of the present invention, there is provided a trolley type transporter/sorter comprising: an outer and an inner guide rails facing each other and disposed side-by-side in the horizontal direction and forming an endless loop path; and a plurality of transport boxes supported for movement on the outer and inner guide rails and undergoing circulation along the endless loop path in an inter-coupled state for revolution on the inner side of the endless loop path.

With this arrangement, even by minimizing the pitch of the transport boxes in the straight portions of the endless loop path, the transport boxes can be moved along the curved paths of the endless loop path with no possibility of contacting adjacent boxes. Thus, it increases the transport density of the transporter/sorter, and improves the transport capacity. Also, since the transport boxes are supported on the outer and inner guide rails, it improves the support load and transports heavy transport articles.

According to another aspect of the present invention, there is provided the above trolley type transporter/sorter, wherein each of the transport boxes has feeding rollers rolling on the outer and inner guide rails.

With this arrangement, the transport boxes can be supported on the outer and inner guide rails in a stable state.

According to another aspect of the present invention, there is provided the above trolley type transporter/sorter, wherein each of the transport boxes has partitioning members for partitioning the accommodating chamber and a revolving means for revolving the partitioning members to increase the transport-direction width of a feeding space in the accommodating chamber.

With this arrangement, it is possible to selectively increase the transport-direction width of the feeding space, thereby ensuring stable feeding operation and increasing the transport density.

According to a further aspect of the present invention, there is provided the above trolley type transporter/sorter, wherein the revolving means is locked at a predetermined position in a state that the partitioning members are biased in the transport direction.

With this arrangement, it simplifies the partitioning plate revolving means and reduces the cost of manufacture.

According to a still further aspect of the present invention, there is provided the above trolley type transporter/sorter, wherein the revolving means comprises a coupling member for rotatably coupling the partitioning members, and an upper roller and a lower roller for vertically clamping the support rail and rotatably supporting the partitioning members.

With this arrangement, it is possible to cause revolution of the partitioning members and further support the transport boxes by a multi-point support.

According to a further aspect of the present invention, there is provided the above trolley type transporter/sorter, wherein the support rail is upwardly curved with respect to the feeding means.

With this arrangement, when transporting the transport boxes to a position corresponding to the feeding means, the partitioning members can be automatically opened, thereby readily and reliably controlling the revolution of the partitioning members.

According to a further aspect of the present invention, there is provided the above trolley type transporter/sorter, wherein the support rail comprises an outer guide rail and an inner guide rail.

With this arrangement, the partitioning members can be supported on the outer and inner rails for revolution.

The trolley type transport box according to the invention minimizes the pitch of the transport boxes in the straight portions of the endless loop path and improves the transport capacity. Also, since the transport boxes are supported on the outer and inner guide rails, it is possible to improve the support load and transport heavy transport articles.

Furthermore, by increasing the transport-direction width of the feeding spaces in the feeding chambers, it is possible to stabilize the article feeding operation.

Other objects and features of the present invention will be clarified from the following description with reference to attached drawings.

BRIEF DESCRIPTION OF THE DRAWINGS

FIG. 3a is a schematic front view showing an essential part of the first embodiment of the transporter/sorter according to the present invention;

FIG. 4b is a schematic cross section view taken along line A-A in FIG. 4a;

FIG. 5 is a schematic sectional view for describing an example of operation of transport article feeding to the first embodiment of the transport boxes of the present invention;

FIG. 7a is a schematic side view showing the second embodiment of the transport box according to the present invention, with a showing of the feed of transport articles from the first and the second feeders;

FIG. 7b is a schematic side view showing the second embodiment of the transport box according to the present invention, with a showing of the falling of the fed transport articles into the forward accommodating part for feeding;

FIG. 7c is a schematic side view showing the second embodiment of the transport box according to the present invention, with a showing of the feed of transport article from the third and the fourth feeders;

FIG. 7d is a schematic side view showing the second embodiment of the transport box according to the present invention, with a showing of the falling of the fed transport articles into the rearward accommodating part for feeding;

FIG. 9c is a fragmentary enlarged schematic cross section view for describing the revolving operation of the partitioning member in the fourth embodiment of the transport box according to the present invention;

FIG. 10b is a schematic cross section view taken along line B-B in FIG. 10a;

FIG. 12b is a schematic cross section view taken along line A-A in FIG. 12a;

FIG. 12c is an enlarged schematic view as seen from the direction B in FIG. 12a;

FIG. 13 is schematic views of the feeding member in FIG. 12 for describing feeding steps of transport articles;

FIG. 14 is a schematic view of feeding means as an application of the transporter/sorter in FIG. 12;

FIG. 15a is a schematic plan view of a third embodiment of the transporter/sorter according to the present invention;

FIG. 15b is a schematic front view of the transporter/sorter in FIG. 15a;

FIG. 16a is a schematic front view of a fifth embodiment of the transport box for transporter/sorter according to the present invention;

FIG. 16b is a schematic side view of the transport boxes in FIG. 16a;

FIG. 17 is an enlarged schematic view of a part A in FIG. 16a;

FIG. 20b is a schematic side view of the transport box for transporter/sorter in FIG. 20a;

FIG. 25b is a schematic front view of the transporter/sorter in FIG. 25a;

FIG. 27 is cross section views of the feeding means as seen from the top for describing the feeding steps, wherein (a) is a schematic view at the start of feeding, (b) is a schematic view on the half way of feeding, (c) is a schematic view when feeding has been completed, and (d) is a schematic in preparation for next feeding.

PREFERRED EMBODIMENTS OF THE INVENTION

Preferred embodiments of the transporter/sorter and transport box according to the present invention will now be described with reference to the drawings.

Figure 1A:
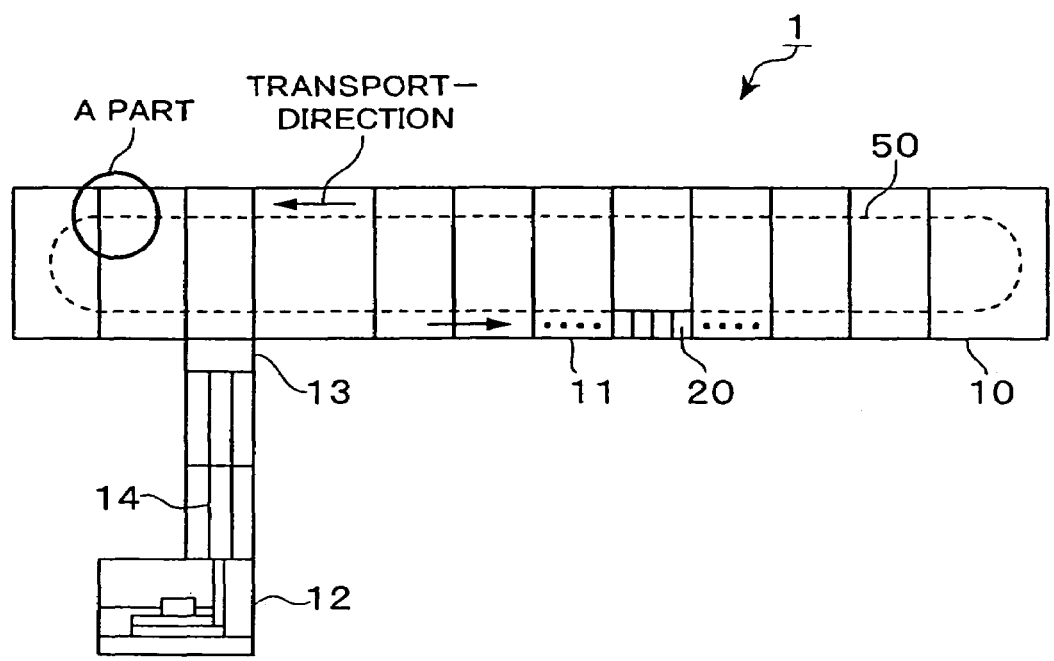
FIG. 1(a) and 1(b) are schematic views showing a first embodiment of the transporter/sorter according to the present invention, FIG. 1(a) being a plan view and FIG. 1(b) being a front view.
Figure 1B:
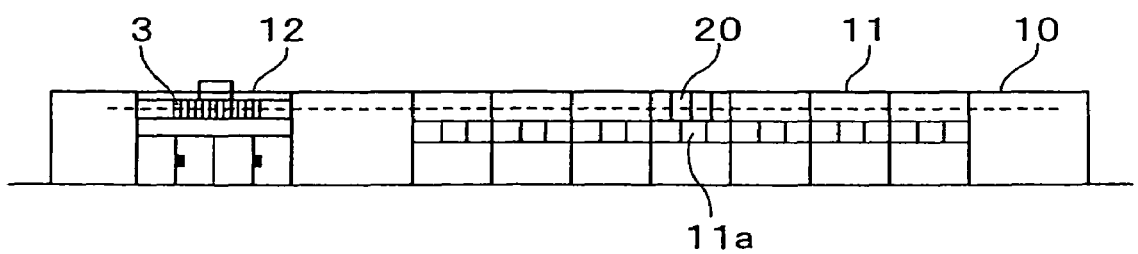
Figure 2:
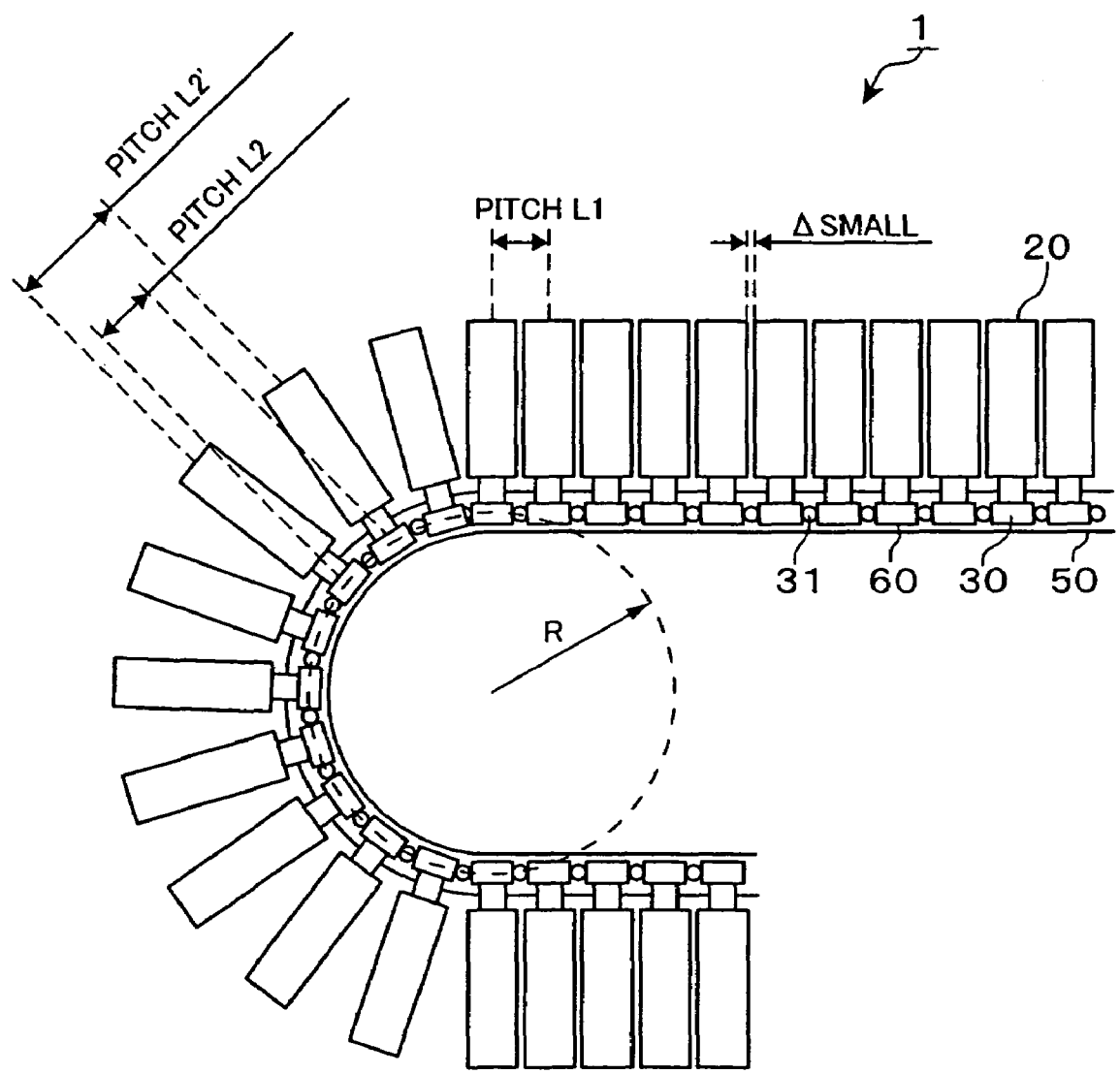
FIG. 2 is an enlarged schematic view showing a part A in FIG. 1(a)

FIGS. 1(a) and 1(b) are schematic views showing a transporter/sorter according to a first embodiment of the present invention, FIG. 1(a) being a plan view and FIG. 1(b) being a front view. FIG. 2 is an enlarged schematic view showing a part A in FIG. 1(a).

Referring to FIGS. 1(a) and 1(b), the illustrated transporter/sorter 1 is different from the above prior art transporter/sorter 500 in that, it comprises a plurality of transport wagons 30 supported on a guide rail 50 for undergoing excursion along an endless loop path and transport boxes 20 with a side face thereof hung by the transport wagons 30. The other constituent elements are substantially the same as in the prior art transporter/sorter 500. Accordingly, the constituent elements in FIG. 1 similar to those in FIG. 22 have the same reference numerals and detailed descriptions thereof are abbreviated herein.

Figure 3B:
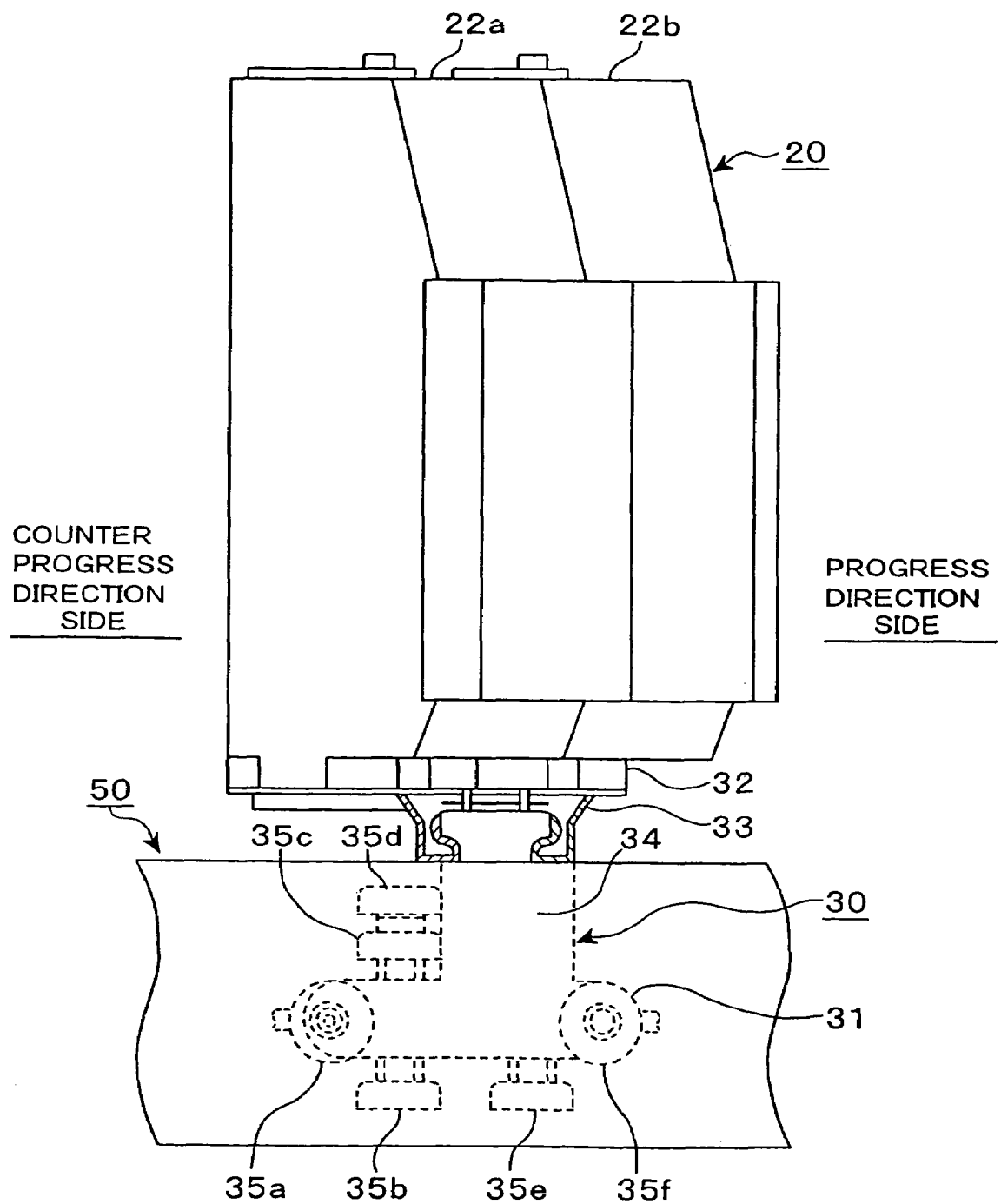
FIG. 3b is a schematic top view showing an essential part of the first embodiment of the transporter/sorter according to the present invention.
Figure 3C:
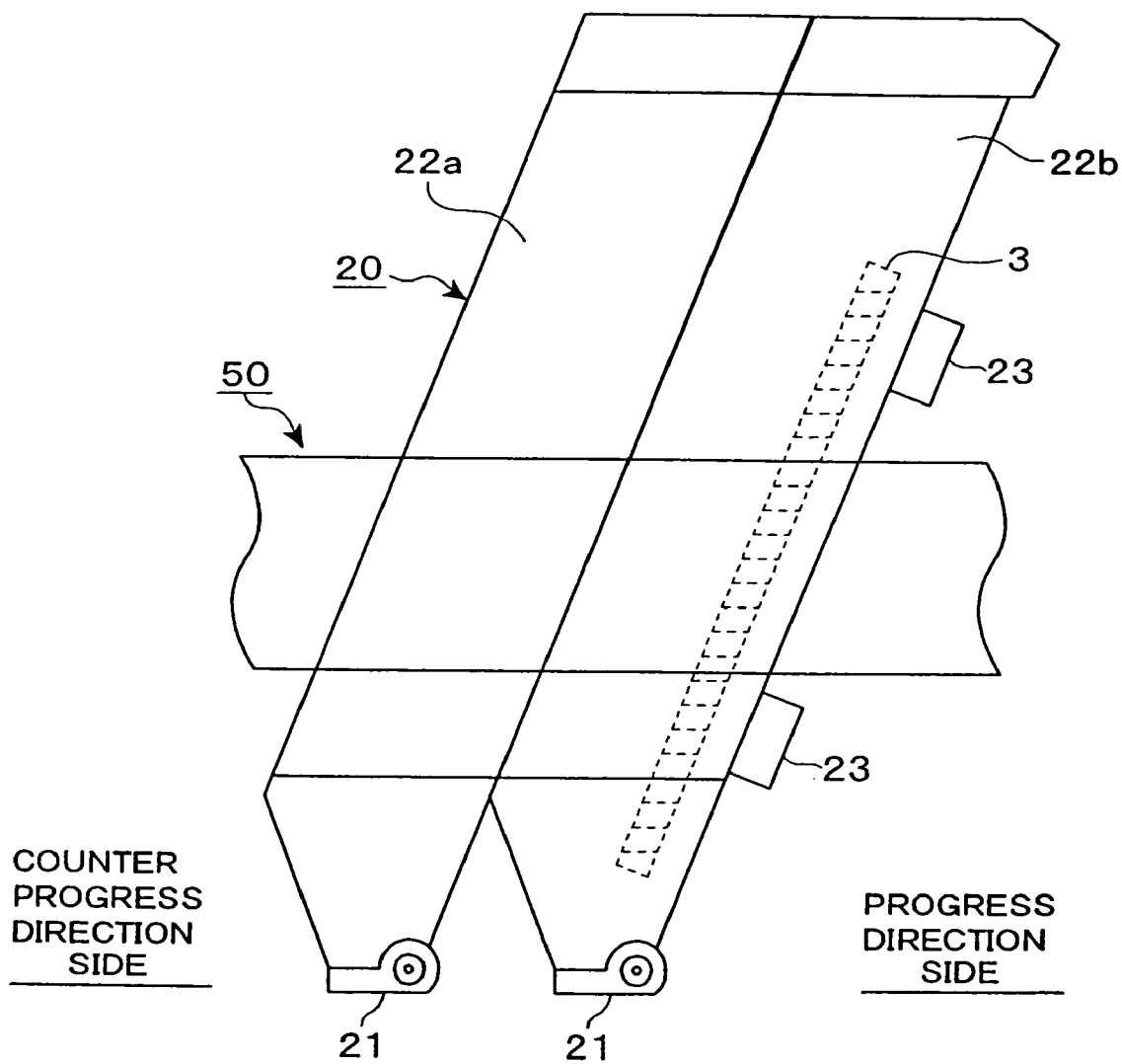
FIG. 3c is a schematic side view showing an essential part of the first embodiment of the transporter/sorter according to the present invention.

FIG. 3a is a schematic front view showing an essential part of the first embodiment of the transporter/sorter according to the present invention. FIG. 3b is a schematic top view showing an essential part of the embodiment of the transporter/sorter according to the present invention. FIG. 3c is a schematic side view showing an essential part of the embodiment of the transporter/sorter according to the present invention.

Referring to FIGS. 3a-3c, each transport box 20 is a substantially rectangular box accommodating transport articles 3, which are large rectangular plate-like envelopes. The transport box 20 has a feeder port (not shown) formed in faces of the top and outer side (i.e., outer side of the guide rail 50) for feeding transport articles 3.

The transport box 20 has accommodating chambers 22a and 22b, each having the bottom provided with a rotary bottom lid 21 for discharging transport articles 3 downward.

The transport articles 3 may be documents, magazines, books, CD cases, etc. greater in size than a post card, but this is by no means limitative.

The transport boxes 20 are supported in a state that they are entirely found on the outer side of the guide rail 50. With this arrangement of the transporter/sorter 1, it is possible to reduce the pitch of the transport wagons 30 in the curved portions of the guide rail 50 in a range that adjacent transport boxes do not contact with one another.

Particularly, in this embodiment all the transport boxes 20 are found to be on the outer side of the guide rail 50. With this arrangement, even by setting the pitch L1 of the transport boxes 20 in the straight parts of the guide rail 50 to the minimum value, the transport boxes 20 can be moved along the curved portions of the guide rail 50 without possibility of contacting with adjacent boxes (see FIG. 2). Thus, when the transport speed in the transporter/sorter 1 is constant, the transport capacity can be maximized.

In the transporter/sorter 1, in the straight and curved portions of the guide rail 50 the pitch of the transport boxes 20 is made constant (pitch L1=pitch L2) Also, in the straight parts of the guide rail 50, the pitch L1 of the transport boxes 20 includes a small gap Δ SMALL. However, the gap Δ SMALL is very small, permitting improvement of the efficiency of mounting the transport boxes 20 in the straight portions of the transporter/sorter 1 and also permitting improvement of the transport density.

In the transporter/sorter 1, each of the transport boxes 20 is provided, at the front face, with a substantially plate-like shock absorber 23 of rubber or the like elastic material (see FIGS. 3a and 3b). When the transport wagons 30 in the transporter/sorter 1 are moved at a high speed, the front face of a transport box 20 moving from the curved portion to the straight portion of the guide rail 50 may collide with the rear face of the transport box 20 moving ahead. However, with the above arrangement the shock absorber 23 will absorb the shock of collision. It is thus possible to prevent such undesired happenings as noise generation and breakage of transport boxes 20.

Each transport box 20 has a mounting member 32 secured to its side face on the inner side (i.e., the inner side of the guide rail 50) for its mounting on the associated transport wagon 30, that is, for its support in cantilever support by a support arm of the transport wagon 30. With this arrangement, it is possible to simplify the shape of a support arm 33 of the transport wagon 30 and reduce the cost of manufacture.

Since the transport boxes 20 are supported by cantilever support, the transporter/sorter 1 can be called as side support transporter/sorter.

In this embodiment, each of the transport boxes 20 has two accommodation chambers 22a and 22b so as to be able to accommodate two transport articles 3 at a time. With this arrangement, one transport wagon 30 can transport two transport articles 3 at a time, and it is possible to reduce the equipment cost.

The accommodation chambers 22a and 22b may not be limited to two but may be more than two.

Each of the transport boxes 20 is supported in a state that its upper part is slanted by about 20 degrees from the vertical toward the progress direction (see FIG. 3c). With this arrangement of the transporter/sorter 1, plate-like transport articles 3 accommodated in the transport boxes 20 can be transported in a stable state, and can also be discharged smoothly because they are discharged rearward and downward.

While the transport articles 3 are assumed to have substantially rectangular plate-like shapes such as large home-distributed envelopes, such shapes are by no means limitative.

Each of the transport wagons 30 includes a base 34 having a hook-shape in the top view, a plurality of roller bearings 35a-35f provided on the base 34, a mounting member 32 mounted on the transport box 20 and the support arm 33 for coupling together the mounting member 32 and the base 34.

The roller bearings 35a-35f roll along inner grooves 51 and 52 and a rail groove 54 of the guide rail 50, whereby the transport wagon 30 is movably supported on the guide rail 50.

In this embodiment, each transport wagon 30 is supported on the guide rail 50 by the roller bearing 35a mounted on the bottom on the side opposite progress direction side, the roller bearing 35b mounted inward on the side opposite the process direction side, roller bearings 35c and 35d mounted outward on the side opposite the progress direction side, the roller bearing 35e mounted inward on the progress direction side and the roller bearing 35f mounted inward in the progress direction side. The roller bearings 35a, 35f also function as joints for coupling together adjacent transport wagons 30, and the coupled transport wagons 30 can be moved along the curved portions in the horizontal and vertical directions.

The above arrangement of the transport wagons 30 is by no means limitative.

The guide rail 50 is a metal rail having the inner grooves 51-53 and the rail groove 54 for supporting the roller bearings 35a-35f of the transport wagon 30.

The transporter/sorter 1 is arranged such that the rail groove 54 is formed on the side face of the outer side of the guide rail 50. With this arrangement of the transporter/sorter 1, it is possible to reduce the overhung extent of the cantilever support of the transport box 20, thus reducing the mechanical load and improving the durability of the roller bearings 35a-35f.

In this embodiment, the guide rail 50 is in the form of an oval loop, but this shape is by no means limitative.

Now, the operation of the sorter/transporter 1 will be described.

Transport articles 3 are transported one by one from the feeder frame 12 via the belt 14 to the feeder 13, and then to predetermined transport boxes 20.

The transport boxes 20 are transported at a constant speed by a driving means (not shown), which drives the chain conveyor 60. As shown in FIG. 2, in the transporter/sorter 1 the pitch of the transport boxes 20 is set to be constant (pitch L1=pitch L2). In the straight portions of the guide rail 50, the pitch L1 of transport boxes 20 includes a small gap Δ SMALL, but the transport boxes 20 are transported by the chain conveyor 60 with substantially zero gap between adjacent boxes. Thus, the efficiency of mounting transport boxes 20 in the straight portions of the guide rail 50, and hence the transport density, is improved.

While transport boxes 20 are transported along the curved portions of the guide rail 50, the orbit of the transport wagons 30 traces the circumference with a radius R. During this time, although the pitch L2 of the transport wagons 30 is not changed, the outer side pitch L2' of the transport boxes 20 is greater than the pitch L1. Thus, the transport boxes 20 pass through the curved portions of the guide rail 50 without interference with one another.

The transport articles 3 transported in the transport boxes 20 are discharged into predetermined stackers 11a in the section frames 11 for individual destinations, respectively. That is, while transporting transport articles 3, the transporter/sorter 1 sorts out the transport articles 3 for individual destinations.

With this arrangement of the transporter/sorter 1, the efficiency of mounting transport boxes 20 in the straight portions of the guide rail 50 is improved to (pitch L3/pitch L1) times as compared to the prior art transporter/sorter 500. Thus, in the transporter/sorter 1, the number of transport articles 3 processed per unit time is increased to (pitch L3/pitch L1) times as compared to the prior art transporter/sorter 500 without increasing the transport speed of the transport boxes 20.

Also, in the transporter/sorter 1, by reducing the transport speed of the transport boxes 20, the operations of feeding and discharging transport articles 3 can be stabilized with the same number of transport articles 3 processed per unit time as in the prior art transporter/sorter 500.

Furthermore, in the transporter/sorter 1, by appropriately adjusting the transport speed of the transport boxes 20 the operations of feeding and discharging transport articles 3 can be stabilized while increasing the number of transport articles 3 processed per unit time as compared to the prior art transporter/sorter 500.

Still further, in the transporter/sorter 1, unlike the transporter/sorter of variable transport box pitch type as disclosed in the above mentioned Japanese patent publication, it is not necessary to provide any transport box pitch varying mechanism at the boundaries between the straight and curved parts of the endless loop path. Thus, it is possible to simplify the arrangement and control and greatly reduce the equipment cost.

Moreover, in the transporter/sorter 1, transport articles 3 can be fed to the transport boxes 20 from the top thereof and discharged downward from the bottom. Thus, it is possible to improve the degree of design freedom.

While only a preferred embodiment of the transporter/sorter according to the present invention has been shown and described, this embodiment is by no means limitative, and various changes and modifications are possible without departing from the scope of the present invention.

For example, while the endless loop path has a single-stage arrangement in the height direction, this arrangement is by no means limitative, and the present invention is applicable as well to endless loop paths with arrangements having two or more stages.

While the transporter/sorter according to the present invention is particularly suited for such transport articles as documents, magazines, books, CD cases, etc., greater in size than a post card, such transporter/sorter for large transport articles is by no means limitative, and the present invention is suitably applicable as well to transporter/sorters for small transport articles such as post cards and small envelopes.

However, by reducing the transport direction gap Δ of the accommodating rooms in the transport boxes of the transporter/sorter or increasing the transport speed v of the transport boxes, before completion of the feeding of transport articles the transport articles will be brought into contact with the partitioning-members on the counter-transport direction side of the accommodating rooms. Therefore, the feeding may be unstable or may not be enabled.

Particularly, with enlarged transport articles with increased transport direction dimension, the feeding time is increased. The increased feeding time poses a problem that the process capacity of the transporter/sorter can not be improved.

To solve the above problem, the present invention has an object of providing a transport box and a transporter/sorter, which permits increasing the transport density and improving the transport capacity, while providing for stable operation of feeding transport articles by increasing the transport direction width of the feeding spaces in the accommodating rooms.

In addition, the transporter/sorter according to the present invention permits improving the process capacity and also ensure stable feeding operation to improve its yield factor.

Now, embodiments of the transport box according to the present invention will be described in greater details with reference to FIGS. 4-10.

Figure 4A:
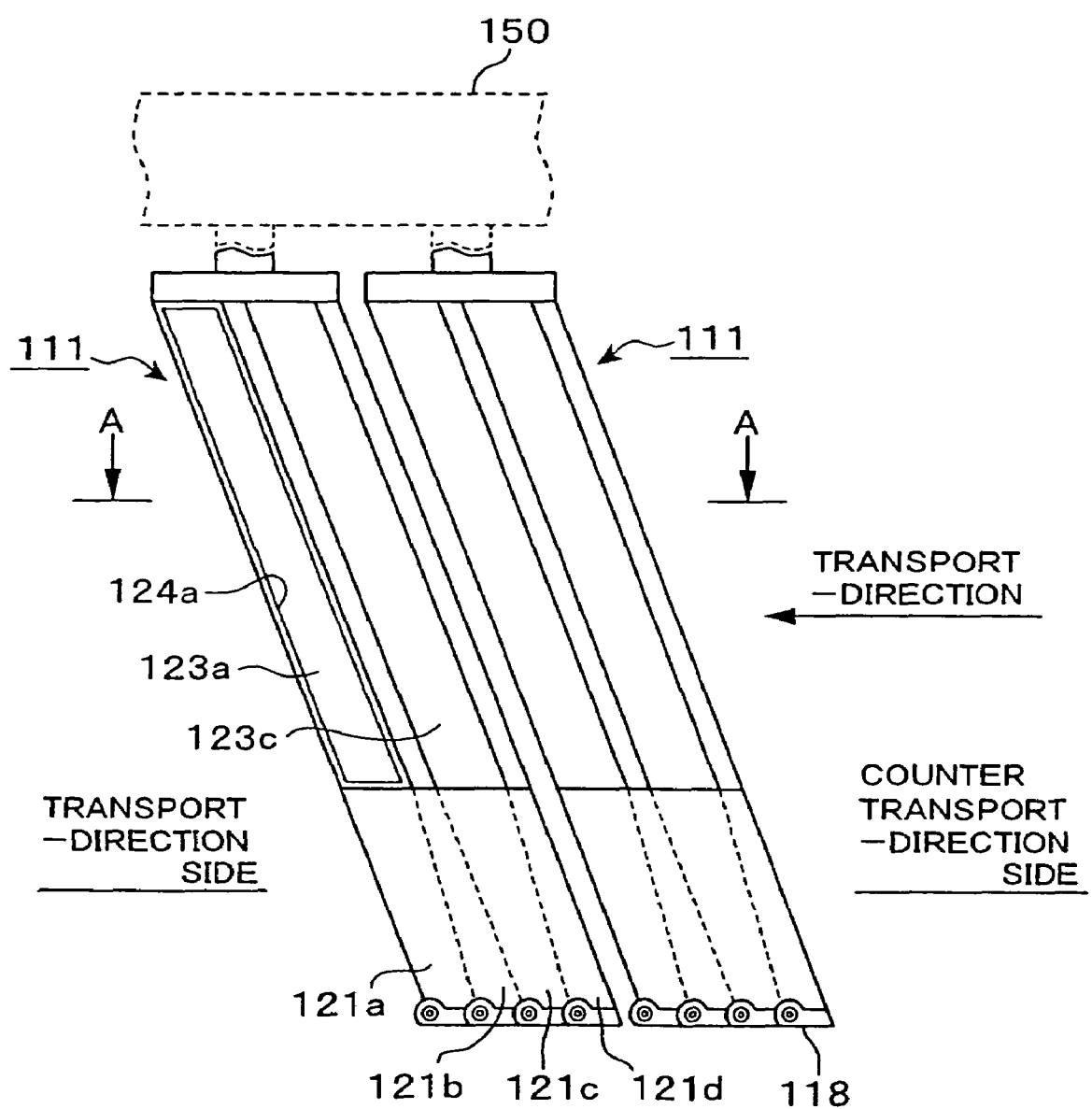
FIG. 4a is an outer schematic side view of a first embodiment of the transport box according to the present invention.
Figure 4B:
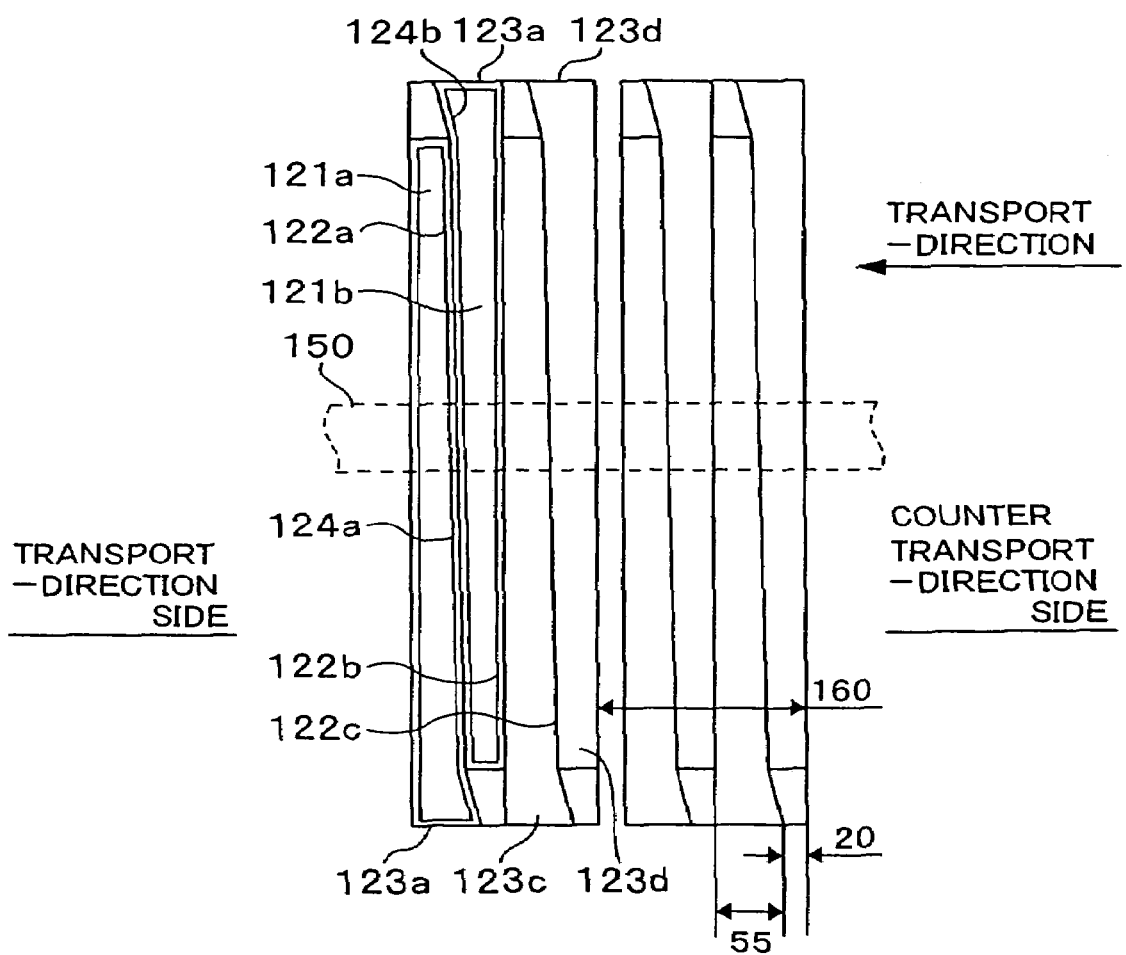

FIG. 4a is an outer side schematic side view showing a first embodiment of the transport box according to the present invention. FIG. 4b is a schematic cross section view taken along line A-A in FIG. 4(a).

Referring to FIGS. 4a and 4b, designated by reference numeral 111 is the transport box, which has a first to a fourth accommodating chambers 121a-121d defined by partitioning members 122a-122c. In this embodiment, the transfer boxes 111 are shown side-by-side for describing their pitch.

As shown in FIG. 4b, in the first accommodating chamber 121a, an end on the inner side of the partitioning member 122a is found on the transport direction side, an end on the outer side of the partitioning member 122a is found on the side opposite the transport direction side, and a feeding port 123a is provided on the outer side. Thus, the width in the transport direction of a feeding space 124a becomes broader toward the feeding port 123a. With this arrangement, when a feeding means 113 feeds a transport article (not shown) with its swinging, a transport direction gap Δ of the feeding space 124a can be effectively increased to extend the feeding time. For example, it is possible to feed a transport article which is elongate in the transport direction without need of reducing the transport speed v.

As shown in FIG. 4b, in the second accommodating chamber 121b, an end on the inner side of the partitioning member 122a is found on the transport direction side, an end on the outer side of the partitioning member 122a is found on the anti-transport direction side, and a feeding port 123b is found on the inner side. The partitioning member 122b is directed right in the transport direction. Thus, the transport direction width of the feeding space 124b becomes broader toward the feeding port 123b. With this arrangement, when the feeding means 113 feeds a transport article (not shown) with its swinging, the transport direction gap Δ of the feeding space 124b can be increased to extend the feeding time. For example, it is possible to feed a transport article elongate in the feeding direction without need of reducing the transport speed v.

In the transport box 111, feeding ports 123a and 123b of the adjacent accommodating chambers 121a and 121b are provided on the opposite sides. With this arrangement, it is possible to utilize the space-saved feeding spaces 124a and 124b to increase the transport density.

The third accommodating chamber 121c has substantially the same arrangement as the first accommodating chamber 121a, and the fourth accommodating chamber 121d has substantially the same arrangement as the second accommodating chamber 121b. The remainder of the arrangement is substantially the same as in the prior art transporter/sorter 520.

FIG. 5 is a schematic cross section view for describing the operation of transport article feeding to the transport boxes according to the first embodiment of the present invention.

Referring to FIG. 5, in each transport box 111, the feeding (or transport) direction of the accommodating chambers 121a and 121c is from the outer to the inner side, and the feeding direction of the accommodating chambers 121b and 121d is from the inner to the outer side. Also, the most upstream side (i.e., the first) feeding means (not shown) feeds transport articles (not shown) to the first accommodating chamber 121a on the side closest to the transport direction side, and then the downstream side (i.e., the second-the fourth) feeding means successively feed transport articles to the anti-transport direction side (i.e., the second, third and fourth) accommodating chambers 121b, 121c, 121d.

In this way, with the transport box 111 of the above arrangement it is possible to extend the feeding time, improve the stability of the feeding operation, and increase the transport density of transport articles, thereby improving the transport capability.

A first example of the present invention relates to the first embodiment of the transport box 111. As shown in FIG. 4b, in this transport box 111, the transport direction width W of the feeding ports 123a-123d is set to about 55 mm, and the transport direction width W1 of the central part of the accommodating chambers 121a-121d is set to about 37.5 (i.e., (55+20)/2) mm. The pitch of the transport boxes 111 is set to about 160 mm.

With this arrangement, the transport direction gap Δ of the transport box 111 is increased by about 17.5 (i.e., W−W1) mm to correspondingly extend the feeding time. It is thus possible to stabilize the feeding operation and increase the transport speed v.

Figure 6:
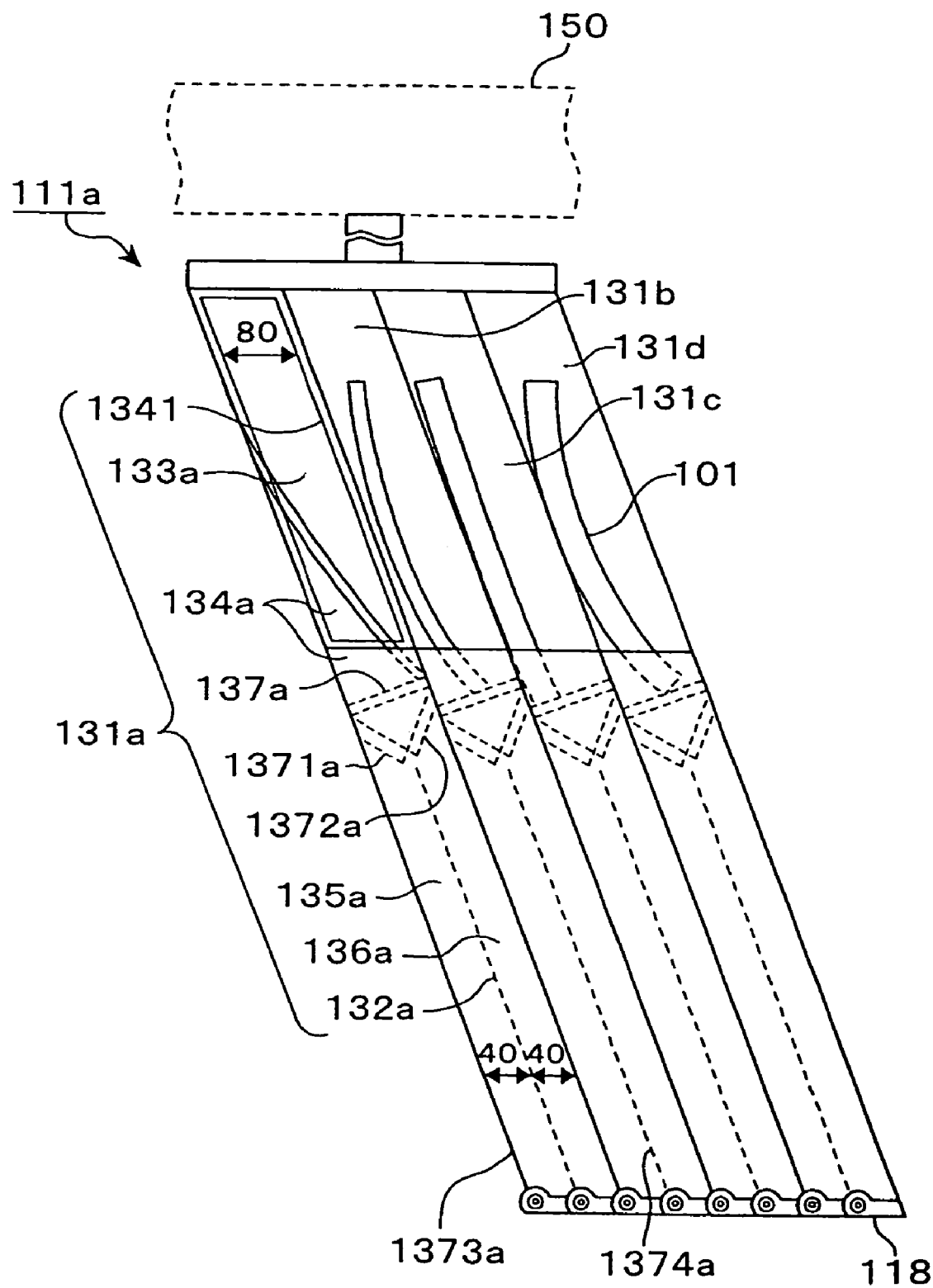
FIG. 6 is a schematic side view for describing the basic arrangement of a second embodiment of the transport box according to the present invention.

Now, FIG. 6 is a schematic side view for describing the basic arrangement of a second embodiment of the transport box according to the present invention.

Referring to FIG. 6, the transport box 111a has a first to a fourth accommodating chambers 131a-131d. These accommodating chambers 131a-131d have substantially the same arrangement, and the first accommodating chamber 131a will be described as a representative.

The accommodating chamber 131a comprises an accommodating part 134a for feeding, two accommodating parts 135a and 136a for discharging and a guide means 137a.

The accommodating part 134a for feeding is provided in an upper part of the accommodating chamber 131a. The accommodating part 134a has a feeding space 1341 having a wide transport direction width, and permits extension of the feeding time. The transport direction width of the feeding space 1341 is constant over the entire area in the front view.

The accommodating part 134a for feeding further has a feeding port 133a on the outer side of the guide rail 150.

The accommodating parts 135a and 136a are provided in a lower part of the feeding chamber 131a.

The accommodating parts 135a and 136a for discharging are partitioned by the partitioning member 132a such that they have substantially the same transport direction width. Thus, the transport direction width of the accommodating parts 135a and 136a for discharging is about one half the transport direction width of the accommodating part 1341 for feeding. The transport direction width of the accommodating parts 135a and 136a for discharging is set such as to permit feeding and discharging transport articles 101 without any trouble, and is constant over the entire area in the front view.

Each of the accommodating parts 135a and 136a for discharging has a bottom lid 118 provided on the bottom, thus permitting transport articles 101 to fall in predetermined stacking parts 1113.

Between the accommodating part 134a for feeding and the accommodating parts 135a and 136a for discharging, a guide means 137a is provided, which has a front revolving member 1371a provided for revolving on a transport direction side wall 1373a, a rear revolving member 1372a mounted for revolving on a wall 1374a on the anti-transport direction side, and a drive means for causing revolution of the revolving members 1371a and 1372a. In the top view, the revolving members 1371a and 1372a in the closed state thereof have such a shape that a plurality of projections (not shown) mesh with one another.

In their closed state, the revolving members 1371a and 1372a project at right angles from the walls 1373a and 1374a, respectively, in a half open state their ends are found right above the distal end odd the partitioning member 132a (shown by dashed lies in FIG. 6), and in their open state they are revolved past the vicinity of the distal end of the partitioning member 132a until they become substantially parallel with the walls 1373a and 1374a, respectively.

At the time of shifting a transport article 101 accommodated in the accommodating part 134a for feeding to the accommodating part 135a for discharging, the guide means 137a opens the forward revolving member 1371a and half opens the rearward revolving member 1372a. In this way, the transport article 101 accommodated in the accommodating part 134a for feeding can be selectively caused to fall into the accommodating part 135a for discharging. At the time of shifting a transport article 101 accommodated in the accommodating part 134a for feeding to the accommodating part 136a for discharging, the guide means 137a opens the rearward revolving member 1372a, and half opens the forward revolving member 1371a. In this way, the transport article 101 accommodated in the accommodating part 134a for feeding can be selectively caused to fall into the accommodating part 136a for discharging.

The above arrangement of the guide means 137a is by no means limitative. For example, such an arrangement may be made that the distal end of the partitioning member 132a is evolved to the transport direction side or the anti-transport direction side.

The remainder of the arrangement is substantially the same as in the prior art transport box 520.

The operation of the transport box 111a having the above arrangement will now be described with reference to FIGS. 7a-7e.

FIG. 7a is a schematic side view showing a second embodiment of the transport box according to the present invention, with a showing of the feed of transport articles from the first and second feeders.

Referring to FIG. 7a, in the transport box 111a, transport articles 101 are fed with the guide means 137a-137d in the closed state. More specifically, the first feeder 112 feeds transport articles 101 to the accommodating parts 134a and 134c for feeding, and then the second feeder 112 feeds transport articles 101 to the accommodating parts 134b and 134d for feeding.

FIG. 7b is a schematic side view showing the second embodiment of the transport box according to the present invention, with a showing of the falling of the fed transport articles into the forward accommodating part for feeding.

Referring to FIG. 7b, the guide means 137a-137d open the revolving members 1371a-1371d and half open the revolving members 1372a-1372d, thereby causing the fed transport articles 101 to fall into the accommodating parts 135a-135d for discharging. Then, the guide means 137a-137d (not shown) are closed.

FIG. 7c is a schematic side view showing the second embodiment of the transport box according to the present invention, with a showing of the feed of transport articles from the third and fourth feeders.

Referring to FIG. 7c, in the transport box 111a, transport articles 101 are fed with the guide means 137a-137d in the closed state. More specifically, the third feeder 112 feeds transport articles 101 to the accommodating parts 134a, 134c for feeding, and the fourth feeder 112 feeds transport articles 101 to the accommodating parts 134b, 134d for feeding.

FIG. 7d is a schematic side view showing the second embodiment of the transport box according to the present invention, with a showing of the falling of the fed transport articles into the rearward accommodating part for feeding.

Referring to FIG. 7d, the guide means 137a-137d open the revolving members 1372a-1372d and half open the revolving members 1371a-1371d, thereby causing the fed transport articles 101 into the accommodating parts 136a-136d for feeding. Then, the guide means 137a-137d (not shown) are closed.

Figure 7E:
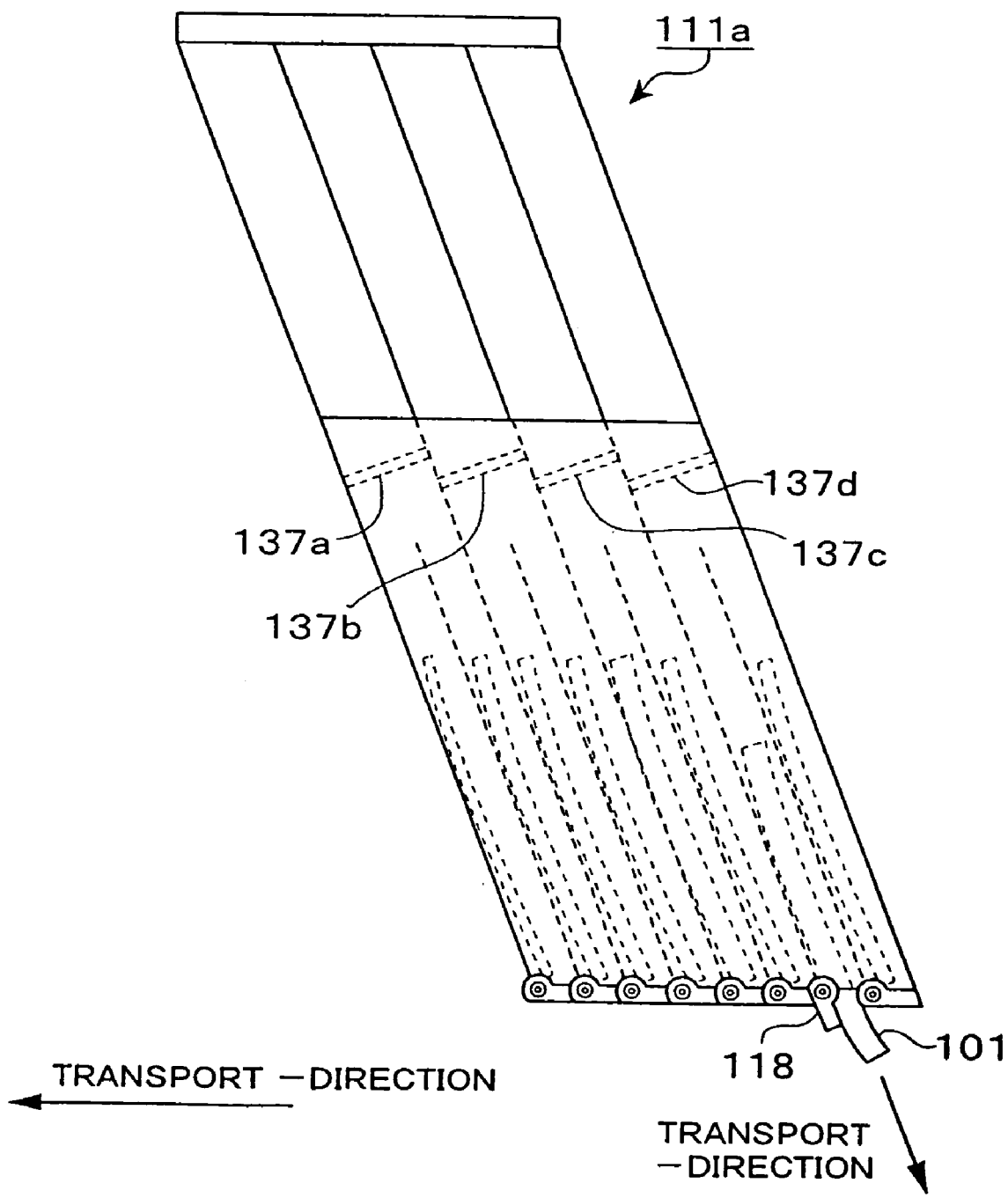
FIG. 7e is a schematic side view showing the second embodiment of the transport box according to the present invention, with a showing of the discharging of transport articles into a predetermined stacking part.

FIG. 7e is a schematic side view showing the second embodiment of the transport box according to the present invention, with a showing of the discharging of transport articles into a predetermined stacking part.

Referring to FIG. 7e, when the transport box 111a is transported to be above the predetermined accommodating part 1111, it opens the bottom lid 118, thus discharging the transport articles 101.

In this way, the instant embodiment of the transport box 111a transports the transport articles 101 in the state thereof accommodated in the accommodating parts 135a, 136a, 135b, 136b, 135c, 136c, 135d, 136d with a small transport direction width. Thus, it is possible to increase the transport density. Also, in their feeding, the transport articles 101 are fed to the feeding space 1341 having a large transport direction width. Thus, it is possible to stabilize the feeding operation.

A second example of the present invention relates to the second embodiment of the transport box 111a according to the present invention. As shown in FIG. 6, in the accommodating chambers 131a-131d the transport direction width W of the feeding space 1341 is set to about 80 mm, and in the accommodating parts 135a-135d and 136a-136d the transport direction width W1 is set to about 40 mm.

With this arrangement of the transport box 111a, compared to the first example of the transport box 111 the transport direction gap Δ is increased by about 25 (i.e., 80−55) mm, and the feeding time is correspondingly extended. Thus, it is possible to stabilize the feeding operation and further increase the transport speed v.

Figure 8A:
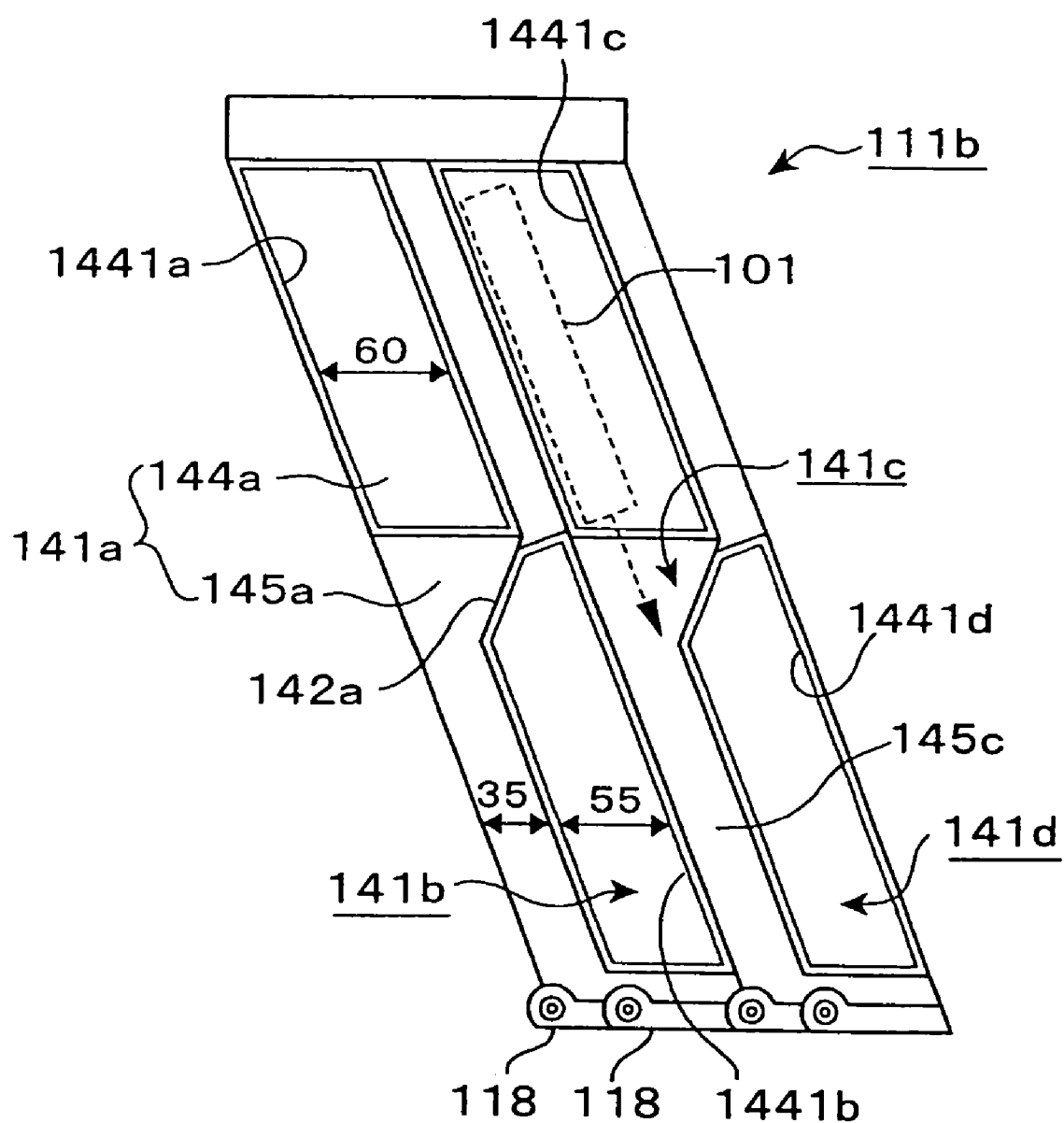
FIG. 8a is an outer schematic side view showing a third embodiment of the transport box according to the present invention.

Now, FIG. 8a is an outer schematic side view showing a third embodiment of the transport box according to the present invention.

Referring to FIG. 8a, the transport box 111b has a first to a fourth accommodating chambers 141a-141d. The first and the second accommodating chambers 141a and 141b constitute a pair, and the third and the fourth accommodating chambers 141c and 141d have substantially the same arrangement as the first and second accommodating chambers 141a and 141b, respectively. Thus, the first and the second accommodating chambers 141a and 141b will be described as a representative.

The first accommodating chamber 141a has an accommodating part 144a for feeding, which is disposed above the transport box 111b and serves to receive transport articles 101 fed to it, and an accommodating chamber 145a for discharging, disposed under he accommodating part 144a for feeding and accommodating transport articles 101.

The accommodating part 144a for feeding has a feeding space 1441a having a large transport direction width. The transport direction width of the accommodating part 145a for discharging is set to be smaller than the transport direction width of the feeding space 1441a. Transport articles 101 fed to the feeding space 1441a of the accommodating part 144a for feeding, are caused to fall into and accommodated in the accommodating part 145a for discharging. At this time, the slanted partitioning member 142a causes the transport articles 101 to fall smoothly.

With this arrangement, transport articles 101 can be fed to the feeding space 1441a having a large transport direction width. Thus, it is possible to extend the feeding time and stabilize the feeding operation. Also, since transport articles are transported in their state accommodated in the accommodating part 145a for discharging having a small transport direction width, it is possible to increase the transport density.

The accommodating part 144a for feeding further has its bottom provided with the bottom lid 118 corresponding to the transport direction width of the accommodating part 145a for discharging, and it discharges the accommodated transport articles 101 into predetermined stacking parts 1113.

The second accommodating chamber 141b is disposed side-by-side with the accommodating part 145a for discharging in the first accommodating chamber 141a, and has a feeding space 1441b having a large transport direction width. With this arrangement, transport articles 101 can be fed to the feeding space 1441b having a large transport direction width. Thus, it is possible to extend the feeding time and stabilize the feeding operation.

The second accommodating part 141b further has its bottom provided with a lid 118 corresponding to the transport direction width of the accommodating chamber 141b, and it discharges the accommodated transport articles 101 to predetermined stacking parts 1113.

The remainder of the arrangement is substantially the same as in the prior art transport box 520.

Now, the operation of the transport box 111b of the above arrangement will be described.

Firstly, the transport box 111b is transported with the bottom lids 118 in the closed state, and the first feeder 112 feeds transport articles 101 to the feeding space 1441a of the first accommodating chamber 141a. Then, the second feeder 112 feeds transport articles 101 to the feeding space 1441b of the second accommodating chamber 141b. Then, the third feeder 112 feeds transport articles 101 to the feeding space 1441c of the third feeding chamber 141c. Then, the fourth feeder 112 feeds transport articles 101 to the feeding space 1441d of the fourth accommodating chamber 141d.

The transport articles 101 fed to the feeding spaces 1441a and 1441c are caused to fall into and accommodated in the accommodating chambers 145a and 145c for discharging.

When the transport box 111b is transported to be above a predetermined accommodating part 1111, it opens a bottom lid 118 to discharge the transport article 101.

With this arrangement, in the instant embodiment of the transport box 111b, the first and third accommodating chambers 141a and 141c feed transport articles 101 to the feeding spaces 1441a and 1441c having a large transport direction width. Thus, it is possible to increase the feeding time and to ensure stable feeding operation. Furthermore, since transport articles are transported in their state accommodated in the accommodating parts 145a and 145c for discharging having a small transport direction width. Thus, it is possible to increase the transport density.

The above arrangement of the embodiment is by no means limitative. For example, in the transport box 111b' shown in FIG. 8b, unlike the above transport box 111b, the bottom lids 118 of the first and the third accommodating chambers 141a and 141c extend from the bottom to the top of the accommodating parts 145a and 145c for discharging.

With this arrangement, the fed transport articles 101 can be accommodated in a stable state in the accommodating parts 144a and 144c for feeding.

Figure 8B:
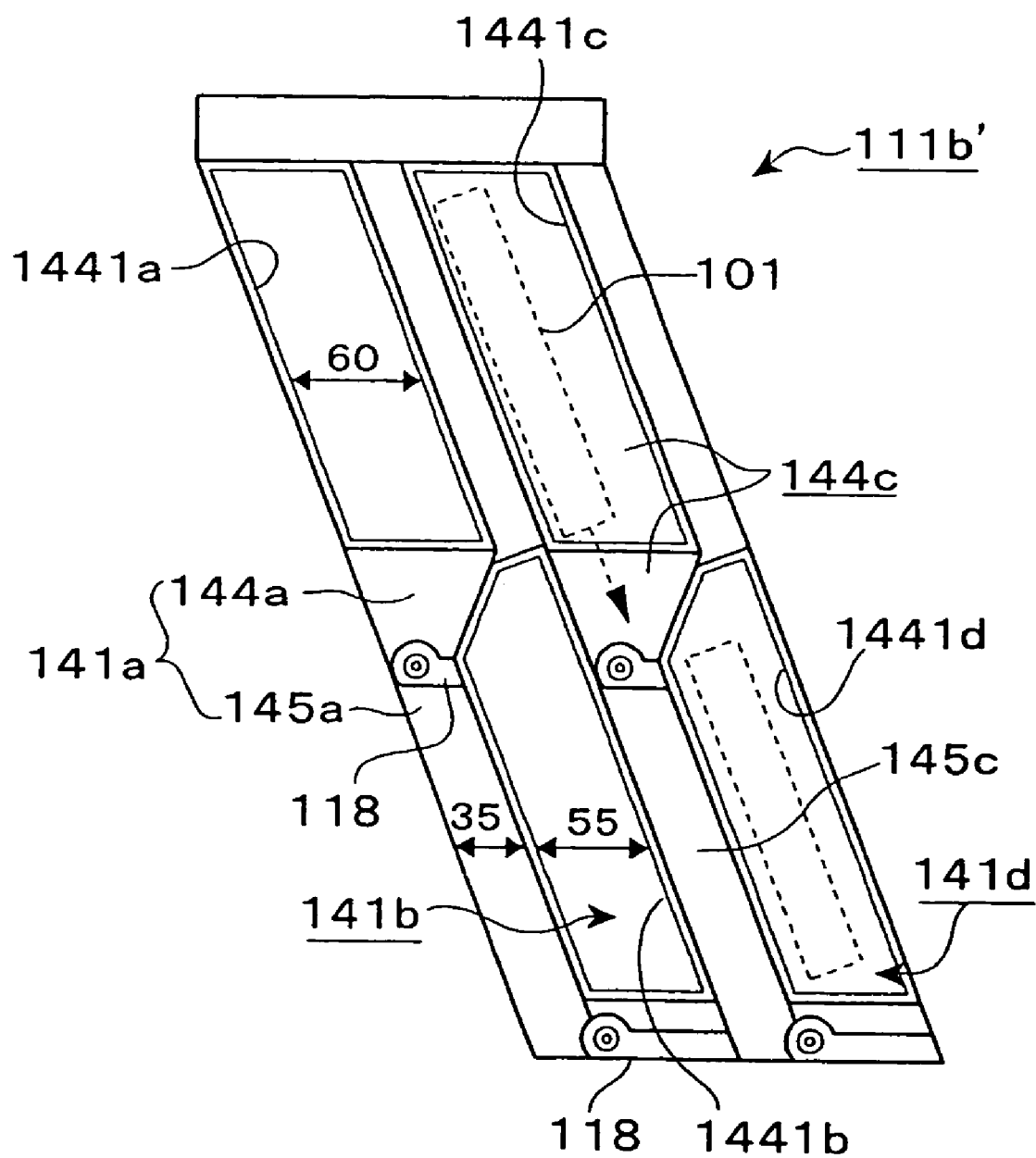
FIG. 8b is an outer cross section view of an application of the third embodiment of the transport box according to the present invention.

A third example of the present invention relates to the third embodiment of the transport box 111b. As shown in FIG. 8b, in this transport box 111b, the transport direction width W of the feeding spaces 1441a and 1441c of the first and third accommodating chambers 141a and 141c is set to about 60 mm, and the transport direction width W1 of the accommodating parts 145a and 145c for discharging is set to about 35 mm. And the transport direction width W' of the feeding spaces 1441b and 1441d in the second and the fourth accommodating chambers 141b and 141d is set to about 55 mm.

With this arrangement, by providing the first and the third accommodating chambers 141a and 141c in the transport box 111b, it is possible to increase the transport density to about 28 (i.e., (60+55)/(35+55)−1) percent.

Figure 9A:
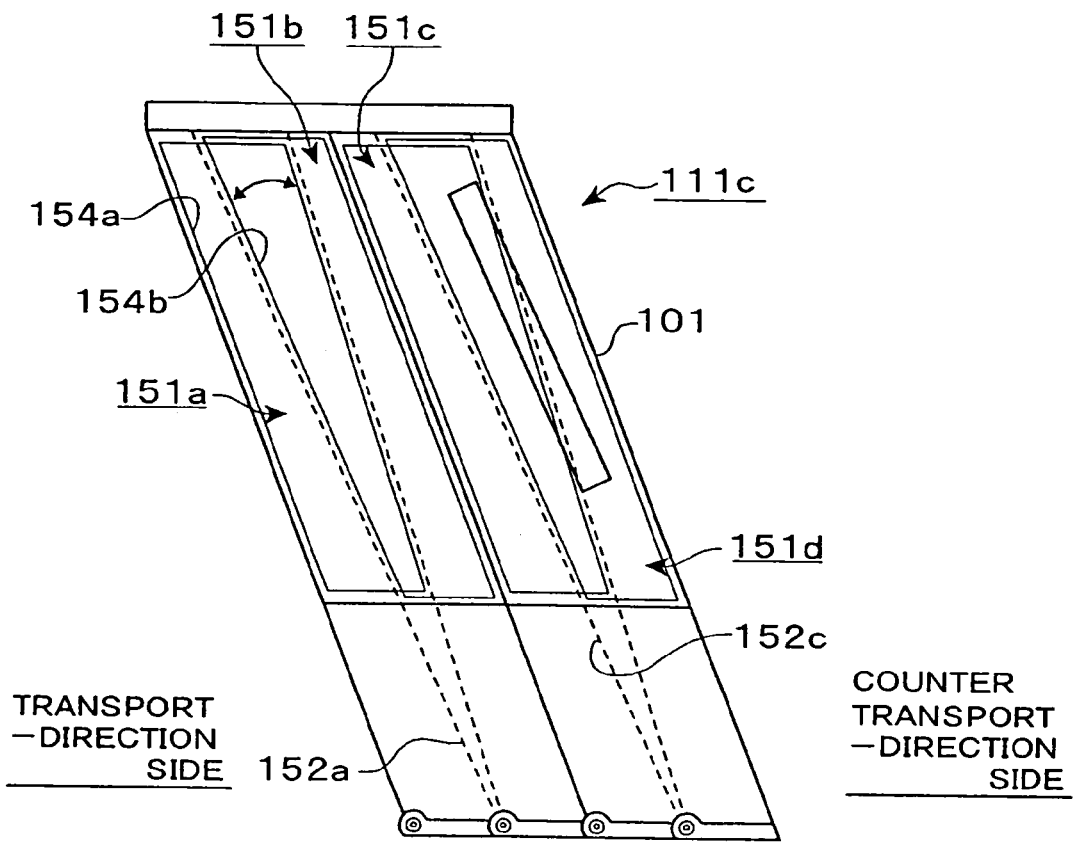
FIG. 9a is a schematic side view showing a fourth embodiment of the transport box according to the present invention.

Now, FIG. 9a is a schematic side view showing a fourth embodiment of the transport box according to the present invention. And FIG. 9b is a schematic perspective view showing a partitioning member of the fourth embodiment of the transport box according to the present invention.

Figure 9B:
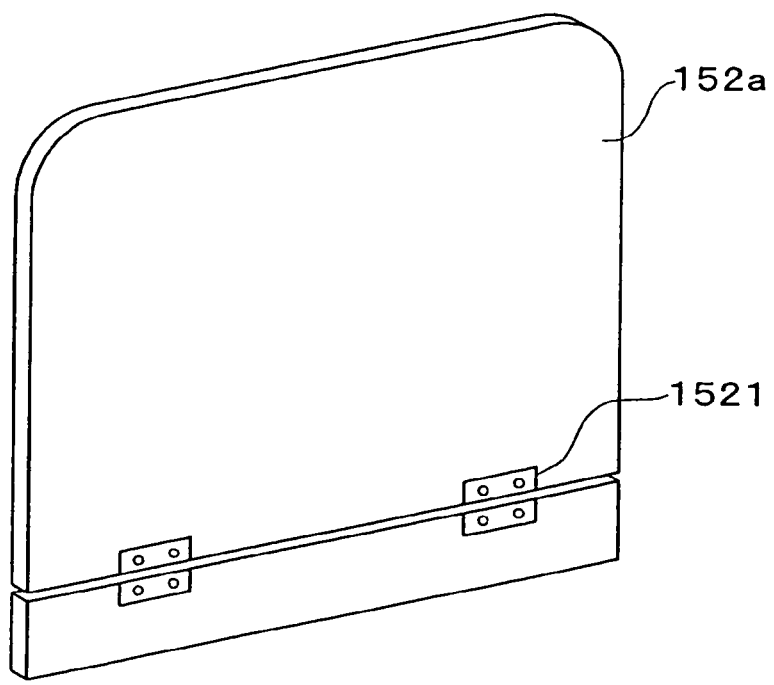
FIG. 9b is a schematic perspective view showing a partitioning member of the fourth embodiment of the transport box according to the present invention.

Referring to FIGS. 9a and 9b, the transport box 111c has a first to a fourth accommodating chambers 151a-151d. The first and the second accommodating chambers 151a and 151b are defined by a revolving partitioning member 152a, and the third and the fourth accommodating chambers 151c and 151d are defined by a revolving partitioning member 152c.

As shown in FIG. 9b, each of the partitioning members 152a and 152c is a rectangular plate with hinges 1521 provided at the lower end, and it is selectively caused by a revolving means 116 to undergo revolution about the hinges 1521 as the center of revolution.

When the partitioning member 152a, for instance, is undergoing revolution to the counter-transport direction side, the transport direction width of the feeding space 154a of the first accommodating chamber 151a is increased to extend the transport time. Thus, it is possible to stabilize the feeding operation (see FIG. 9a).

As shown in FIG. 9c, the revolving means 116 comprises a hook-like revolving plate 162 provided on the top of the transport box 111b and biased in the counterclockwise direction by a coil spring 161, a compression spring 163 pulling the upper part of the partitioning member 152a toward the transport direction side, and a stopper 164 for preventing excessive revolution of the partitioning member 152a toward the counter-transport direction side. The biasing force of the coil spring 161 is set to be greater than the tensile force of the compression spring 163. The above arrangement of the revolving means 116 is by no means limitative.

The remainder of the arrangement is substantially the same as the prior art transport box 520.

Now, the operation of the transport box 111b having the arrangement will be described with reference to FIG. 9c.

FIG. 9c is a fragmentary enlarged schematic side view for describing the revolving operation of the partitioning member in the fourth embodiment of the transport box according to the present invention.

Referring to FIG. 9c, in the right side revolving means 116, the revolving plate 162 biased by the coil spring 161 causes the partitioning member 152a to undergo revolution to the counter-transport direction side into contact with the stopper 164. Thus, the transport direction width of the feeding spaces 154a and 154c (see FIG. 9a) in the first and the third accommodating chambers 151a, 151c is increased to extend the transport time. Thus, it is possible to ensure stable feeding operation. Although not shown, in this state transport articles 101 are fed from the first and the second feeders 112 to the accommodating chambers 151a and 151c, respectively.

Then, by the right side revolving means 116 as shown in FIG. 9c, the upper end of the revolving plate 162 is brought into contact with the wall 165, and the revolving plate 162 is caused to undergo revolution in the clockwise direction by a predetermined angle. With the revolution of the revolving plate 162, the partitioning member 152a is released from the lock by the revolving plate 162 and caused by the tensile spring 163 to undergo revolution to the transport direction side. Then, the lower end of the revolving plate 162 having been revolved by a predetermined angle in the clockwise direction locks the partitioning member 152a. Thus, the transport direction width of the feeding spaces 154b and 154d (see FIG. 9a) of the second and the fourth accommodating chambers 151b and 151d is increased to extend the transport time. Thus, it is possible to ensure stable feeding operation. Although not shown, in this state transport articles 101 are fed from the second and the fourth feeders 112 to the accommodating chambers 151b and 151d.

In this way, by causing the partitioning members 152a and 152c to undergo revolution to the counter-transport direction side, this embodiment of the transport box 111c can increase the transport direction width of the feeding spaces 154a and 154c and improve feeding stability. Also, by causing the partitioning members 152a and 152c to undergo revolution to the transport direction side, it is possible to increase the transport direction width of the feeding spaces 154b and 154d and improve the feeding stability.

Furthermore, the transport box 111c can increase the transport density.

It is to be noted that the above arrangement of the embodiment is by no means limitative.

Figure 10A:
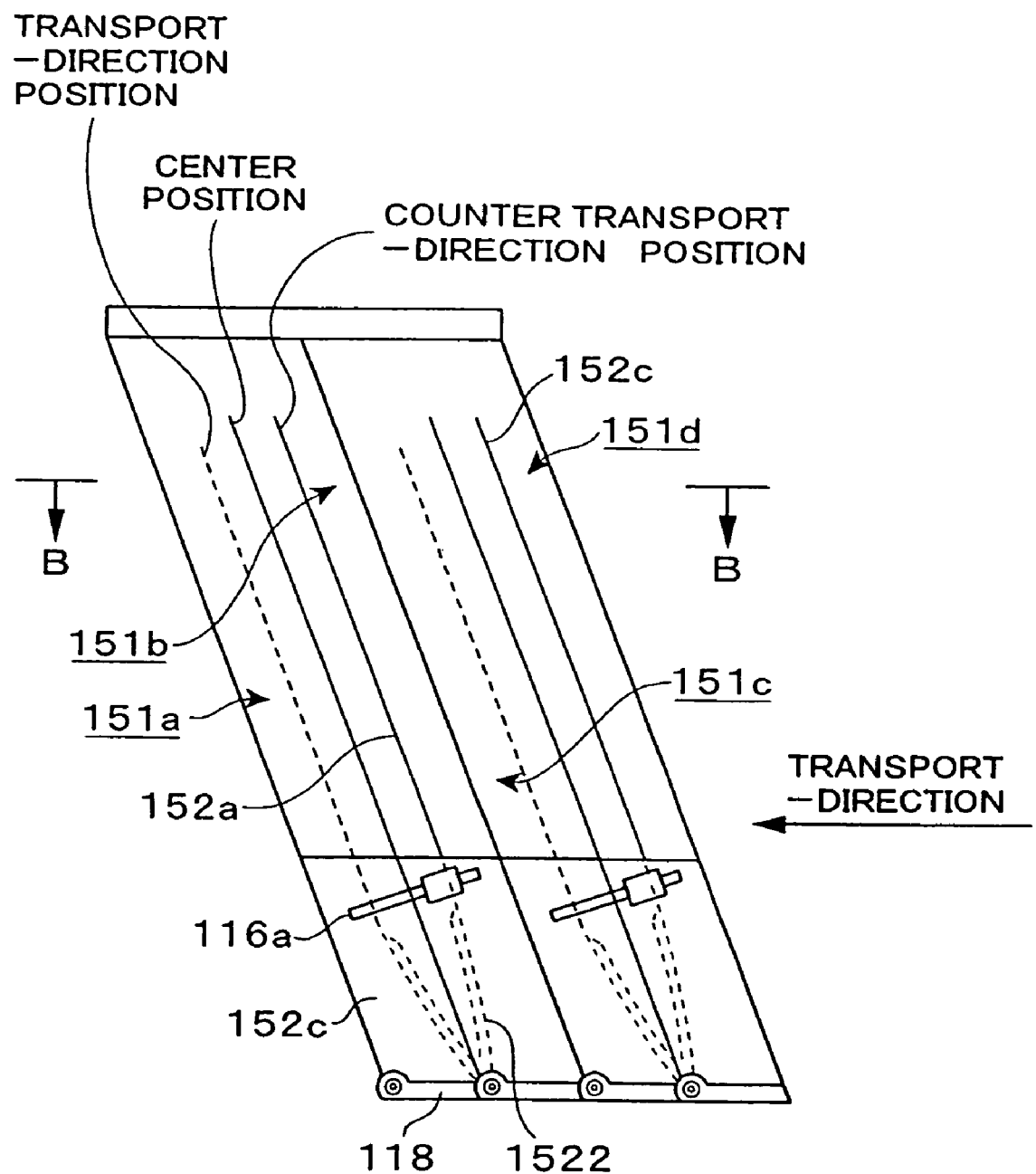
FIG. 10a is an enlarged schematic outer side cross section view showing an application of the fourth embodiment of the transport box according to the present invention.

Now, FIG. 10a is an enlarged schematic outer side view showing a transport box as an application of the fourth embodiment of the present invention. And FIG. 10b is a schematic cross section view taken along line B-B in FIG. 10a.

Figure 10B:
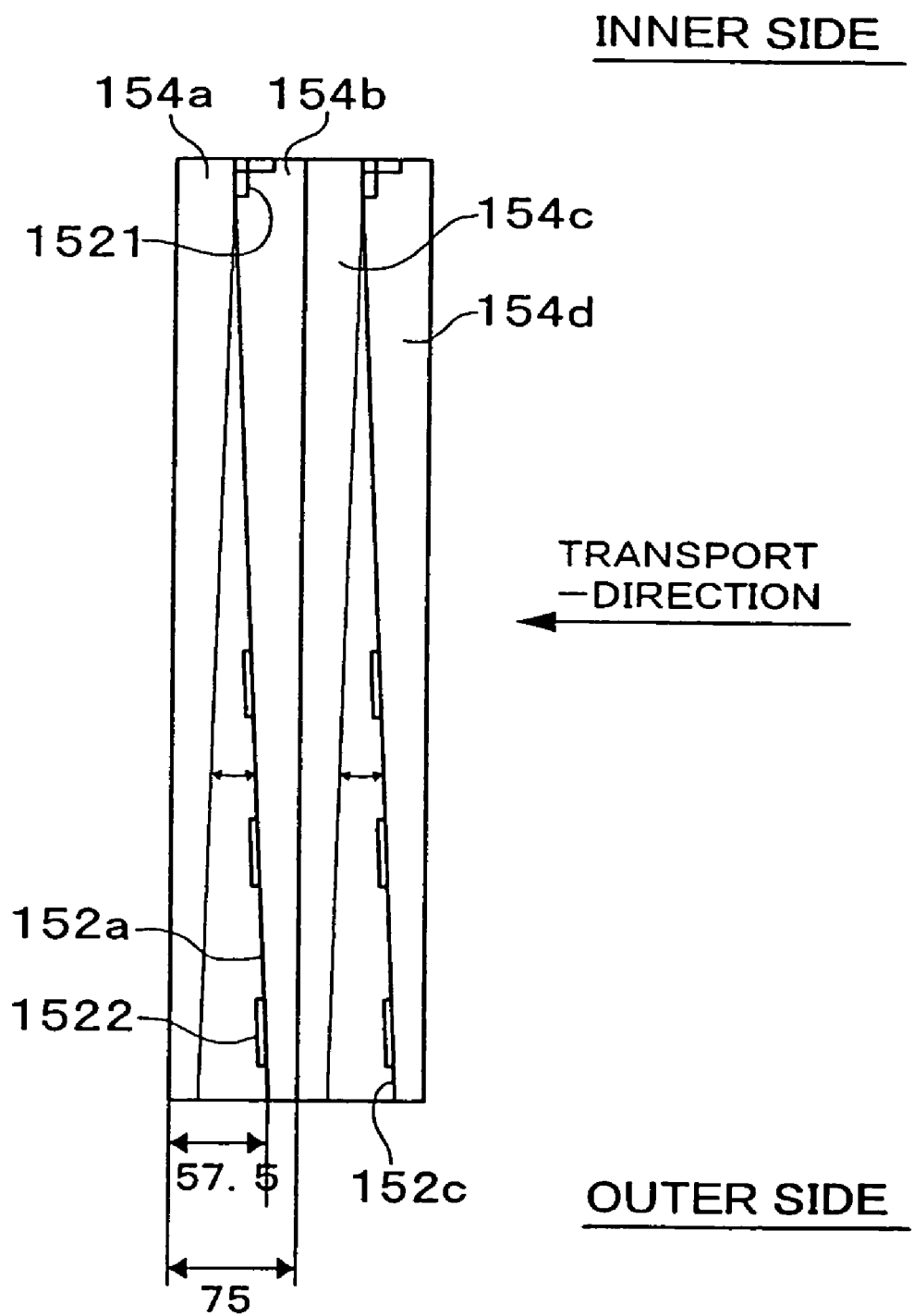

Referring to FIGS. 10a and 10b, the transport box 111c', unlike the above transport box 111c, is arranged such that it undergoes revolution about the inner end of the partitioning members 152a and 152c as the center of revolution.

The partitioning members 152a and 152c have hinges 1521 mounted on the inner end, and their outer end is caused by a linear motor 116a as a revolving means to undergo revolution to a transport direction side position, a center position and a counter-transport direction side position. The revolving means is not limited to the above linear motor 116a. A plurality of guide members (such as rubber strips) 1522 are coupled to the lower ends of the partitioning members 152a and 152c. The guide members 1522 guide transport articles 101 to be set on the top of the corresponding bottom lid 118.

The remainder of the arrangement is substantially the same as the above transport box 111c.

By causing the partitioning members 152a and 152c to undergo revolution to the counter-transport direction side position, the transport box 111c' of the above arrangement can increase the transport direction width of the feeding spaces 154a and 154c, thereby improving feeding stability. Also by causing the partitioning members 152a and 152c to undergo revolution at the transport direction side position, the transport box 111c' can increase the transport direction width of the feeding spaces 154b and 154d, thereby improving feeding stability.

When transport articles 101 are fed to the accommodating chambers 151a-151d, the partitioning members 152c and 152c are revolved to the center position, and are guided by the guide member 1522 to be set on the top of the corresponding bottom lids 118 for discharging thereby.

In this way, the transport box 111c' can ensure stable feeding operation by causing revolution of the partitioning members 152a and 152c.

A fourth example of the present invention relates to the transport box 111c' as an application of the fourth embodiment. As shown in FIG. 10b, in this transport box 111c' the maximum transport direction width W of the feeding spaces 154a-154d is set to about 57.5 mm, the transport direction width W1 of the center of the accommodating chambers 151a-151d is set to about 37.5 (i.e., 75/2) mm. The pitch of the transport boxes 111 is set to about 160 mm.

With this arrangement of the transport box 111c, the transport direction gap Δ is increased by about 20 (i.e., W−W1) mm. Thus, it is possible to increase the feeding time, ensure stable feeding operation and increase the transport speed v.

The present invention is also useful for the transporter/sorter having the above transport boxes 111, 111a, 111b, 111b', 111c, 111c', etc.

Now, the above transporter/sorter will be described.

An embodiment of the transporter/sorter according to the present invention has an arrangement obtainable by providing either one of the above transport boxes 111, 111a, 111b, 111b', 111c and 111c' instead of the transport box 520 in the above prior art transporter/sorter 500.

With this arrangement of the transporter/sorter, it is possible to ensure stable operation of feeding transport articles 101 and increase the transport density, thereby improving sorting process capacity.

While preferred embodiments of the transport box and the feeder according to the present invention have been shown and described hereinabove, these embodiments of the transport box and the feeder according to the present invention are by no means limitative, and various changes and modifications are of course possible without departing from the scope of the present invention.

For example, the transport direction width of the feeding spaces in the accommodating chambers, to which transport articles are fed, may have various arrangements depending on the transport articles.

With this arrangement, transport articles can be fed to accommodating chambers of the best feeding spaces depending on the thickness or transport direction length of the transport articles. Thus, it is possible to ensure stable feeding operation and further increase the transport density. For example, in the case where substantially one-half of the transport articles are large-size transport articles while the rest are small-size transport articles, the transport direction width of the feeding spaces in two accommodating chambers may be increased in correspondence to the large transport articles, while reducing the feeding spaces of the other two accommodating chambers in correspondence to the small transport articles. By doing so, it is possible to ensure stable feeding operation and further increase transport density.

While the transport box and the feeder according to the present invention are particularly suited to such take-out articles as documents, magazines, books, CD cases, etc. larger in size than a post card, the large take-out articles are by no means limitative, and the present invention is suitably applicable as well to small take-out articles such as post cards and small envelopes.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

Now, a second embodiment of the transporter/sorter according to the present invention will be described with reference to FIGS. 11-14.

Figure 11:
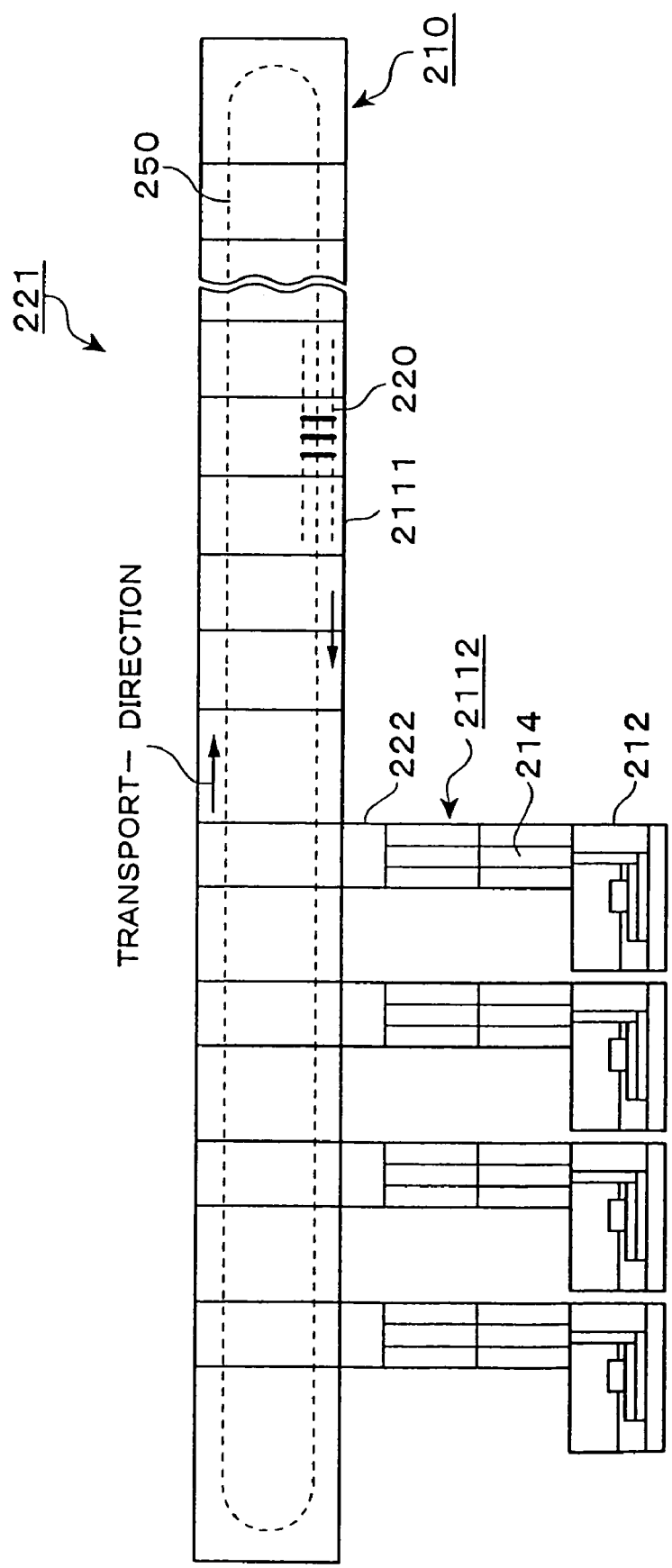
FIG. 11 is a schematic front view of a second embodiment of the transporter/sorter according to the present invention.

FIG. 11 is a schematic front view showing the second embodiment of the transporter/sorter according to the invention.

Referring to FIG. 11, the transporter/sorter 221 is different from the prior art transporter/sorter 500 in that it comprises feeding units 222 instead of the feeding means 513. The other constituent elements are substantially the same as in the prior art transporter/sorter 500.

Figure 22A:
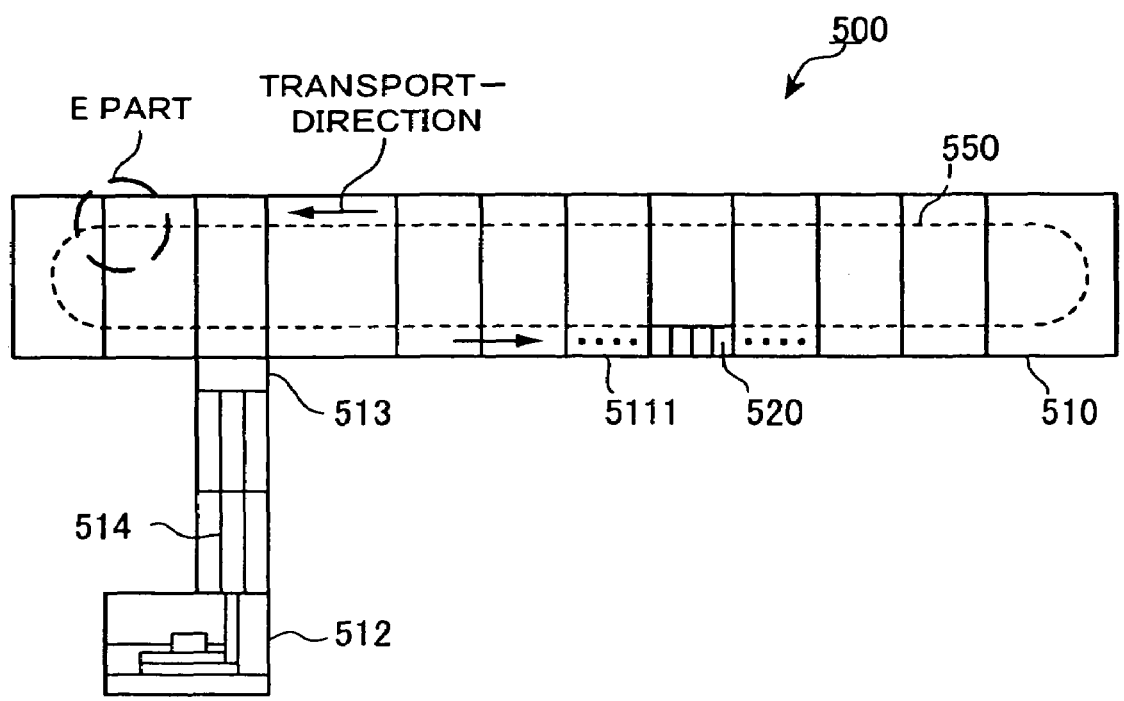
FIGS. 22(a) and 22(b) are schematic views showing a prior art transporter/sorter, FIG. 22(a) being a plan view and FIG. 22(b) being a front view.
Figure 22B:
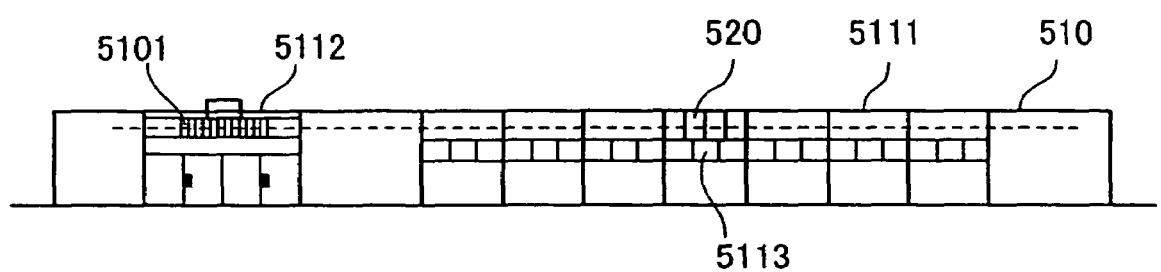
Figure 23:
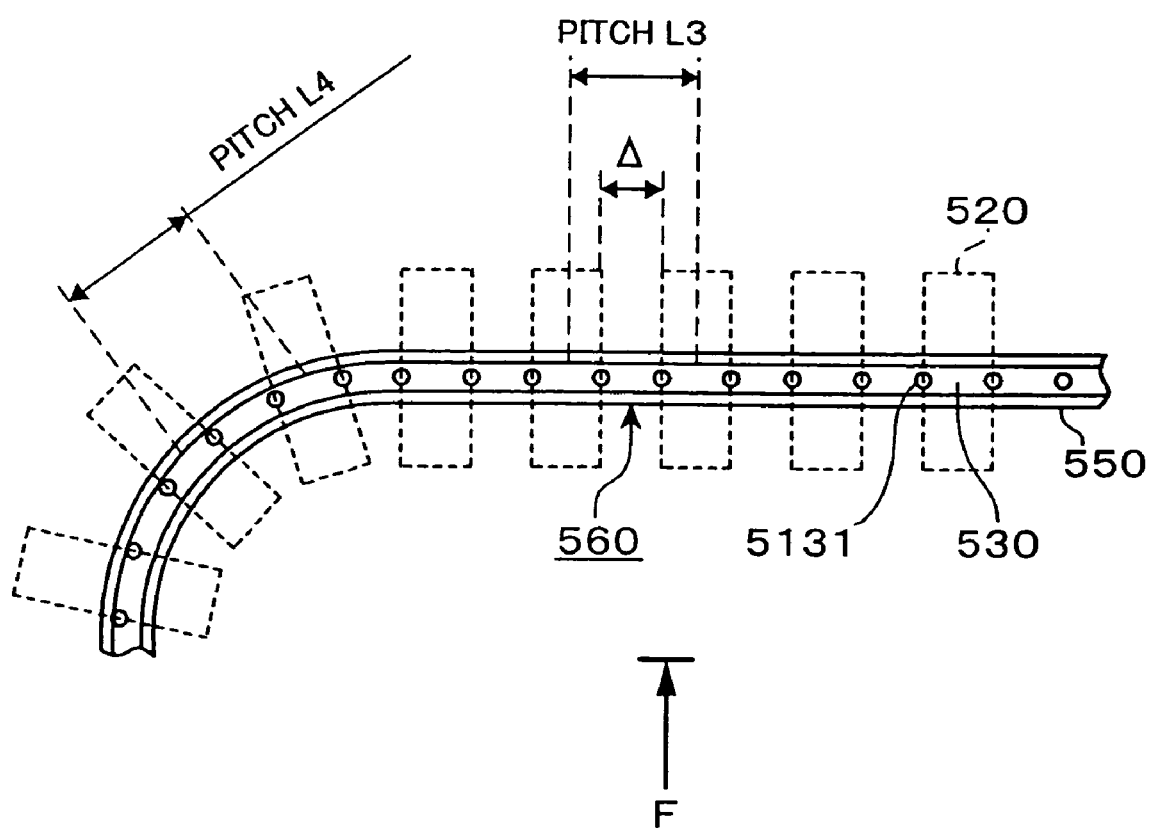
FIG. 23 is a schematic enlarged view showing a part E in FIG. 22(a)
Figure 24:
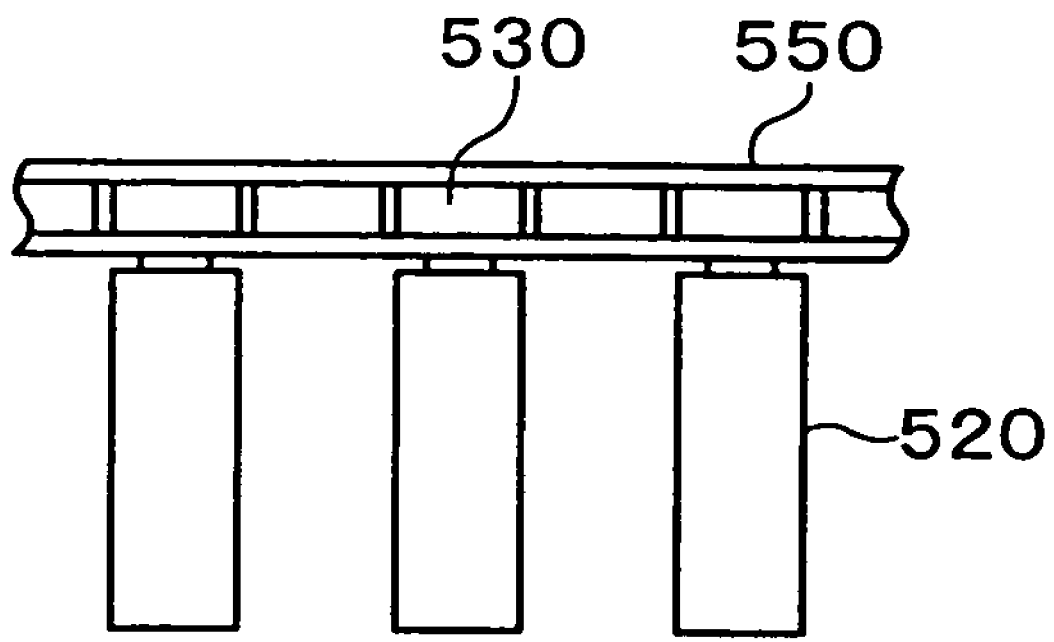
FIG. 24 is a schematic enlarged view taken from a direction F in FIG. 23.

Thus, in FIG. 11, elements like those in FIG. 22 are designated by like reference numerals, and their detailed description is not given herein.

Figure 12A:
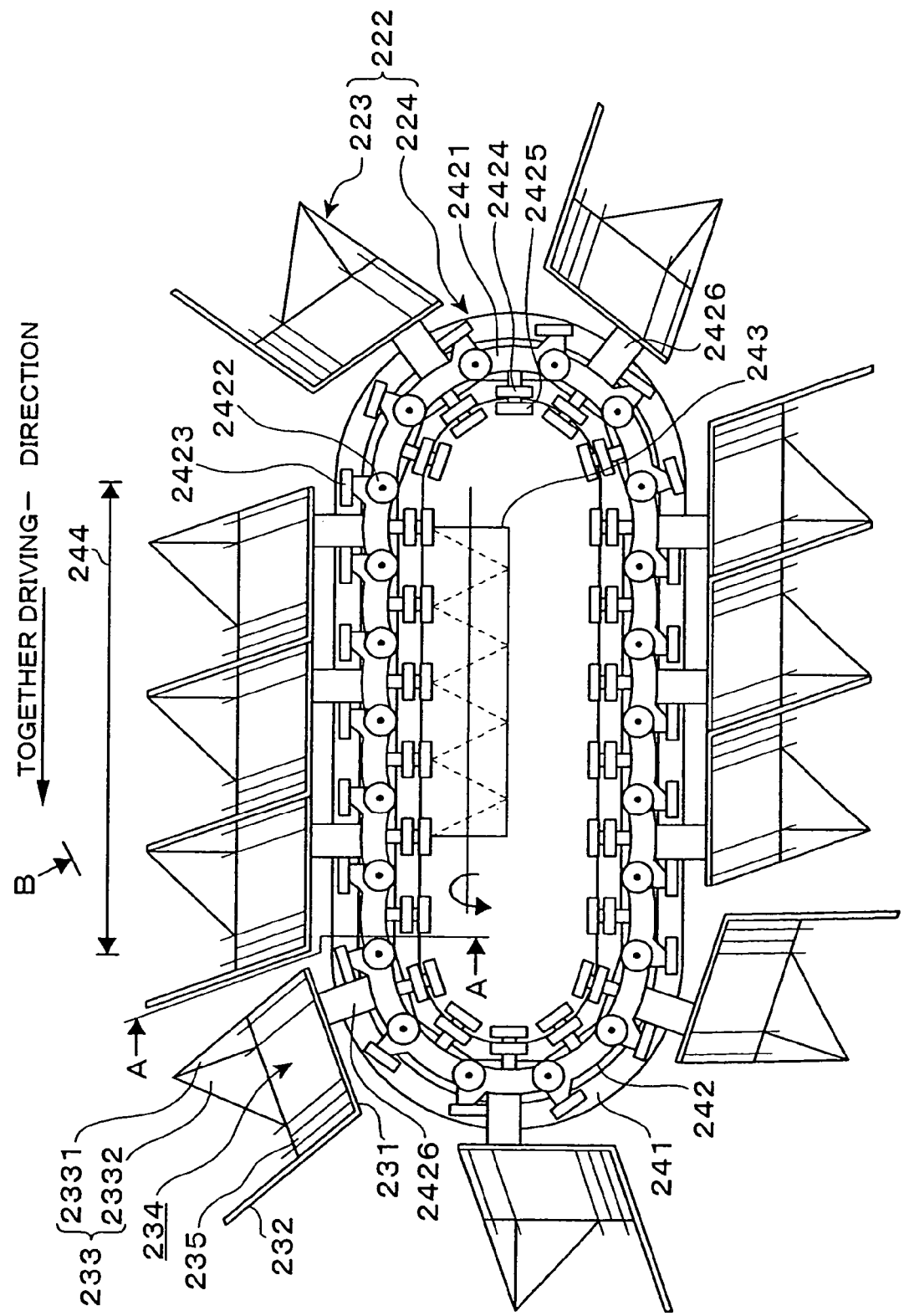
FIG. 12a is an enlarged schematic plan view showing an important part of the feeding member in the transporter/sorter as shown in FIG. 11.
Figure 12B:
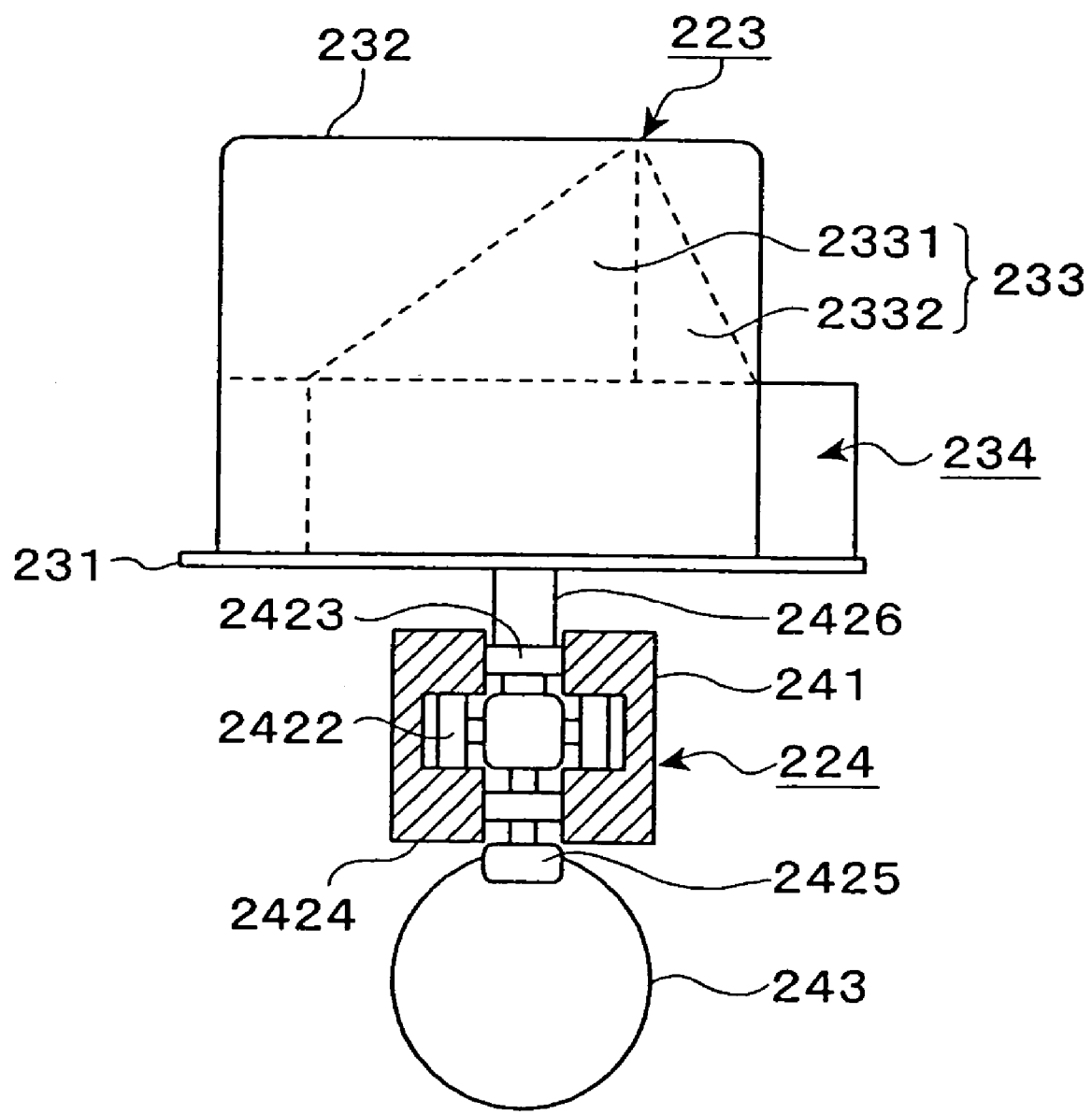
Figure 12C:
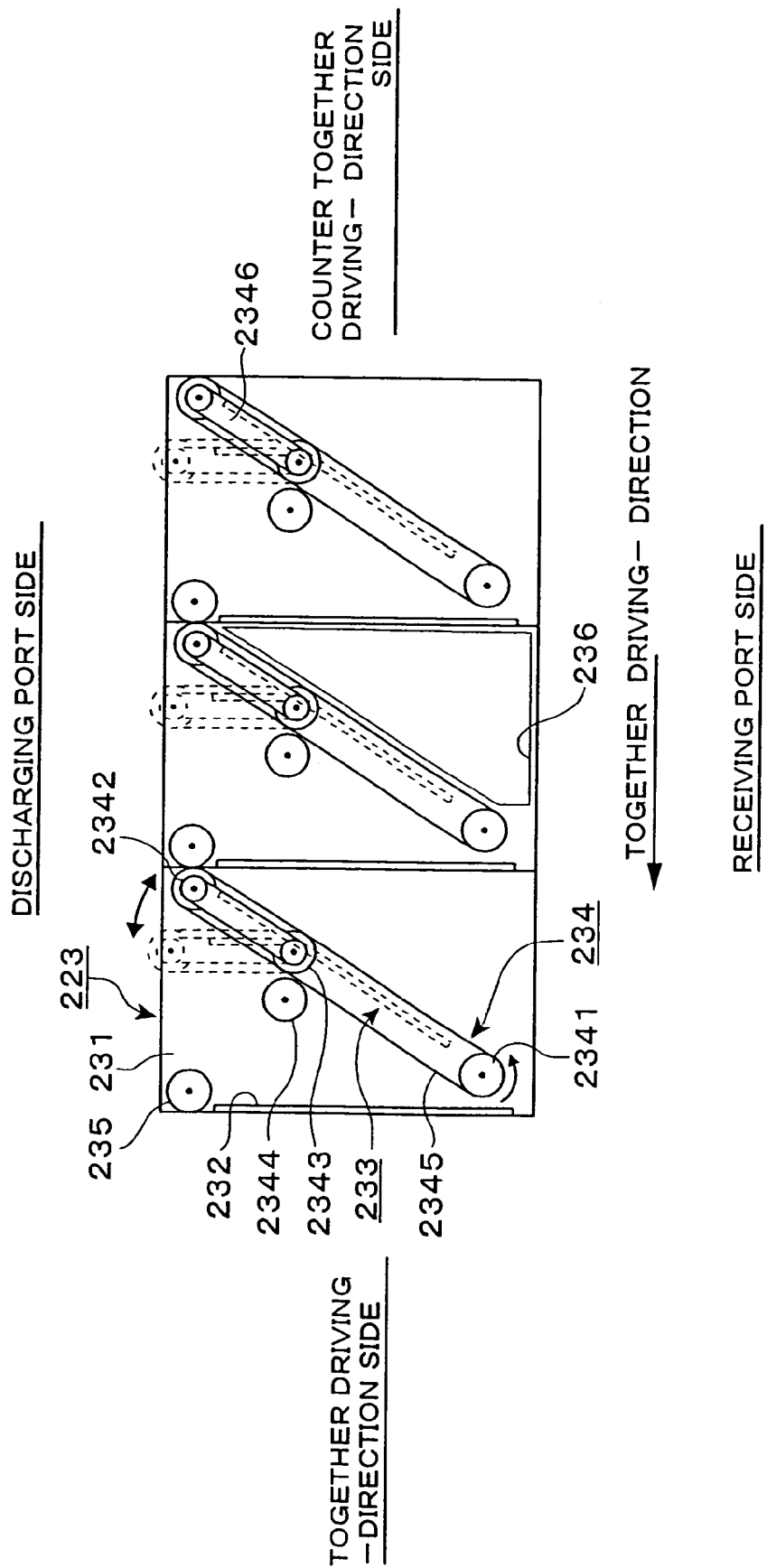

FIG. 12a is an enlarged schematic front view showing essential parts of feeding units in the second embodiment of the transporter/sorter according to the invention. FIG. 12b is an enlarged schematic cross section view taken along line A-A in FIG. 12a. FIG. 12c is an enlarged schematic view taken in direction B in FIG. 12a.

Referring to FIGS. 12a-12c, each feeding unit 222 comprises a feeding means 223 for feeding transport articles 2101 to a transport box 220 and a parallel driving means 224 for driving the feeding means 223 in parallel with the transport box 220.

In FIG. 12a, a front side guide rail 241 for parallel driving is omitted for better understanding of the arrangement of the parallel running wagons 242. Also, in FIG. 12c, a parallel driving side guide plate 233 is shown by dashed lines to facilitate the understanding.

The feeding means 223 comprises a base member 231, a counter-parallel-driving direction side guide plate 232, a parallel-driving direction side guide plate 233, a belt 234 for transport and discharging, and a roller 235.

The base plate 231 is rectangular, and its bottom surface is supported by a coupling member 2426 on the parallel-driving wagon 242 of the coupling member 2426. The lateral width of the base plate 231 is substantially the same length as the pitch of the transport boxes 220.

The base plate 231 in this embodiment has a smoothly finished surface to facilitate the slipping of transport articles 2101. This arrangement, however, is by no means limitative. For example, a belt conveyor (not shown) may be provided for moving transport articles 2101 to the discharging port side.

The counter-parallel-driving direction side guide plate 232 is rectangular, and is provided at the parallel-driving direction side end of the base plate 231 in a state that its top is inclined to the parallel-driving direction side. The inclination angle is substantially the same as that of the feeding port 2123 of the transport box 220. The guide plate 232 has such a length that it does not touch the roller 235 lest the movement thereof should be prevented.

In the parallel-driving direction side guide plate 232, the parallel-driving direction side surface serves as a guide surface, and it guides a transport article 2101 fed by the immediately preceding feeding means 223 from the counter-parallel-driving direction side.

The parallel-driving direction side guide plate 233 has a triangular guide plate 2331 for transport and a guide plate 2332 for discharging. The guide plate 2331 for transport extends from the top of a receiving port side transport/discharging belt 234 to the parallel-driving direction side. The guide plate 2331 is mounted via an arm (not shown) on the base plate 231 in a state that its top is inclined to the parallel driving direction side. The guide plate 2332 for discharging is found on the top and parallel-driving direction side of the belt 234 for discharging. The guide plate 2332 is mounted via a coupling member (not shown) on a coupling arm 2346 such that its top is inclined to the parallel-driving side at substantially the same inclination angle as that of the feeding port 2123. Thus, the guide plate 2332 for discharging is revolved together with the coupling arm 2346.

With the provision such parallel-driving side guide plate 233, it is possible to reliably receive and discharge transport articles 2101.

The transport/discharging belt 234 has a drive roller 2341, a driven roller 2342, an intermediate roller 2343, a biasing roller 2344, a belt 2345 and a coupling arm 2346.

The drive roller 2341 is supported for revolution at the end of the base plate 231 on the parallel-driving direction side and the receiving port side. The drive roller 2341 is rotated such that a pinion (not shown) provided on its lower part moves a rack (not shown) provided on top of the guide rail 241 for parallel running is moved in the parallel-driving direction.

The driven roller 2342 is supported for rotation at the end of the base plate 231 on the counter-parallel-driving direction side and the discharging port side. The driven roller 2342 is supported for revolution via a coupling arm 2346 on the intermediate roller 2343 in a state that it is biased in the clockwise direction. With this arrangement, it is possible to discharge transport articles 2101 having different thicknesses.

Preferably, although not shown, such an arrangement may be made that when the transport/discharging belt 234, found between the driven roller 2342 and the intermediate roller 2343, receives a predetermined external force directed to the parallel driving direction side, the belt 234 further undergoes revolution to the parallel driving direction side. With this arrangement, even in such case as when the feeding fails to be made normally, for instance when the feeding means 223 passes through the parallel-driving feeding area 244 in such a state that the transport article 2101 is found in both the transport box 220 and the feeding means 223, it is possible to prevent the undesired breakage of the transport article 2101.

The protective function of protecting the transport article 2101 is not limited to the above arrangement; for instance such an arrangement is possible as the roller 235 is revolved toward the counter-parallel-driving direction side by receiving a predetermined external force directed to the counter-parallel-driving direction side.

The intermediate roller 2343 is supported for revolution on substantially the center portion of the base plate 231.

The biasing roller 2344 is provided in the vicinity of the intermediate roller 2343 in a state that it is biased in the counter-parallel-driving direction side, and pushes the belt 2345 from the counter-parallel-driving direction side to exert a predetermined tension to the belt 2345.

The belt 2345 is passed round the drive and driven rollers 2341 and 2342, and provides a common function as a transport belt and a discharging belt. With the common use of the belt 2345, it is possible to reduce the cost of manufacture.

The transport/discharging belt 234 is provided such that its top is inclined to the parallel driving direction side at substantially the same angle as that of the feeding port 2123.

The roller 235 is supported for revolution at the end of the base member 231 on the parallel-driving direction side and the discharging port side such that its top is inclined to the parallel driving direction side at substantially the same angle as that of the feeding port 2123.

In this example, the feeding means 223 forms a receiving space 236 defined substantially by the base plate 231, the transport/discharging belt 234, the parallel driving side guide plate 233 and the counter-parallel-driving direction side guide plate 232.

The feeding means 223 of the above arrangement can, even in the state of parallel driving, reliably receive the transport article 2101 from the belt 214 and reliably discharge the transport article 2101 without breakage.

The parallel-driving means 224 comprises the guide rail 241 for parallel driving, a wagon 242 for parallel driving, and a screw 243 as driving means for moving the wagon 242 for parallel driving and the wagon 242 for discharging.

The guide rail 241 for parallel driving is constituted by a pair of endless loop rails formed with grooves 2411 facing each other, into which the roller bearing 2422 is inserted horizontally. The guide rail 241 is supported via a support member (not shown) on a feeding part frame 2112 in such a state that it forms a gap, into which the roller bearings 2423 and 2424 are inserted in the vertical direction.

The parallel driving guide rail 241 forms an elliptical path in the front view, and its area corresponding to an upper straight part of the ellipse is made to be a parallel-driving feeding area 244. By setting the length of the parallel-driving feeding area 244, it is possible to adjust the feeding time and thus cope with an increase of the transport speed of the transport box 220. Also, with the elliptical parallel-driving guide rail 241 it is possible to simplify the arrangement of the parallel driving means 224 and reduce the cost of manufacture.

The wagon 242 for parallel driving comprises a wagon body 2421 in the form of a curved angular bar, a pair of roller bearings 2422 projecting horizontally from the counter-parallel-driving direction side end of the wagon body 2421, a roller bearing 2423 projecting upward from the counter-parallel-driving side end of the wagon body 2421, two-stage roller bearings 2424 and 2425 projecting downward from the center of the wagon body 2421, and a coupling member 2426 projecting upward from the center of the wagon body 2421. In the wagons 242 for parallel driving, the pairs of roller bearings 2422 couple together the wagon bodies 2421 for revolution. The lower stage roller bearings 2425 are received in a groove of a screw 243.

The wagons 242 for parallel driving are restricted in position by pairs of roller bearings 2422 and roller bearings 2423 and 2424, and can be moved only in the parallel driving direction along the parallel-driving guide rail 241.

The screw 243 as driving means is rotated by a motor and a control unit (not shown), thus causing excursion of the roller bearings 2425 inserted into the groove in a screw 243 in the parallel-driving direction. The screw 243 is controlled by the control unit in the rotation speed and timing. In this way, in the parallel driving feeding areas 244 the feeding means 223 is driven to run along with the transport boxes 220 in synchronism with the transport speed and timing of the transport boxes 220.

Thus, the parallel-driving means 224 can continuously drive together a plurality of feeding means 223, as well as increasing the parallel driving speed and readily control the parallel-driving speed and timing.

Now, the operation of the feeder 221 of the above arrangement will now be described with reference to FIGS. 13(a)-13(i).

FIGS. 13(a)-13(i) are schematic views showing an essential part for describing a state, in which a feeding unit in the embodiment of the transporter/sorter according to the invention feeds transport articles.

The transporter/sorter 221 is different from the prior art transporter/sorter 500 in that, the feeding units 222 are provided in lieu of the feeding means 513. Thus, operations irrelevant to the feeding units 222 are substantially the same as the operations in the transporter/sorter 500.

In FIG. 13(a), in the transporter/sorter 221 the transport box 220 is transported at a predetermined transport speed. The feeding unit 222 is also driving the feeding means 223 in parallel with the transport box 220 at the timing of the feed of the discharged transport articles 2101 to a predetermined accommodating chamber 2123.

The feeding means 223 is in a state that the transport/discharging belt 234 is being rotated and that it is ready for receiving the transport article 2101 transported by the belt 214. This position is the start position in the parallel-driving feeding area 244.

Then, in FIG. 13(b), the leading end of the transport article 2101 transported by the transport/discharging belt 214 enters a receiving space 236 in the feeding means 223. Then, in FIG. 13(c), the transport article 2101 further proceeds into the receiving space 236 in the feeding means 223. At this time, even when the leading end of the transport article 2101 touches the belt 214, owing to the rotating state of the transport/discharging belt 234 it is possible to prevent undesired damage to the transport article 2101.

Then, in FIG. 13(d), the trailing end of the transport article 2101 is being transported, and the leading end of the transport article 2101 is brought into contact with the transport/discharging belt 234 and transported to the discharging port side.

Although not shown, even when the trailing end of the transport article 2101 is spaced apart from the belt 214, the transport article 2101 is transported to the discharging port side by the momentum received from the belt 214 and the transport/discharging belt 234. At this time, the transport article 2101 is guided by the parallel-driving direction guide member 233, and a part of the transport article 2101 is brought into contact with the transport/discharging belt 234. Thus, the transport article 2101 is reliably transported to the discharging port side.

Then, in FIG. 13(e), when the transport article 2101 is clamped between the counter-parallel-driving direction side guide member 232 and the transport/discharging belt 234, the coupling arm 2346 is revolved in the counterclockwise direction according to the thickness of the transport article 2101. Subsequently, in FIGS. 13(f)-13(h), the feeding means 223 continues to rotate even in the revolving state of the coupling arm 2346, thus moving the transport article 2101 at the moving speed of the transport/discharging belt 234 to a predetermined accommodating chamber 2123 in the transport box 220. Since at this time the feeding means 223 is being driven in parallel with the transport box 220 as described above, it can stably feed the transport article 2101.

Then, in FIG. 13(i), when the trailing end of the transport article 2101 is separated from the transport/discharging belt 234, the coupling arm 2346 of the feeding means 223 is revolved in the clockwise direction. Also, the transport article 2101 perfectly enters the accommodating chamber 2123 by the momentum received from the transport/discharging belt 234, thus completing the operation of feeding one transport article 2101. The feeding operation is completed at a position in the parallel-driving feeding area 244, and thus the feeding operation can be performed safely and reliably.

As shown above, in the transporter/sorter 221 the feeding means 223 of the feeding unit 222 feeds the transport article 2101 while being driven in parallel with the transport box 220, it is possible to achieve reliable and stable feeding as well as increase the transport density.

Furthermore, since the feeing of the transport article 2101 is executed in the relatively stationary state of the transport box 220 and the feeding means 223, it is possible to increase the transport speed of the transport box 220.

In other words, the transporter/sorter 221 can stabilize the feeding operation and greatly improve the process capacity.

While the preferred embodiment of the feeding unit according to the invention has been described, it is by no means limited to the above embodiment, and various changes and modifications may of course be made without departing from the scope of the invention.

For example, in the transporter/sorter 221 the feeding means 223 transports the received transport article 2101 to the discharging port side by utilizing the transport/discharging belt 234 between the receiving port side and the discharging port side of the receiving space 236, and discharges the transport article 2101 by using the transport/discharging belt 234 and the roller 235. It is to be noted that this arrangement is by no means limitative.

In a feeding means 223a as shown in FIG. 14, in lieu of the roller 235 a discharging belt 235a comprising a pair of roller 2351 and a belt 2352, is provided on the counter-together-driving side and the discharging port side of the base member 231a, and in lieu of the counter-parallel-driving direction side guide member 232 a counter-parallel-driving side guide member 232a is provided on the counter-parallel-driving direction side. With this arrangement, the belt 2352 is rotated by the transport/discharging belt 234. Thus, it is possible to improve the performance of transporting the transport article 2101 to the discharging port side.

While the transporter/sorter according to the invention is particularly suited to such large take-out articles as documents, magazines, books, CD cases, etc., large take-out articles are by no means limitative, and the invention is suitably applicable as well to small take-out articles such as post cards and small envelopes.

Figure 15B:
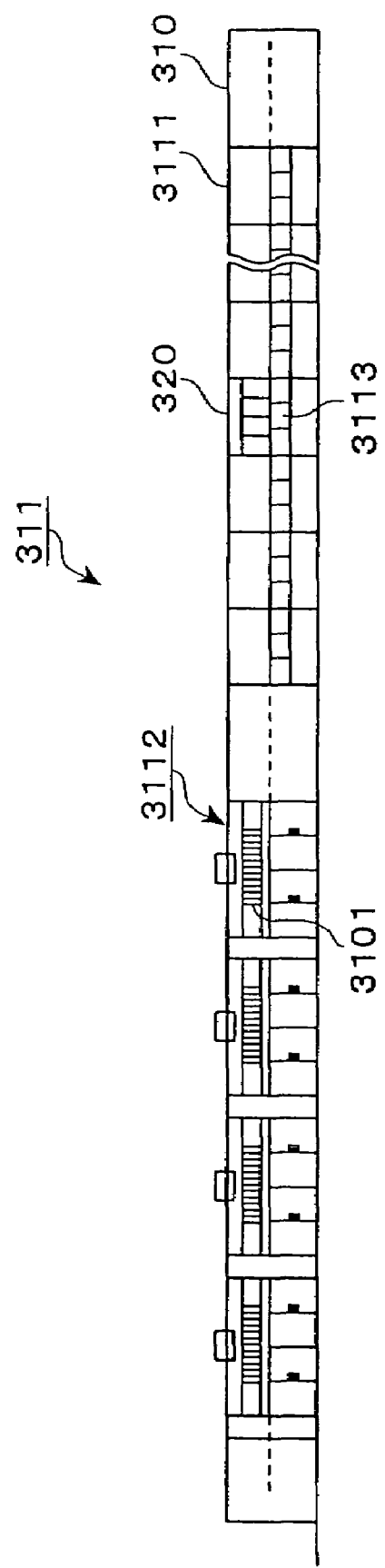

Now, a third embodiment of the transporter/sorter according to the present invention will be described with reference to FIGS. 15a and 15b. FIG. 15a is a schematic view showing the third embodiment of the transporter/sorter according to the present invention or a trolley type transporter/sorter. FIG. 15b is a schematic front view showing such trolley type transporter/sorter according to the invention.

Referring to FIGS. 15a and 15b, the trolley type transporter/sorter 311 (sometimes abbreviated as the transporter/sorter herein) is different from the above prior art transporter/sorter 500 in that, it comprises an outer and an inner guide rails 351 and 352 facing each other in the horizontal-direction to form an endless loop path and a plurality of transport boxes 320 supported for movement on the outer and inner guide rails 351 and 352 for undergoing excursion along the endless loop path. The other constituent elements are substantially the same as the prior art transporter/sorter 500.

Figure 25A:
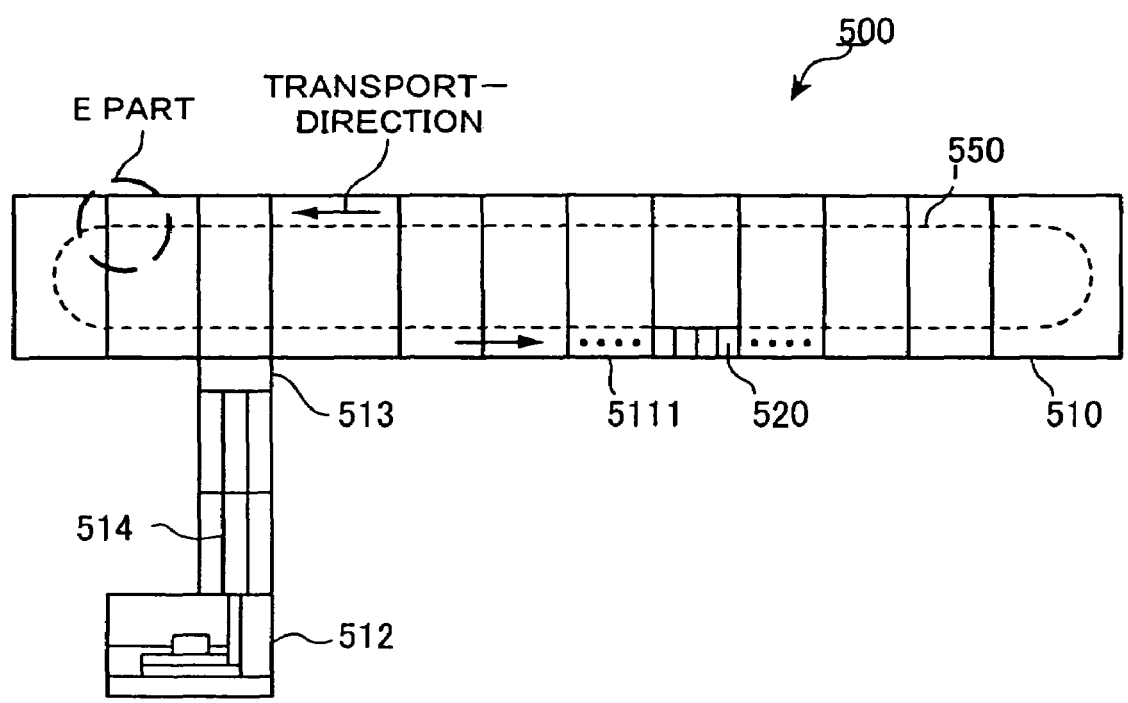
FIG. 25a is a schematic plan view of another prior art transporter/sorter.
Figure 25B:
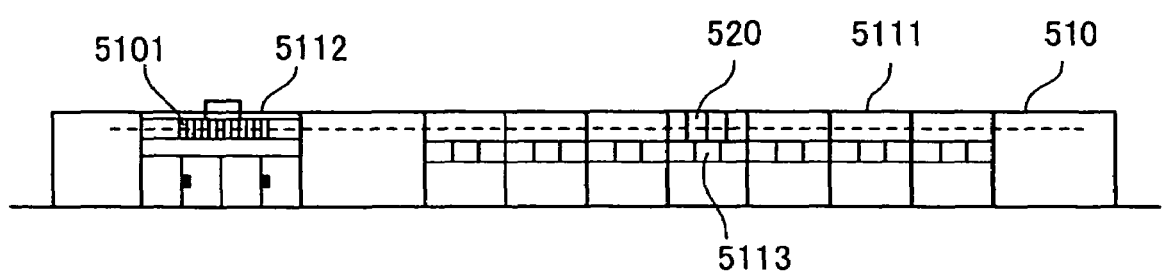
Figure 26A:
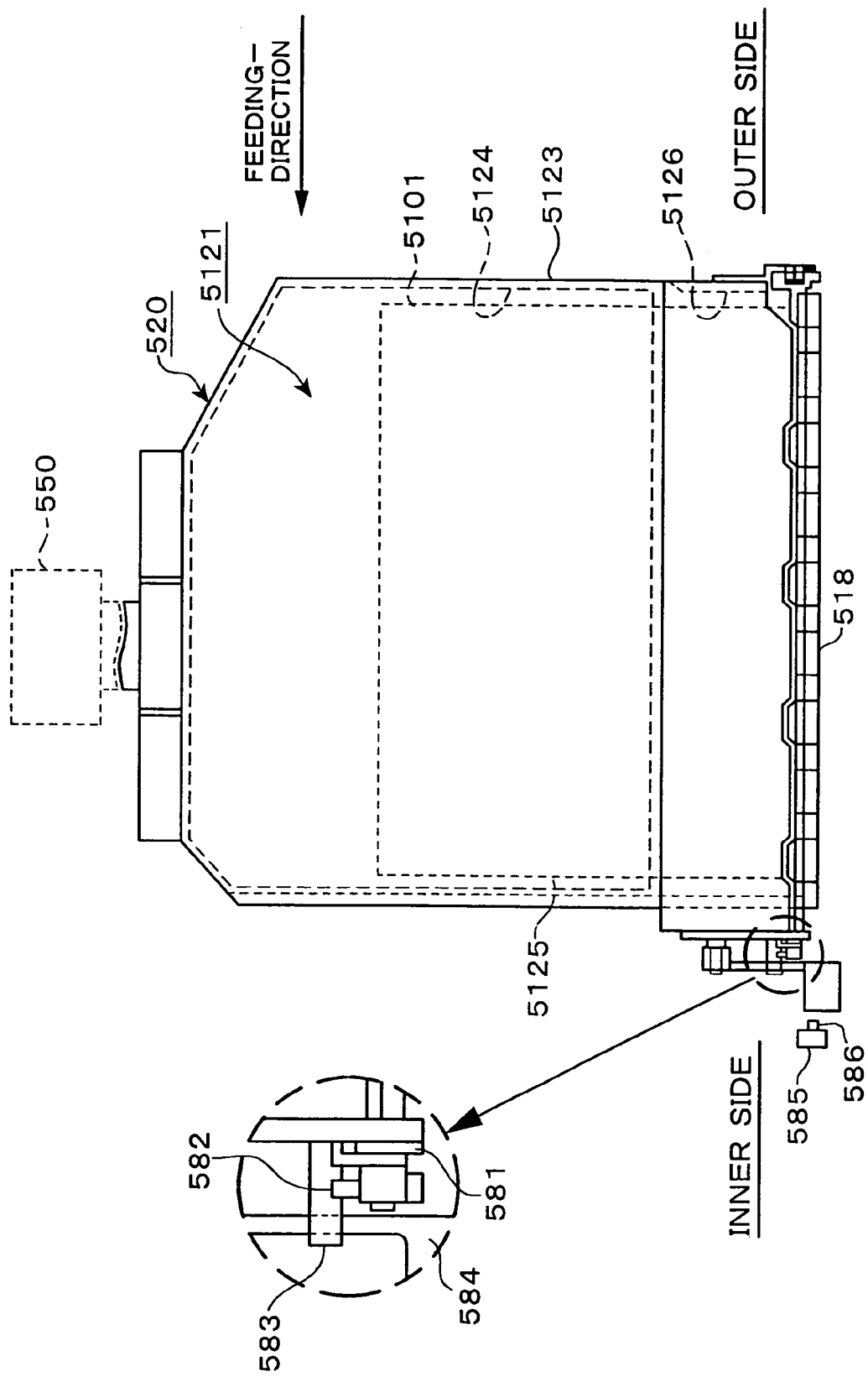
FIG. 26a is a schematic front view of the transport box in FIG. 25.
Figure 26B:
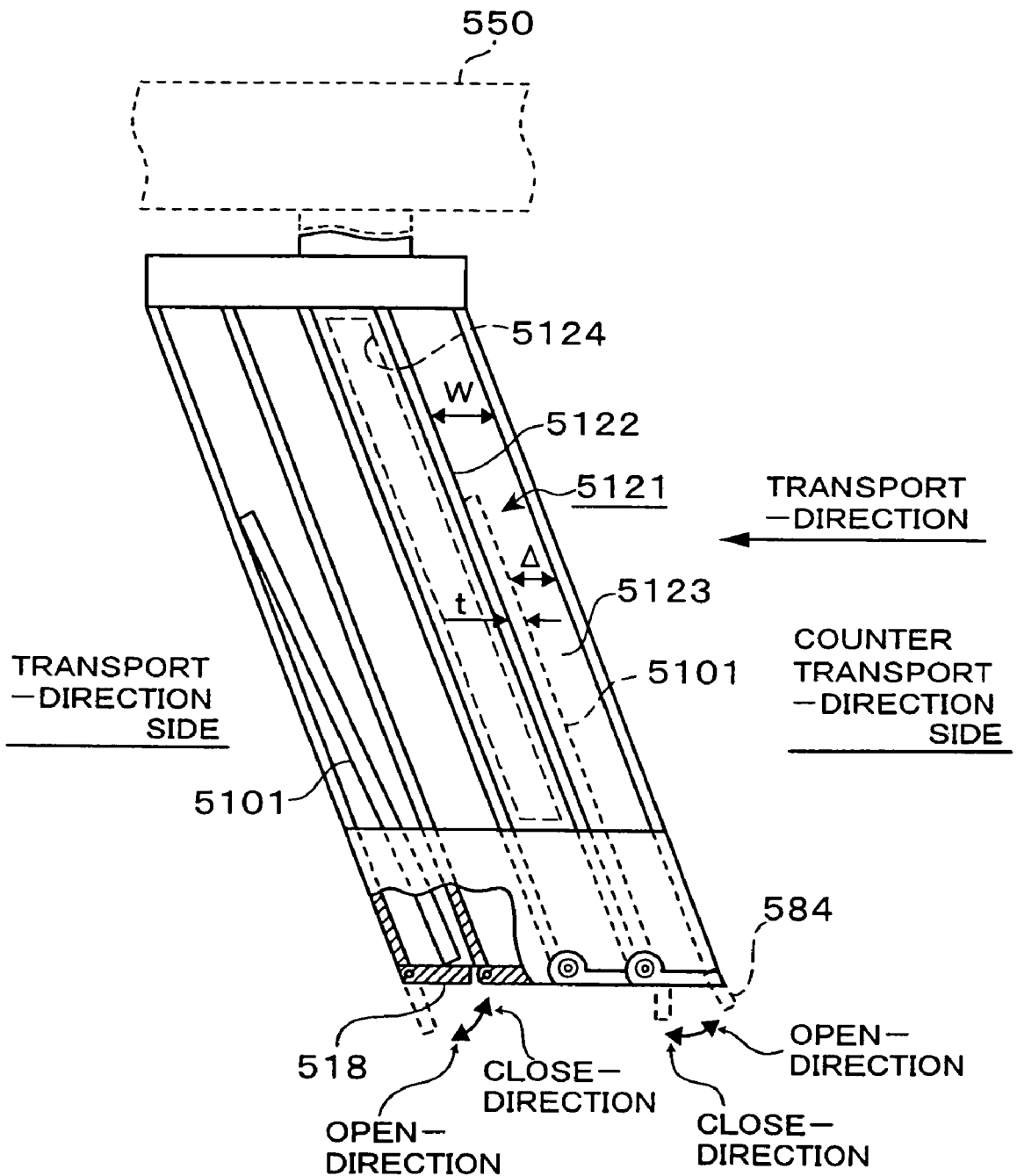
FIG. 26b is a schematic side view of the transport box in FIG. 25 as seen from outside.

Thus, in FIGS. 15a and 15b elements like those in FIGS. 25a and 25b are designated by like reference numerals, and their detailed description is not given herein.

Figure 16B:
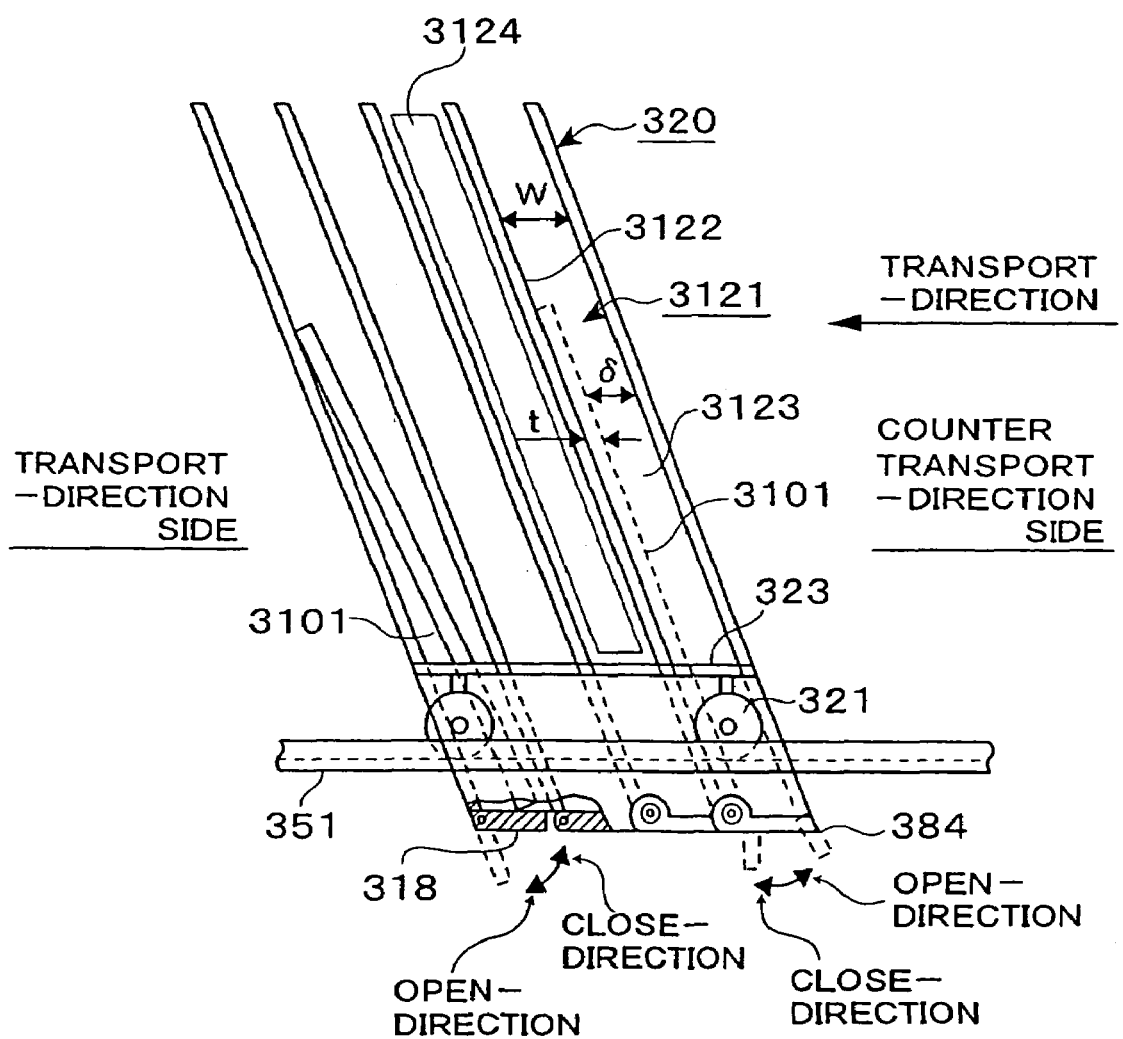

FIG. 16a is a schematic front view showing a fifth embodiment of the transport box for transporter/sorter according to the invention. FIG. 16b is a schematic side view showing the fifth embodiment of the transport box for transporter/sorter according to the invention.

Referring to FIGS. 16a and 16b, the transport box 320 has moving rollers 321 disposed at four lower part corners via support members 322 and 323 projecting horizontally from its side plates 3125 and 3126. By these moving rollers 321, the transport box 320 is supported for movement on the outer guide rail 351 and the inner guide rail 352. Since the transport box 320 is supported by a four-point support on the outer guide rail 351 and the inner guide rail 352, it is supported in a stable state.

While the embodiment adopts the four-point support, such arrangement is by no means limitative, for instance, it is possible to adopt a three-point support.

Figure 17:
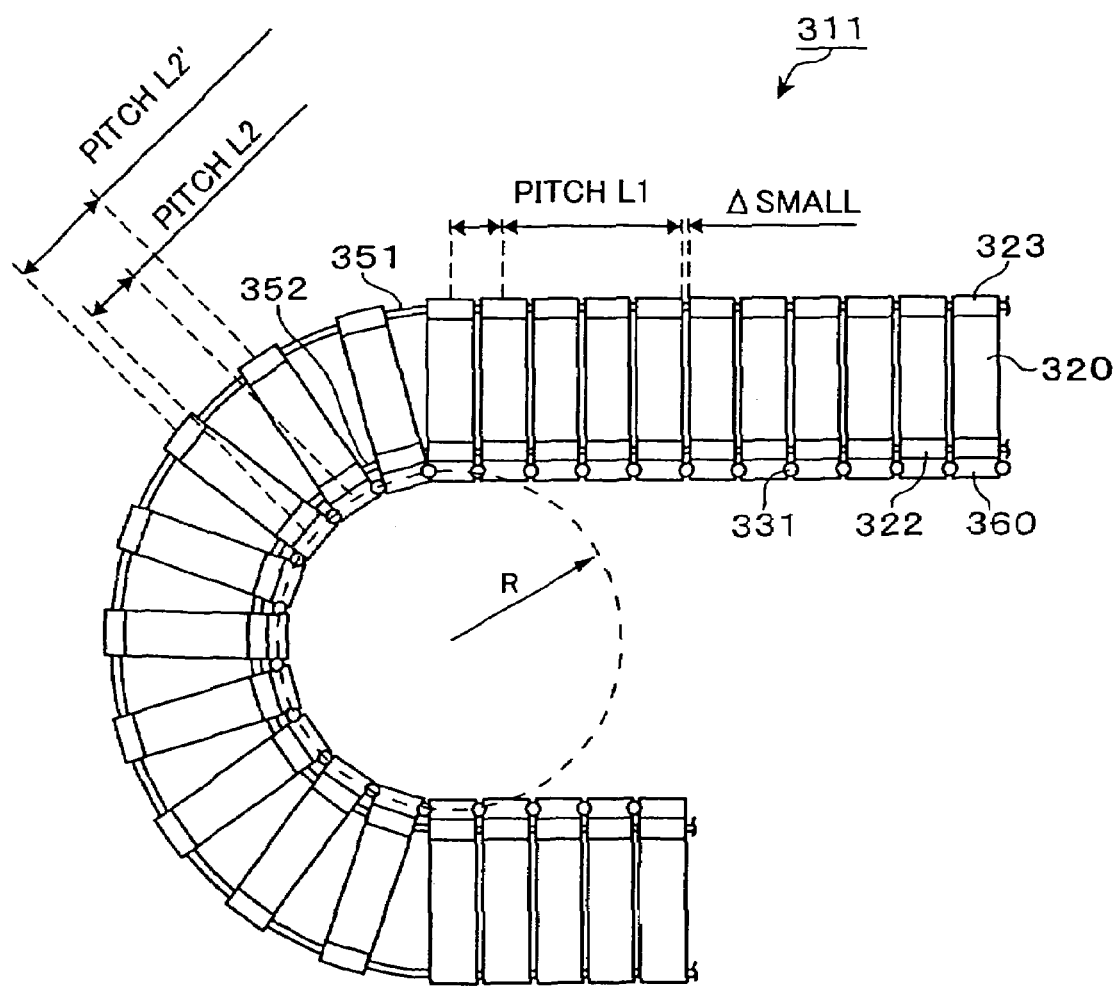

Each of the transport boxes 320 has a chain conveyor 360 coupled by joints 331 to its inner side plate 322, and the boxes 320 undergo excursion along the endless loop path in a state that they are inter-coupled for revolution on the inner side of the endless loop path. With this arrangement, as shown in FIG. 17, even in the case that the transport boxes 320 are arranged at a minimum pitch La in straight portions of the endless lop path in a range free from contact of adjacent boxes, the transport boxes 320 can be moved along the curved part of the endless loop path without possibility of contact of adjacent boxes. In this way, it is possible to improve the efficiency of mounting the transport boxes 320 on the straight portions, increase the transport density and maximize the transport capacity in the case of setting a constant transport speed.

By the above term "the state that the transport articles are inter-coupled for revolution on the inner side of the endless loop path" is meant a state that the transport boxes 320 are coupled together by the joints 331 found on the inner side of the inner guide rail 352 in the top view and also a state that the transport boxes are coupled together by the joints 331 such that at least about 70 percent (preferably at least about 80 percent) of the transport boxes 320 are found to be on the outer side of the joints 331 on the top view.

The chain conveyors 360 are coupled for revolution by the joints 331 on the inner side of the inner side guide rail 352. It is to be noted that the chain conveyor 360 is driven by motor-driven sprockets (not shown).

The outer guide rail 351 and the inner guide rail 352 are flat plate rails having projections for guiding the moving rollers 321, and substantially horizontally face to each other.

Each of the guide rails 351 and 352 in this embodiment is of an arrangement to form a substantially horizontal elliptical endless loop path, but such a path is by no means limitative; for instance, the invention is applicable as well to a three-dimensional helical loop path. As a more specific example, the invention is applicable to the transporter/sorter as disclosed in Japanese patent application no. 2004-202376, which comprises a feeding guide rail and a section guide rail, the section guide rail having a dual helical arrangement, the sections each having two, i.e., upper and lower, stages.

Now, the operation of the transporter/sorter 311 will be described.

Transport articles 3101 are transported one-by-one by the belt 314 from the feeding frame 312 to the feeding means 313. The transport articles 3101 are moved by feeding means 312 to predetermined transport boxes 320.

The transport boxes 320 are transported at a constant speed by the chain conveyor 360. As shown in FIG. 17, in the transporter/sorter 311 the transport boxes 320 are spaced apart at a constant pitch (pitch L1=pitch L2). In the straight portions of the guide rails 351 and 352, the pitch L1 of the transport boxes 320 contains a very small gap Δ SMALL. However, the transport boxes 320 are transported by the chain conveyor 360 with substantially no gap between adjacent boxes. In this way, the transporter/sorter 311 improves the efficiency of mounting transport boxes 320 in the straight portions of the guide rails 351 and 352 and thus improves the transport density.

When the transport boxes 320 are transported through the curved portions of the guide rails 351 and 352, the orbit of the chain conveyor 360 is along a circumference of radius R. At this time, although the pitch L2 of the transport boxes 320 in the chain conveyor 360 is not changed, the outer side pitch L2' thereof becomes greater than the pitch L1, and thus the transport boxes 320 pass along the curved portions of the guide rails 351 and 352 without interference of adjacent boxes.

The transport articles 3101 transported by the transport boxes 320 are discharged to predetermined stacking parts 3113 in the sorting-out frame 311. That is, the transporter/ sorter 311 sorts out the transport articles 3101 to respective destinations while transporting the articles.

It is understood that in the transporter/sorter 311 of the above arrangement, the efficiency of mounting the transport boxes 320 in the straight portions of the guide rails 351 and 352 is increased to (pitch L3/pitch L1) times that of the prior art transporter/sorter 500. Thus, in the transporter/sorter 311, without increasing the transport speed of the transport boxes 320, the number of transport boxes 320 processed per unit time is increased to (pitch L3/pitch L1) times that of the prior art transporter/sorter 500.

Also, since the transport boxes 320 are supported by the four-point support by the feeding rollers 321, the support load is improved to permit transport of even heavy transport articles 3101.

Furthermore, unlike the variable transport box pitch transporter/sorter as disclosed in the aforementioned Japanese patent publication, the transporter/sorter 311 does not require provision, at the boundaries between the straight and curved portions of the endless loop path, of any transport box gap varying mechanism for varying the pitch of the transport boxes. Thus, it simplifies the arrangement and control and significantly reduces the equipment cost.

Figure 18:
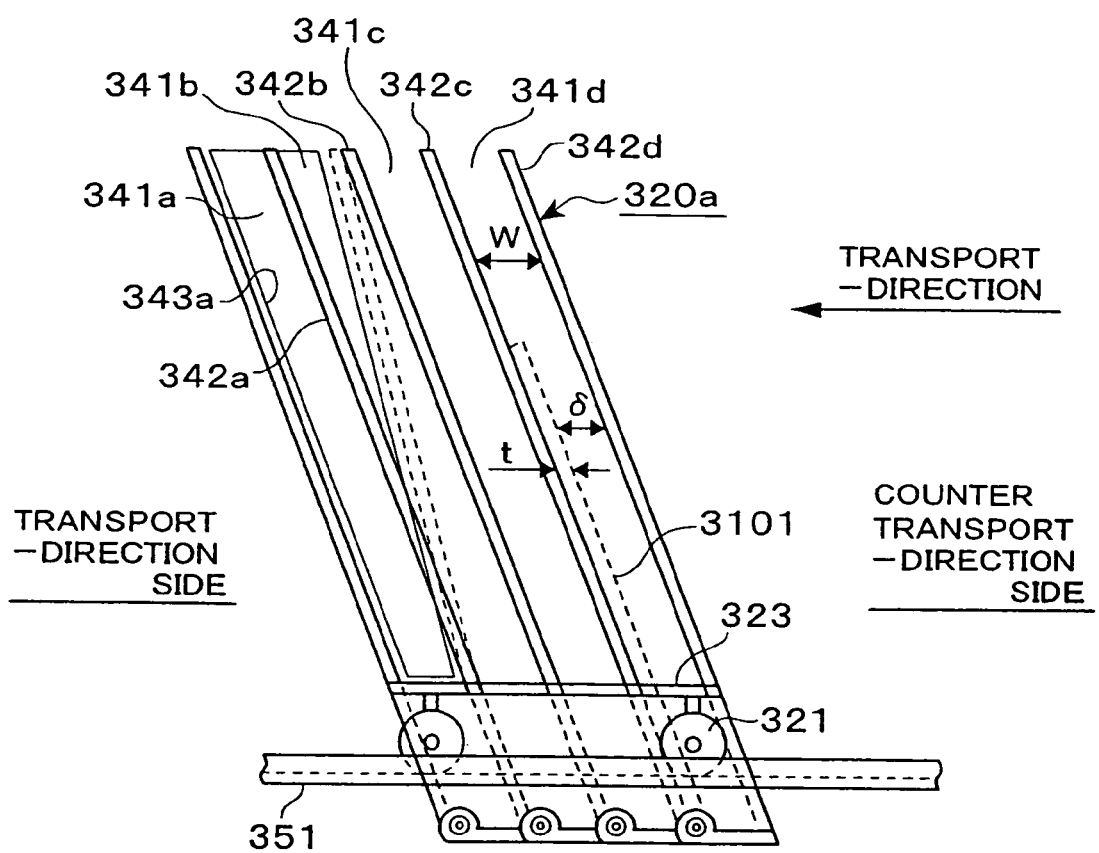
FIG. 18 is a schematic side view of a sixth embodiment of the transfer box for transporter/sorter according to the present invention.

Now, a sixth embodiment of the transport box will be described with reference to FIGS. 18 and 19. FIG. 18 is a schematic side view showing the sixth embodiment of the transport box for transporter/sorter according to the invention.

Referring to FIG. 18, each of the transport boxes 320a has a first to a fourth accommodating chambers 341a-341d. The accommodating chambers 341a-341d are defined by revolving partitioning members 342a-342d.

Figure 19:
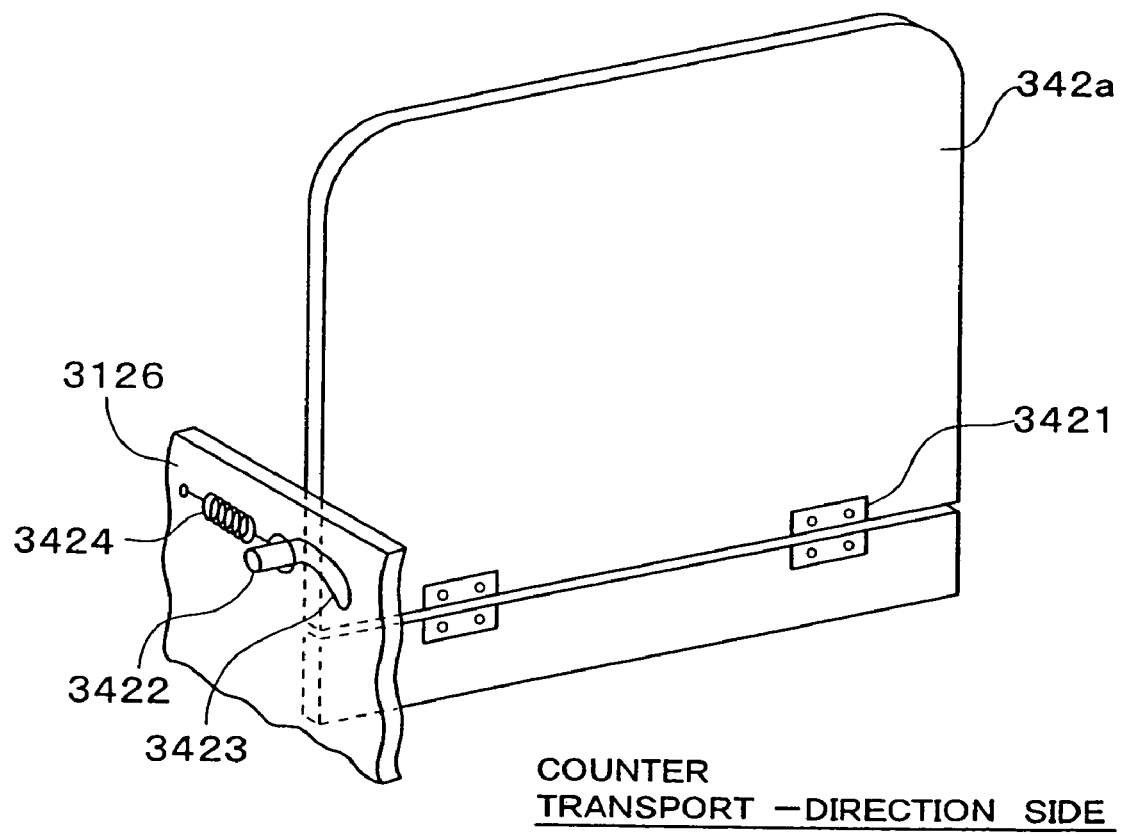
FIG. 19 is a schematic perspective view of a partitioning plate in the transport box for transporter/sorter in FIG. 18.

As shown in FIG. 19, the partitioning members 342a-342d are rectangular, and each has hinges 3421 and a lock bar 3422 disposed at a lower part. The lock bar 3422 projects from a revolution notch 3423 of the side plate 3126, and it is biased by a tensile spring 3424 to the transport direction side and locked at a predetermined position by the revolution notch 3423.

The partitioning members 342a-342d are revolved to the counter-transport-direction side in contact with a pin (not shown) of a solenoid secured to the frame 3110. When the partitioning members 342a are released from the contact, they are revolved to a predetermined position by the tensile spring 3424. With this arrangement, it simplifies the mechanism for revolving the partitioning members 342a-342d and reduces the cost of manufacture.

The remainder of the arrangement is substantially the same as in the transport box 320.

Now, the operation of the transport box 320a of the above arrangement will be described.

In the transport box 320a, when the first accommodating chamber 341a is transported to a position corresponding to the first feeding means 313, the solenoid pin is projected and brought into contact with the partitioning member 342a to cause revolution of the partitioning member 342a to the counter-transport-direction side. With this revolution, the transport direction width of the feeding space 343a in the first accommodating chamber 341a is increased to extend the transport time, thereby ensuring stable feeding operation.

When the transport of the transport article 3101 in the transport box 320a has been completed, the abutment of the solenoid pin and the partitioning member 342a is released, thereby causing the partitioning member 342a to undergo revolution by the biasing force of the tensile spring 3424.

In the transport box 320a, the transport article 3101 is likewise sequentially transported by the downstream (i.e., second to fourth) feeding means 313 to the counter-transport-direction side (second to fourth) accommodating chambers 341b-341d.

In this way, in this embodiment of the transporter/sorter, by causing revolution of the partitioning member 342a-342d of the transport box 320a to the counter-transport-direction side, it increases the transport-direction width of the accommodating chambers 341a-341d and improves the feeding stability.

Moreover, in the transport box 320a, since the transport direction width of the accommodating chambers 341a-341d is made wide when and only when transporting the transport articles 3101, it increases the transport density.

Figure 20A:
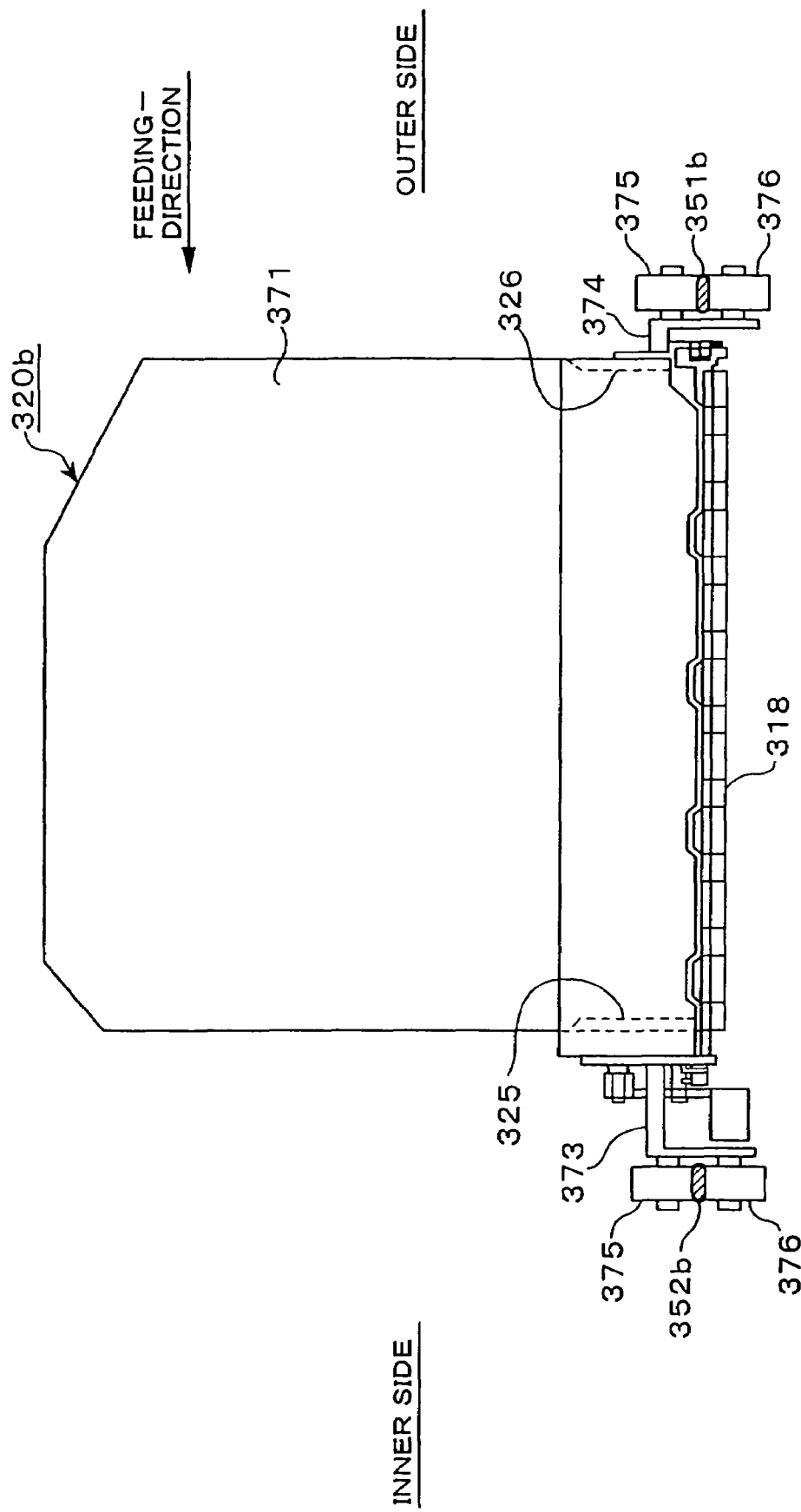
FIG. 20a is a schematic front view of a sixth embodiment of the transport box for transporter/sorter according to the present invention.
Figure 21:
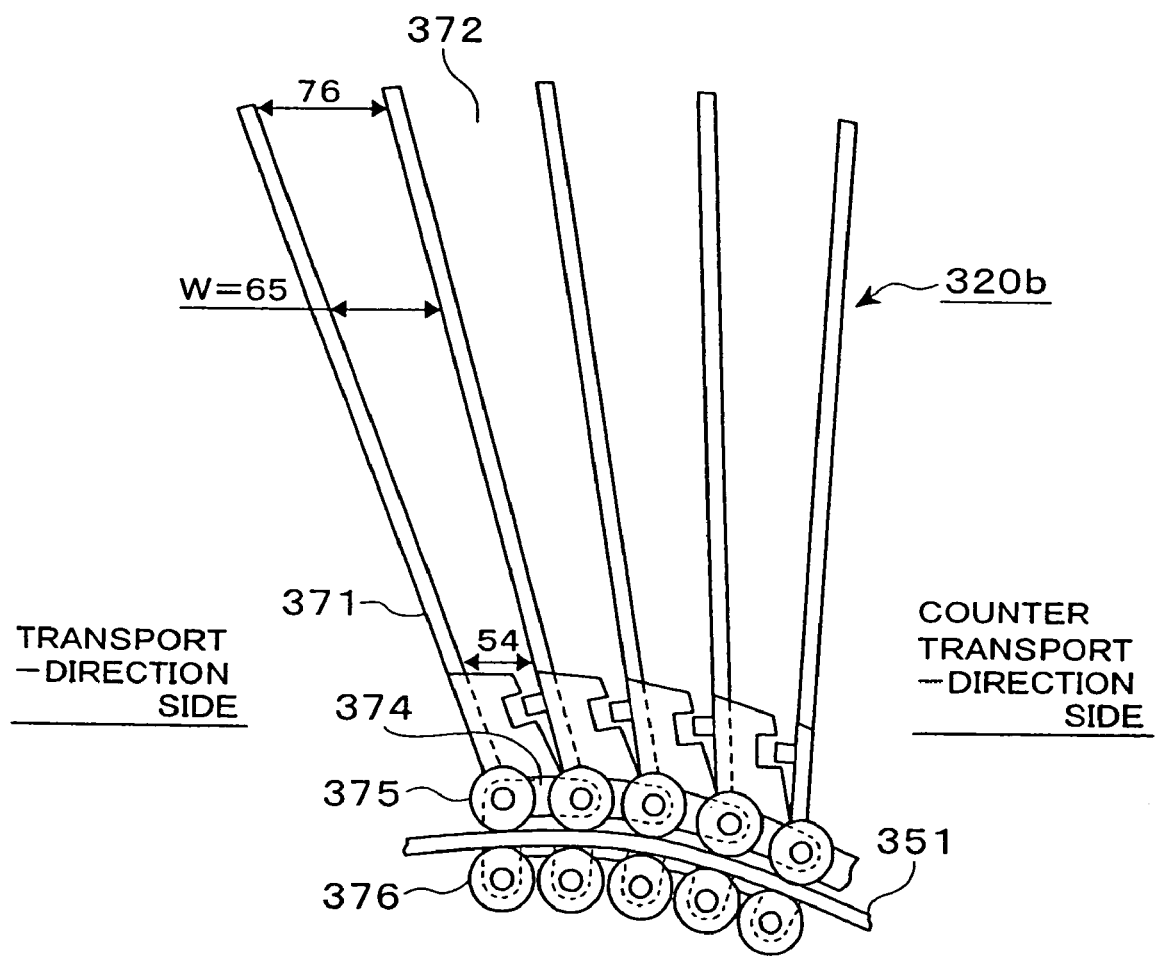
FIG. 21 is a schematic side view of the transport box for transporter/sorter in FIG. 20 for describing the condition when the partitioning plates are in the open state.

FIG. 20(a) is a schematic front view showing the transport box in a fifth embodiment of the transport box for transporter/sorter according to the invention. FIG. 21 is a schematic side view showing the fifth embodiment of the transport box for transporter/sorter according to the invention.

Referring to FIGS. 20(a) and (b), the transport box 320b has five partitioning members 371 and four accommodating chambers 372. Also, the transport box 320b has, as revolving means, link plates 373 and 374 inter-coupling the partitioning plates 371 for revolution and an upper roller 375 and a lower roller 376 provided such as to vertically clamp the guide rails 351b and 352b as support rails and supporting the partitioning plates 371 for revolution.

Each partitioning plate 371 is integral with the side plates 325 and 326, the bottom lid 318, the link plates 373 and 374 and the upper roller 375 and the lower rollers 376, and function as a unit. Adjacent partitioning plates 371 are coupled for revolution via the link plates 373 and 374 as coupling members, and the accommodating chamber 372 is formed to the area clamped by the partitioning plates 371.

The adjacent side plates 325 and 326 and the bottom lid 318 are formed such that they mesh one another with a sufficient gap provided between raised and depressed parts such as not to prevent revolution of the partitioning plates 371.

The link plates 373 and 374 have a shape projecting from the side plates 325 and 326 and hook-like in the side view.

In the link plates 373 and 374, the upper roller 375 rolling on the top surface of the outer and inner guide rails 351b and 352b facing each other are supported for revolution as a central part. Also, the lower roller 375 which is rolling on the bottom surface of the outer and inner guide rails 351b and 352b facing each other in a centrally biased state, is supported for revolution at the lower end. With the arrangement, with the retaining force that the upper and lower rollers 375 and 376 of the partitioning plates 371 clamp the outer and inner guide rails 351b and 352b, the partitioning plates 371 are supported in a posture of a predetermined inclination with respect to the outer and inner guide rails 351b and 352b.

In other words, revolution of the partitioning plates 371 can be caused by providing the outer and inner guide rails 351b and 352b in a curved fashion with local angle variation.

Preferably, the outer and inner guide rails 351b and 352b may be curved in an upwardly convex form at the position corresponding to the feeding means 313. With this arrangement, when the transport box 320b passes through the outer guide rail 351b and the inner guide rail 352b, the partitioning plates 371 are held in a posture of a predetermined inclination with respect to the outer guide rail 351b and the inner guide rail 352b, and automatically caused to undergo revolution to increase the transport-direction width of the accommodating chamber 372. In this way, the revolution of the partitioning plates 371 can be controlled easily and reliably.

Furthermore, the transport box 320b is arranged such that the upper roller 375 and the lower roller 376 clamp the outer guide rail 351b and the inner guide rail 352b. In other words, with the outer and inner guide rails 351b and 352b used as support rails, the partitioning plates 371 can support the outer and inner guide rails 351b and 352b for revolution.

The first to fourth link members 373-374 as counted from the transport-direction side are such that their counter-transport-direction side ends are coupled for revolution to the central part of the link plates 373 and 374 of the succeeding partitioning plates 371.

Furthermore, as for the fifth link plate 373 as counted from the transport-direction side, the counter-transport-direction side end is coupled by a universal joint (not shown) to the first link plate 373 of the succeeding transport box 320b. With this arrangement, like the transport boxes 320, the transport boxes 320b can be moved along the curved portions of the endless loop path without contacting adjacent boxes with one another even in the case that the pitch L1 of the transport boxes 320b is minimized in a range free from their contact with one another in the straight portions of the endless loop path. Thus, the embodiment of the transporter/sorter improves the efficiency of mounting the transport boxes 320b in the straight portions of the endless loop path, increases the transport density and maximizes the transport capacity at a constant transport speed.

The remainder of the arrangement is substantially the same as the above transport box 320.

Now, the operation of the transport box 320b having the above arrangement will be described.

FIG. 21 is a schematic side view for describing a state that in the transport box in the fifth embodiment of the transport box for transporter/sorter according to the invention the partitioning plates are in the open state.

Referring to the FIG. 21, the outer guide rail 351b and the inner guide rail 352b are upwardly convex at a position corresponding to the feeding means 313. When the transport box 320a passes through this portion of the outer and inner rails 351b and 352b, the partitioning plates 371 are held in a posture with a predetermined inclination with respect to the curved outer guide rail 351b and the inner guide rail 352b, and revolved so as to increase the transport-direction width of the accommodating chamber 372.

In this way, in this embodiment of the transport box for transporter/sorter, by utilizing the curved outer and inner guide rails 351b and 352b, the partitioning plates 371 are automatically revolved so as to increase the transport-direction width of the accommodating chamber 372, thereby readily and reliably controlling the revolution of the partitioning plates 371.

A first example of the invention relates to the fifth embodiment of the transport box 320b. As shown in FIGS. 20b and 21, in this transport box 320b, the maximum transport-direction width of the accommodating chamber 371 is set to about 76 mm, and the transport-direction width W of the central portion of the accommodating chamber 371 is set to about 65 (i.e., (76+54)/2) mm. The transport-direction width W1 at the time of transport along flat guide rail is about 46 mm.

In this way, in the transport box 320b the transport-direction gap is increased by about 19 (i.e., W−W1) mm to extend the feeding time, thereby stabilizing the feeding operation and increasing the transport speed v.

While preferred embodiments of the transporter/sorter according to the invention have been described, the invention is by no means limitative to these embodiments, and various changes and modifications are of course possible without departing from the scope of the invention.

For example, while the fifth embodiment of the present invention is arranged such that the partitioning plates 371 are revolved by making use of the curved outer and inner guide rails 351b and 352b, this arrangement is by no means limitative. For example, it is possible as well to bring the solenoid pin and the partitioning plates into contact with one another and exert an external force in excess of the holding force for revolving the partitioning plates 371 and increasing the transport-direction width of the accommodating chamber 372.

The transporter/sorter and the transport box according to the present invention are particularly suited to such take-out articles as documents, magazines, books, CD cases, etc., larger in size than a post card, such large take-out articles are by no means limitative, and the invention is suitably applicable as well to small take-out articles such as post cards and small envelopes.

What is claimed is:

1. A transporter/sorter comprising a frame having a sorting-out frame and a feeding frame, a guide rail provided inside the frame and in the form of an endless loop having straight portions and curved portions, and a plurality of transport boxes hung from the guide rail and undergoing excursion along the endless loop path, wherein:
   the transport boxes are configured to receive transport articles fed from a feeding port of an accommodating chamber, wherein the transport-direction width of a feeding space in the accommodating chamber increases toward the feeding port.

2. A transporter/sorter according to claim 1, wherein the transport box has two or more accommodating chambers, and feeding ports for adjacent accommodating chambers are provided at the opposite sides.

3. A transporter/sorter according to claim 1, wherein the transport-direction width of the feeding spaces is the accommodating chambers is different depending on the transport articles.

4. A transporter/sorter according to claim 1, wherein each of the accommodating chambers has a discharging means for discharging the fed transport articles.

5. A transporter/sorter comprising a plurality of transport boxes undergoing circulation along an endless loop path and feeding units for feeding transport articles to the transport boxes, wherein each of the feeding units comprises: a feeding means for feeding transport boxes to each transport box, and a parallel-driving means for driving the feeding means in parallel with the transport box, wherein the feeding means comprises: a receiving space for receiving the transport articles while being driven by parallel-driving; and a transporting/discharging belt provided between a receiving port side and a discharging port side of the receiving space and serving to transport the received transport articles to the discharging port side and discharge the transport articles.

* * * * *